(12) United States Patent
Weldon et al.

(10) Patent No.: US 6,747,930 B1
(45) Date of Patent: Jun. 8, 2004

(54) DATA PROTECTION ON AN OPTICAL DISK

(75) Inventors: James Weldon, Boulder, CO (US);
Karl R. Schneck, Jr., Milford, PA (US); Hilary S. Lackritz, Cupertino, CA (US); Jerry Smith, Littleton, CO (US); Mark McLaughlin, Baton Rouge, LA (US); J. Bradford Merry, Annapolis, MD (US)

(73) Assignee: Hide & Seek Technologies, Inc., Akron, CO (US)

( * ) Notice: Subject to any disclaimer, the term of this patent is extended or adjusted under 35 U.S.C. 154(b) by 0 days.

(21) Appl. No.: 09/163,087

(22) Filed: Sep. 29, 1998

(Under 37 CFR 1.47)

Related U.S. Application Data

(63) Continuation-in-part of application No. 08/780,098, filed on Dec. 24, 1996, now Pat. No. 5,815,484, which is a continuation-in-part of application No. PCT/US97/08842, filed on Jun. 5, 1997.
(60) Provisional application No. 60/087,324, filed on May 29, 1998, and provisional application No. 60/063,656, filed on Oct. 28, 1997.

(51) Int. Cl.$^7$ ................................................. G11B 7/00
(52) U.S. Cl. ...................... 369/53.21; 369/47.1; 369/84
(58) Field of Search ............................. 369/47.1, 47.12, 369/47.13, 47.14, 47.15, 53.1, 53.11, 53.2, 53.21, 53.22, 53.41, 53.45, 59.1, 59.23, 84, 85, 93, 275.1, 275.5, 32

(56) References Cited

U.S. PATENT DOCUMENTS

| 4,237,211 A | 12/1980 | Fanselow | 430/338 |
| 4,380,769 A | 4/1983 | Thomas et al. | 346/135.1 |

(List continued on next page.)

FOREIGN PATENT DOCUMENTS

| DE | 3720233 | 12/1988 | |
| EP | 0 090 888 | 10/1983 | F42B/13/20 |

(List continued on next page.)

OTHER PUBLICATIONS

U.S. patent application Ser No. 60/026,390, Rollhaus et al., filed Sep. 16, 1996.

Seto, "Photochromic Dyes," Research Center, SONY Corporation, Hodogaya–ku, Yokohama, Kanagawa 240, Japan, pp. 71–88.

(List continued on next page.)

Primary Examiner—Muhammad Edun
(74) Attorney, Agent, or Firm—Sheridan Ross P.C.

(57) ABSTRACT

A method and system is disclosed for purposefully modifying the accessibility of information encoded upon an optical medium for indicating a state or history of the optical medium and/or a state or history of an item associated therewith. In one embodiment, the optical medium is purposefully damaged when the information is initially accessed so that upon subsequent access attempts of the information on the optical medium, a previous access of the information is detected by the purposefully induced errors. Thus, there is provided an effective technique for limiting illegal duplication and/or use of, e.g., software, movies, and music on compact disks and digital versatile disks. The present invention provides verification of persons and/or financial transaction cards during financial transactions. In another embodiment, a compact data storage device is disclosed having the approximate dimensions of a credit card that is capable of storing large amounts of data (e.g., 50–100 Megabytes). The device may encode data in both a linear strip fashion for reading by typical card swipe data reading devices (e.g., magnetic card swipe devices) as well as by optical disc readers that read tracks of spirally encoded optical data.

52 Claims, 28 Drawing Sheets

U.S. PATENT DOCUMENTS

| | | | |
|---|---|---|---|
| 4,523,304 A | 6/1985 | Satoh et al. | 369/23 |
| 4,542,288 A | 9/1985 | Drexler | 235/487 |
| 4,544,835 A | 10/1985 | Drexler | 235/487 |
| 4,677,604 A | 6/1987 | Selby, III et al. | 369/33 |
| 4,866,769 A | 9/1989 | Karp | 380/4 |
| 4,879,704 A | 11/1989 | Takagi et al. | 369/14 |
| 4,975,898 A | 12/1990 | Yoshida | 369/100 |
| 5,003,521 A | 3/1991 | Yoshida et al. | 369/44.25 |
| 5,073,880 A | 12/1991 | Maeda et al. | 369/32 |
| 5,077,720 A | 12/1991 | Takagi et al. | 369/59 |
| 5,132,954 A | 7/1992 | Kulakowski et al. | 369/48 |
| 5,233,584 A | 8/1993 | Kulakowski et al. | 369/44.27 |
| 5,260,690 A * | 11/1993 | Mann et al. | |
| 5,289,451 A | 2/1994 | Ashinuma et al. | 369/58 |
| 5,311,494 A | 5/1994 | Sugita et al. | 369/100 |
| 5,322,747 A | 6/1994 | Hugle | 430/1 |
| 5,347,509 A | 9/1994 | Goldberg et al. | 369/275.3 |
| 5,371,792 A | 12/1994 | Asai et al. | 380/3 |
| 5,373,499 A | 12/1994 | Imaino et al. | 369/275.4 |
| 5,400,319 A | 3/1995 | Fite et al. | 369/275.5 |
| 5,418,852 A | 5/1995 | Itami et al. | 380/4 |
| 5,426,625 A | 6/1995 | Bui et al. | 369/44.32 |
| 5,434,837 A | 7/1995 | Haneda et al. | 369/54 |
| 5,453,968 A | 9/1995 | Veldhuis et al. | 369/84 |
| 5,457,668 A | 10/1995 | Hibino et al. | 369/32 |
| 5,461,239 A | 10/1995 | Atherton | 250/566 |
| 5,473,584 A | 12/1995 | Oshima | 369/32 |
| 5,510,163 A | 4/1996 | Sullivan et al. | 428/64.1 |
| 5,513,169 A | 4/1996 | Fite et al. | 369/272 |
| 5,513,260 A | 4/1996 | Ryan | 380/3 |
| 5,538,773 A | 7/1996 | Kondo | 428/64.1 |
| 5,570,379 A | 10/1996 | Sasaki et al. | 371/42 |
| 5,572,589 A | 11/1996 | Waters et al. | 380/4 |
| 5,574,787 A | 11/1996 | Ryan | 380/5 |
| 5,587,981 A | 12/1996 | Kamatani | 369/58 |
| 5,587,984 A | 12/1996 | Owa et al. | 369/103 |
| 5,592,454 A | 1/1997 | Tobita et al. | 369/58 |
| 5,598,399 A | 1/1997 | Ogihara et al. | 369/275.2 |
| 5,608,717 A | 3/1997 | Ito et al. | 369/275.3 |
| 5,629,914 A | 5/1997 | Clark et al. | 369/59 |
| 5,636,292 A | 6/1997 | Rhoads | 382/232 |
| 5,644,566 A | 7/1997 | Nakayama et al. | 369/275.2 |
| 5,661,703 A | 8/1997 | Moribe et al. | 369/14 |
| 5,671,202 A | 9/1997 | Brownstein et al. | 369/58 |
| 5,680,383 A | 10/1997 | Clark et al. | 369/59 |
| 5,681,633 A | 10/1997 | Onagi et al. | 428/64.3 |
| 5,737,290 A | 4/1998 | Ohmori | 369/58 |
| 5,805,551 A | 9/1998 | Oshima et al. | 369/59 |
| 5,815,484 A | 9/1998 | Smith et al. | 369/275.3 |
| 5,881,038 A | 3/1999 | Oshima et al. | 369/59 |
| 5,930,209 A | 7/1999 | Spitzenberger et al. | 369/32 |
| 6,011,772 A | 1/2000 | Rollhaus et al. | 369/286 |
| 6,016,225 A * | 1/2000 | Anderson | |
| 6,338,933 B1 | 1/2002 | Lawandy et al. | 430/270.1 |
| 6,343,063 B1 | 1/2002 | Rollhaus et al. | 369/286 |

FOREIGN PATENT DOCUMENTS

| | | |
|---|---|---|
| EP | 0524242 | 12/1994 |
| EP | 0 637 016 | 2/1995 |
| EP | 0 706 174 | 4/1996 |
| EP | 0 697 699 | 9/1996 |
| EP | 0806 768 | 11/1997 |
| EP | 0 844 611 | 5/1998 |
| EP | 0 844 612 | 5/1998 |
| EP | 0 940 810 | 9/1999 |
| EP | 1 050 879 | 11/2000 |
| EP | 1 020 856 | 1/2001 |
| EP | 1 065 665 | 1/2001 |
| EP | 0 789 908 | 5/2001 |
| EP | 0 767 957 | 8/2001 |
| JP | 1153767 | 6/1989 |
| JP | 1211285 | 8/1989 |
| JP | 01-211285 | 8/1989 |
| JP | 1252902 | 10/1989 |
| JP | 401252902 A | 10/1989 |
| JP | 2018728 | 1/1990 |
| JP | 02-018728 | 1/1990 |
| JP | 4128834 | 4/1992 |
| JP | 4-128834 | 4/1992 |
| JP | 4318342 | 11/1992 |
| JP | 4-318342 | 11/1992 |
| JP | 5101471 | 4/1993 |
| JP | 05101471 | 4/1993 |
| JP | 5297627 | 11/1993 |
| JP | 05-297627 | 11/1993 |
| JP | 6-082952 | 3/1994 |
| JP | 6082952 | 3/1994 |
| JP | 09-011619 | 3/1994 |
| JP | 8147856 | 6/1996 |
| JP | 08147856 | 6/1996 |
| JP | 9011619 | 1/1997 |
| JP | 411053767 | 2/1999 |
| WO | WO 96/00963 | 1/1996 |
| WO | WO 98/03973 | 1/1998 |
| WO | WO 98/11539 | 3/1998 |
| WO | WO 98/41979 | 9/1998 |
| WO | WO 98/52194 | 11/1998 |
| WO | WO 98/54713 | 12/1998 |
| WO | WO 99/22340 | 5/1999 |
| WO | WO 99/67085 | 12/1999 |
| WO | WO 01/29828 | 4/2001 |
| WO | WO 02/059881 | 8/2002 |

OTHER PUBLICATIONS

Tarkka et al., "Holographic Storage in a Near–IR Sensitive Photochromic Dye," *Optics Communications*, pp. 54–58 1994.

Matsui, "Optical Recording Systems," *Infrared Absorbing Dyes*, pp. 117–140, Plenum Press, NY, 1990.

Rollhaus et al., U.S. Publication No. US2001/0046204 Entitled "Machine–Readable Optical Disk With Reading–Inhibit Agent," Nov. 29, 2001.

McLaughlin et al.; U.S. patent application Ser. No. 09/646, 141 Entitled "Copy Protectable Optical Media Device and Methodology Therefor"; filed Sep. 13, 2000.

Schneck et al.; U.S. patent application Ser. No. 10/057,054 Entitled "Method and System For Authenticating an Optical Disk Using Purposefully Provided Data Errors"; filed Jan. 25, 2002.

International Research Report of PCT/US97/08842 filed Jun. 5, 1997.

International Research Report of PCT/US98/22871 filed Oct. 28, 1998.

International Research Report of PCT/US02/02315 filed Jan. 25, 2002.

* cited by examiner

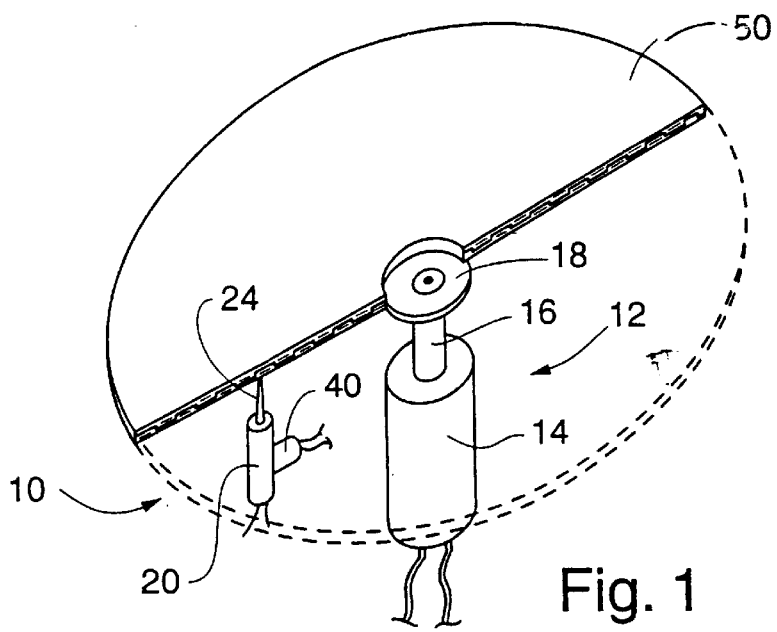
Fig. 1
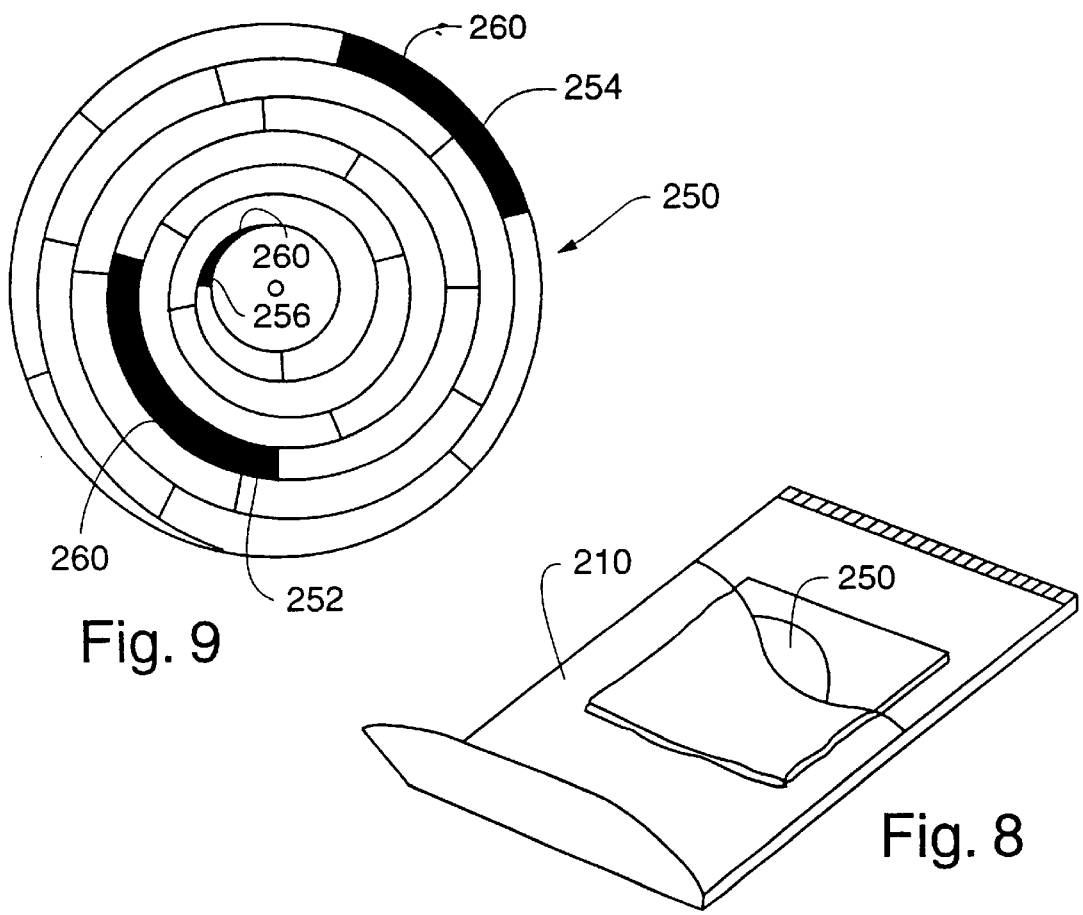
Fig. 9
Fig. 8

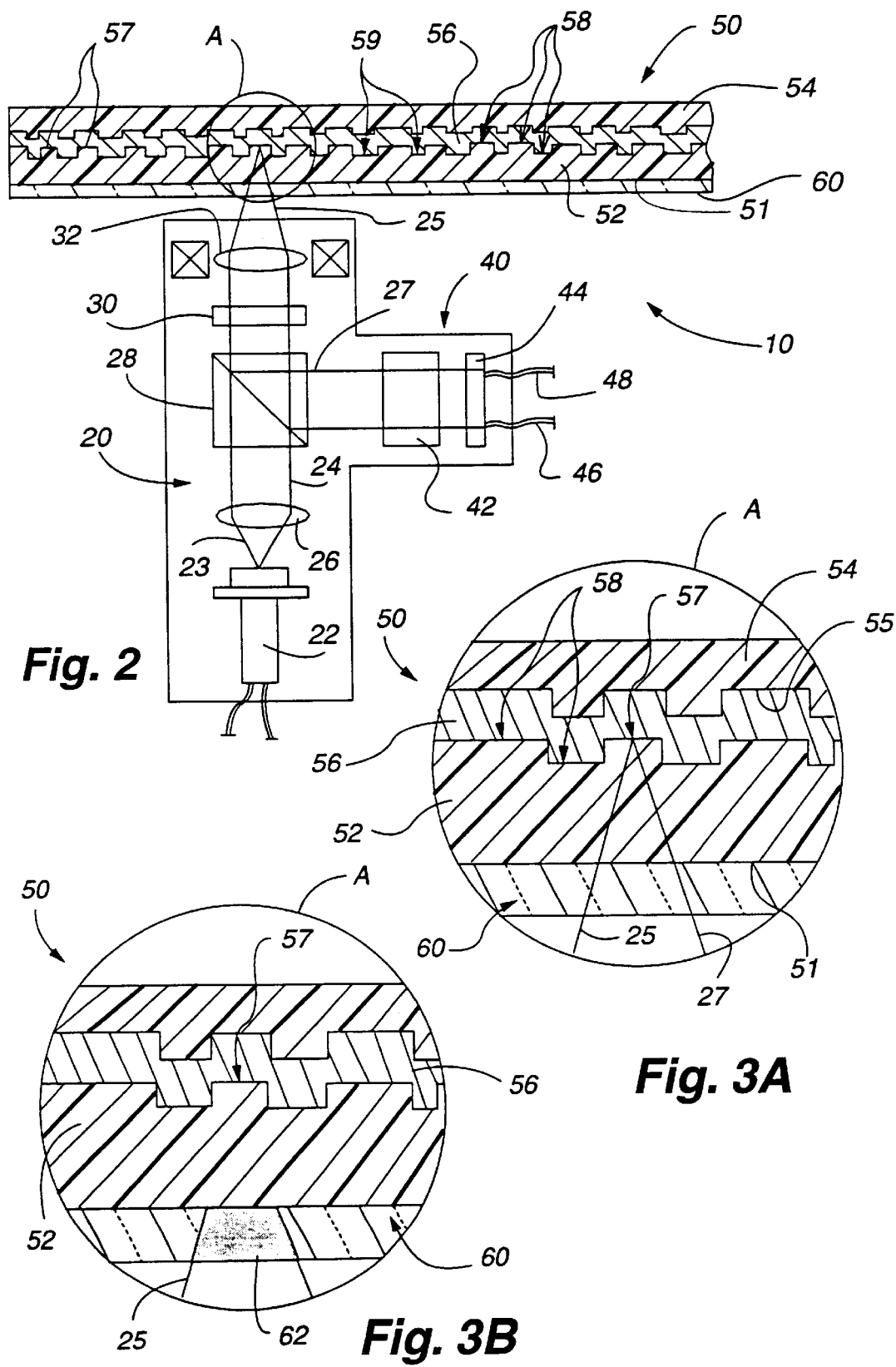

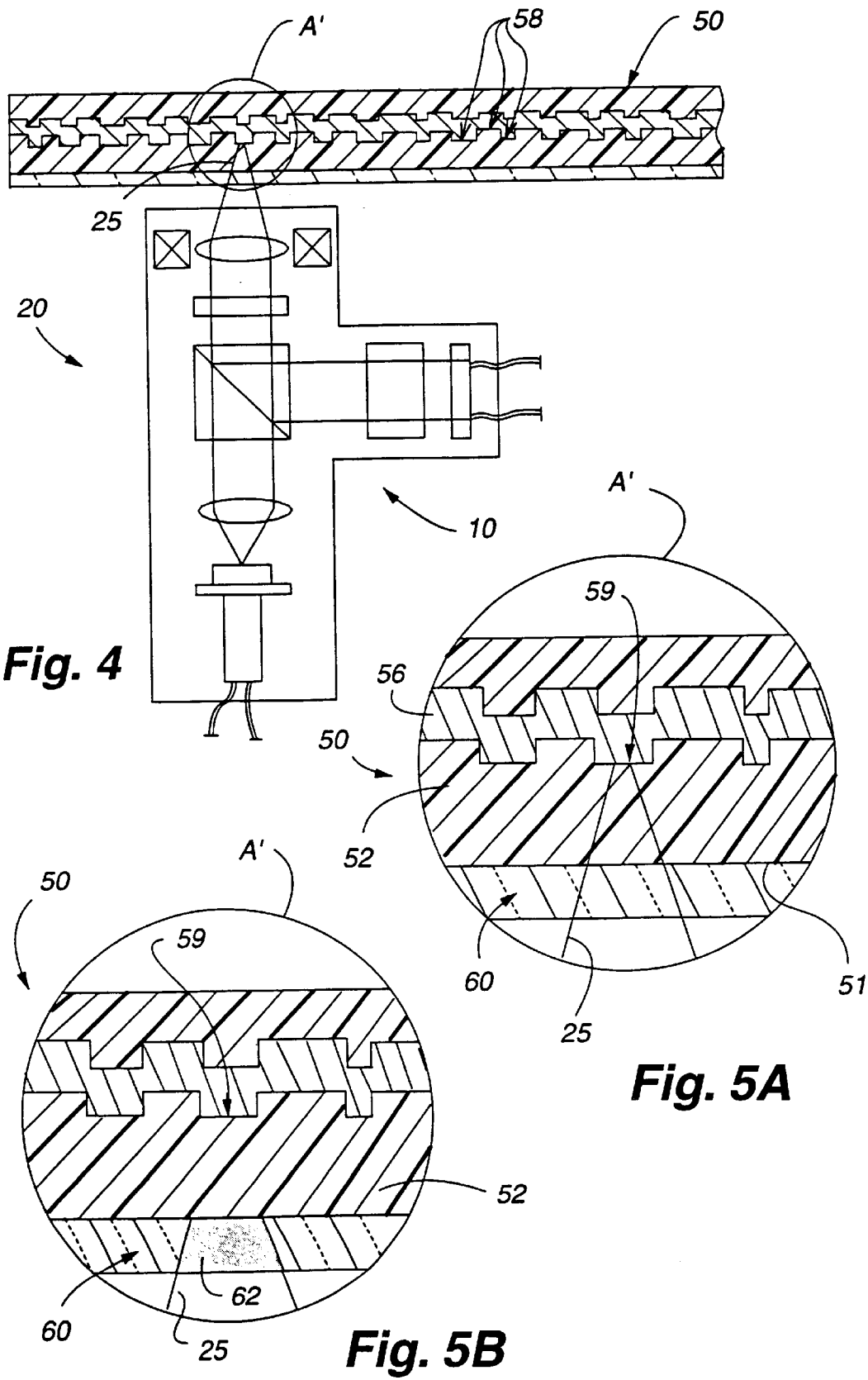

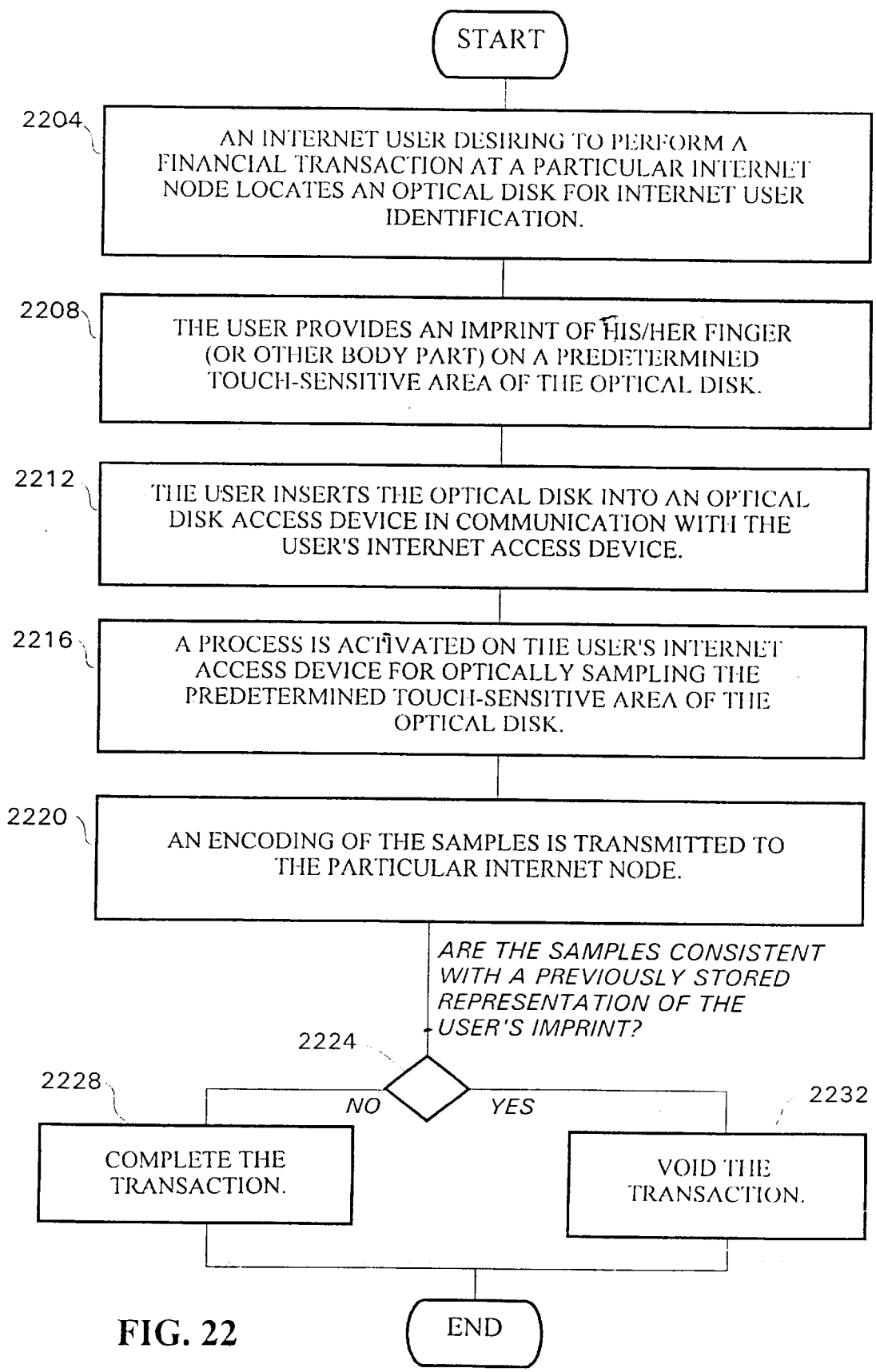

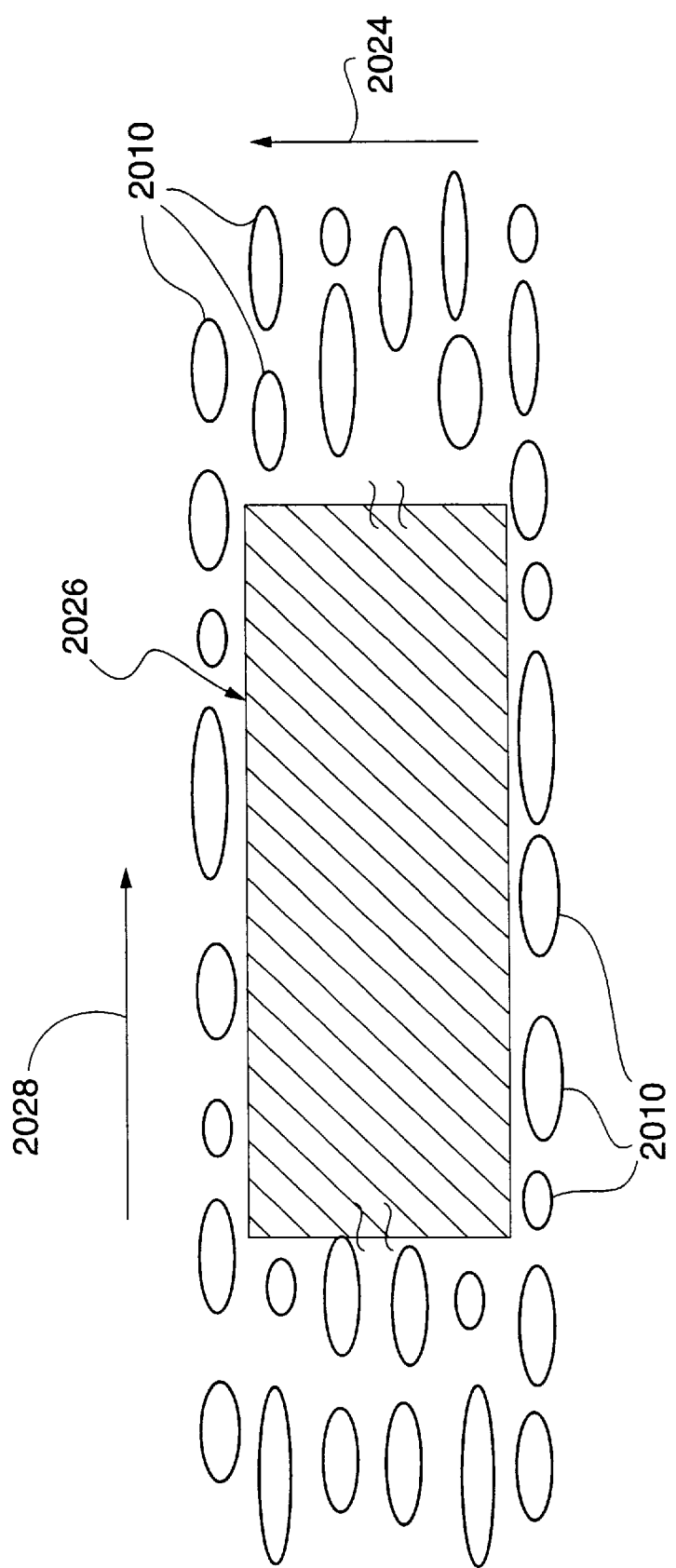

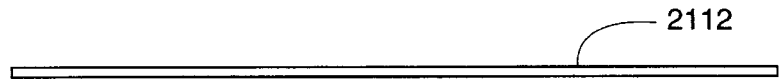
*Fig. 26D*
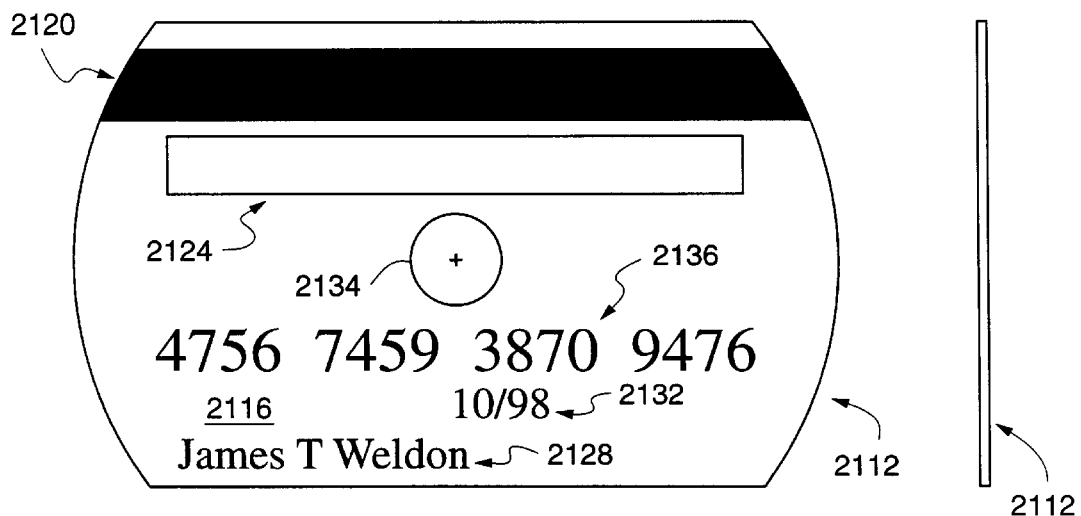
*Fig. 26A*  *Fig. 26C*
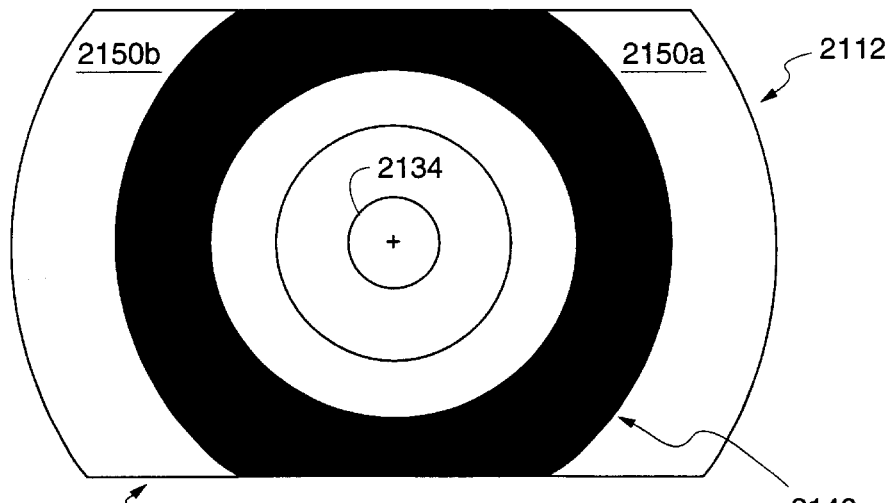
*Fig. 26B*

DATA PROTECTION ON AN OPTICAL DISK

The present application claims the benefit from both U.S. Provisional Application Serial No. 60/087,324 filed May 29, 1998 (expired) and U.S. Provisional Application Serial No. 60/063,656 filed Oct. 28, 1997 (expired). The present application is also: (a) a continuation-in-part of International Application Serial No. PCTIUS97/08842 filed Jun. 5, 1997 (pending), which claims the benefit of U.S. Provisional Application Serial No. 60/040,724 filed Mar. 14, 1997 (expired); and (b) a continuation-in-part of U.S. application Ser. No. 08/780,098 filed Dec. 24, 1996 (now U.S. Pat. No. 5,815,484 issued Sep. 29, 1998), which claims the benefit of U.S. Provisional Application Serial No. 60/009,325 filed Dec. 28, 1995 (expired). All of these prior applications are incorporated fully herein by reference in their entirety.

FIELD OF INVENTION

The present invention broadly relates to data storage media for use with optical scanning machines, which data storage media are adapted to limit access to information stored thereon. More particularly, the present invention concerns optical disks for use in an optical readout system of a computer to limit continual or repeated unrestricted access to stored data by the optical readout system. A method is also provided for limiting access to data stored in an optical medium environment.

The present invention also relates to a data storage device that provides high data storage capabilities and is easily carried by a user in that the device can be approximately the size of a credit card. In particular, the present invention can be used with both conventional magnetic card swipe readers and optical disk readers. Thus, in one embodiment, the present invention may be viewed as a combination of a typical credit card with a (magnetic or optical) strip that is read via swiping the present invention through a card swipe reader and an optical disk such as a mini compact disc (e.g., DVD).

BACKGROUND OF THE INVENTION

The computer industry has long been plagued by the illegal misappropriation of software products. The Software Publisher's Association (SPA), an organization with devotes significant resources to tracking and analyzing piracy problems, has determined that in 1994 alone the personal computer software industry lost in excess of $8 billion due to illegal copying of business application software. The SPA further estimated that virtually half of the business software in use in 1994 was pirated, and this estimate does not include the illegal copying of operating systems, education, entertainment or personal productivity software. The piracy problem is particularly acute in more developed markets such as the United States.

Many approaches have been implemented by software producers in an effort to combat piracy. Some of these approaches include encryption, special data formatting complex installation procedures, and passwords, to name only a few. Unfortunately, end user resistance to these anti-piracy schemes has been high because they are plagued by one or more limitations, such as an inability to "try before you buy", restrictions on the generation of legitimate back-up copies, and password protection techniques which fail once the password is divulged or discovered. The inability of copy protection schemes to win end-user acceptance has been so extreme that many publishers have simply abandoned the effort, choosing instead to rely on the integrity of their customers to abide by copyright laws.

The misappropriation of software is rampant irrespective of whether the data storage medium is magnetic or optical. Magnetic storage disks are particularly susceptible to piracy. Commercially available magnetic disks, such as the conventional floppy disk, are read/write/erase memory devices in which data is stored in a magnetizable surface layer as discrete patterns of magnetism. Information is stored and retrieved by a read/write head which contains a coil wound around an iron core.

While the magnetic recording medium remains the most popular, there has been a growing trend in recent years to utilize an optical medium environment for the storage and retrieval of data. The reason for this trend is readily apparent. A commercially available magnetic floppy disk is only capable of storing 1.44 Mb of data, whereas an optical CD-ROM of the same size can have a capacity in excess of 600 Mb.

In a typical optical disk for use in a computer's optical readout system, data is stored as a series of lands and pits. This is accomplished by stamping along spiral tracks on a transparent plastic disk, overlaying this with a reflective coating, and thereafter superimposing a protective layer over this coating. Light from a semi-conductor laser is focused onto either the lands or pits from below and the reflected light impinges upon a photodetector which converts the presence or absence of the pits into a binary electrical signal. Because the focused laser spot is so minute, the amount of information that can be stored onto the surface of the disk is immense. Adjacent tracks need only be spaced apart by approximately 0.6 $\mu$m and, hence, 20,000 tracks may be available on a conventional 120 mm diameter (5 inch) optical disk. The electrical signals delivered to the optical readout system correspond to the magnitude of the reflected light which either increases or decreases due to interference and/or diffraction by the preformatted data structures.

In the 1970's, researchers began attempting to encode information on optical disks with lasers, and the video disk was subsequently developed. In the 1980's, more sensitive materials that could be encoded with a low power diode laser were developed. These diode lasers, operating at a wavelength of approximately 800 nm, are now universally employed to read audio and computer CD's. Following the advent of compact disks which are capable of being read with a laser diode, researchers have now endeavored to develop a marketable compact disk upon which data can be recorded by an end user. The benefit of this capability, as discussed above, is that optical laser recording provides a much higher information density than magnetic recording.

Presently, there is a write once and read many times (WORM) compact disk. This compact disk utilizes a dye that irreversibly changes state when exposed to a high power laser diode and maintains this state when read with a low power reading laser. As such, detection of the encoded data by the optical readout system does not affect the encoded data.

It is anticipated that the next generation of optical disks will be capable of being written on, read, erased and rewritten on, etc. many times, similar to a magnetic disk. A photochromic material, or chromophore, is attractive for this purpose. Photochromism is the phenomenon whereby the absorption spectrum of a molecule or crystal changes reversibly when the material is irradiated by light possessing certain wavelengths. Thus, for example, a colorless compound may change its molecular state to a quasi-stable colored state when radiated by ultraviolet (UV) light, yet be returned to the colorless state upon exposure to visible light.

Both organic and inorganic materials which exhibit these properties have been known for years.

Recently, photochromic compounds have attracted much attention in the field of optical recording. As discussed in Jun'Etsu Seto, *Photochromic Dyes*, the photochromic materials initially studied for such an application did not have significant sensitivity in the infrared region near 800 nm, the wavelength region of conventional laser diodes. Seto recognizes, however, that a specific class of photochromic compounds, known as spiropyrans, can be manipulated to exhibit improved sensitivity in the infrared region. Specifically, Seto discusses a class of photochromic spiropyrans with benzothiopyran units in the molecular framework and concludes that the synthesized spirobenzothiopyran is well suited to the requirements of erasable optical recording media for systems using conventional laser diodes.

Another dye of the spiropyran class, having the chemical composition 6-nitro-1'3'3'-trimethylspiro[2H-1-benzothiopyran-2,2'-indoline], or 6-nitro-1-SBIPS for short, is discussed in Tarkka, Richard U., Talbot, Marc E., et al., "Holographic Storage in a near-ir sensitive photochromic dye", *Optic Comm*. 109, 54–58 (1994). This article discusses the use of 6-nitro-1-S-BIPS for use in the holography field wherein the dye becomes colored when exposed to light having a wavelength of 780 nm. The film returns to a quasiclear state upon exposure to an ultraviolet light source at 337 nm.

It is anticipated, based on these recent developments, that the conventional magnetic disk will eventually become obsolete due to the recent developments in optical storage technology. Concurrent with this anticipated phaseout of magnetic disks will be a need to adequately address the piracy issues which have for so long plagued the software industry so that the illegal misappropriation of proprietary rights can be thwarted. Accordingly, while past research has concentrated on utilizing photochromic materials for the recording of information on compact disks, the present inventors have realized that similar photochromic materials may also be used to protect the compact disk against illegal copying and distribution. In addition, the present inventors have also recognized that certain other photoreactive materials, as well as oxygen reactive materials, may be employed for this purpose. That is, compounds such as these may be used to deny access to a specially coated compact disk beyond one or more authorized uses. That is, such compounds, when applied as a coating on a disk, operate to effectively change its light transmissive properties upon exposure to a low power reading laser, thereby darkening the coating on the disk and rendering data undetectable by an optical readout system. Moreover, the inventors have also recognized other optical media data protection techniques for the present invention that also address the unrestricted duplication of information as discussed hereinabove.

Additionally, the need for individuals to easily carry potential large amounts of personal data is becoming increasingly desirable. For example, it is desirable for individuals to carry with themselves their entire medical history, including x-rays and MRIs. Moreover, detailed financial transaction data regarding items purchased and funds available, as well as lines of credit and credit history, may be desirable for a user to easily carry. However, presently known devices for transporting such large amounts of data do not lend themselves to being carried in, for example, a wallet or purse. That is, there have heretofore been no known, readily available devices for reading and/or writing data to/from portable data storage devices, wherein the data storage devices are capable of being carried in a wallet or purse, and wherein large amounts of data (e.g., 50–100 megabytes or more) may be stored.

Accordingly, it would be advantageous to have portable personal data storage devices that can easily fit in a wallet or purse. In particular, it would be advantageous to have such a device having substantially the dimensions of a credit card. Further, it would be advantageous to have such a device wherein the high data storage capabilities of such a device could be easily read from or written to using substantially conventional data read and/or write devices such as compact disc readers and magnetic card swipe readers.

The need for individuals to easily carry potential large amounts of personal data is becoming increasingly desirable. For example, it is desirable for individuals to carry with themselves their entire medical history, including x-rays and MRIs. Additionally, detailed financial transaction data regarding items purchased and funds available, as well as lines of credit and credit history, may be desirable for a user to easily carry. However, presently known devices for transporting such large amounts of data do not lend themselves to being carried in, for example, a wallet or purse. That is, there have heretofore been no known, readily available devices for reading and/or writing data to/from portable data storage devices, wherein the data storage devices are capable of being carried in a wallet or purse, and wherein large amounts of data (e.g., 50–100 megabytes or more) may be stored.

Accordingly, it would be advantageous to have portable personal data storage devices that can easily fit in a wallet or purse. In particular, it would be advantageous to have such a device having substantially the dimensions of a credit card. Further, it would be advantageous to have such a device wherein the high data storage capabilities of such a device could be easily read from or written to using substantially conventional data read and/or write devices such as compact disc readers and magnetic card swipe readers.

SUMMARY OF INVENTION

It is an object of the present invention to provide a new and useful optical medium, such as an optical disk, and system therefor which is adapted for use with an optical readout system of, for example, a computer, wherein the readout system includes a light source operative to produce an interrogating beam of light for reading data structures on the optical medium.

Another object of the present invention is to provide such an optical medium which is particularly adapted to prevent unrestricted access to encoded information thereon by an optical readout system, wherein the information may be, for example, graphical data, video data, audio data, text data, and/or a software program.

Another object of the present invention is to use the error detection capabilities of a conventional optical medium reader for: (a) determining a status of an optical medium provided by the present invention, and/or (b) verifying an object or person as authentic. That is, it is an object of the present invention to use the errors detected on the optical medium for (a) and/or (b) above. For example, the total number of errors detected in a predetermined area of the optical medium, the density of the errors detected in a predetermined location of the optical medium, and/or the pattern of errors in a predetermined area of the optical medium provides, according to the present invention, sufficient information for (a) and/or (b) above.

Another object of the present invention is to provide verification or authentication of information provided on or with the novel optical medium of the present invention. For example, the present invention may be used for verifying the authenticity of an optical disk having an audio and/or multimedia presentation thereon. Additionally, when the optical medium of the present invention is incorporated into, for example, a financial transaction card, the card can be verified as authentic.

Another object of the present invention is to provide verification or authentication of a user that is, for example, desirous of making an electronic financial transaction such as on the Internet.

A further object of the present invention is to provide a new and useful optical disk which is relatively easy to manufacture without substantial increases in costs.

Yet another object of the present invention is to provide a methodology of limiting access to information stored on an optical medium for use in a computer's optical readout system.

Still a further object of at least some embodiments of the present invention is to provide an optical disk which is particularly constructed so that an end user is unaware of the disk copy protection features until after they have been performed.

A first collection of embodiments of the present invention accomplishes these objectives by providing an article of manufacture (e.g., an optical disk) that is adapted to be encoded with data and further adapted so that duplication of the data by an optical scanning machine (i.e., an optical readout system) may be restricted. The article of manufacture comprises a substrate fabricated from a selected material, with a surface thereof provided with the data. A reactive compound is formed as a coating on at least a portion of the substrate surface and the reactive compound operates to change from an optically transparent state to an optically opaque state in response to irradiation for an accumulated duration of time by infrared light having desired characteristics, thereby to prevent light from the optical scanning machine from penetrating the reactive compound and to render the data undetectable by the optical scanning machine.

More particularly, an optical disk is provided which is adapted for use in an optical readout system of a computer wherein the optical readout system includes a light source operative to produce an interrogating beam of light for reading data structures. Broadly, the optical disk according to the first collection of embodiments of the present invention includes an inner layer having an upper surface and a lower surface, with the lower surface thereof encoded with information stored as a plurality of data structures that are readable by the interrogating beam of light. The outer layer is disposed in a confronting relationship with the lower surface, and a film of a reactive compound is superimposed over at least some of these data structures. The reactive compound is selected to be of a type which is operative to change physical characteristics in response to a selected stimulus, thereby to affect readability of the data by the interrogating beam.

Preferably, the optical disk includes a layer of reflective material interposed between the lower surface and the reactive compound. This reactive compound may be supported on a lower surface of the disk's second layer and have a thickness of approximately 2–5 microns or, alternatively, it may be interposed between the lower surface and the disks outer layer. The lower surface is preferably contoured to include a sequence of pits and lands which define the plurality of data structures, with the reactive compound superimposed over at least some of these pits and lands.

The selected stimulus to which the reactive compound responds is an ambient environment selected to be either visible light, infrared light, light and oxygen, or simply air. Where the stimulus is light alone, the reactive compound may be a photoreactive material and preferably one selected from a spiropyran class of photochromic compounds. One such compound may be 6-nitro-1'3'3'-trimethylspiro-[2H-1-benzothiopyran-2,2'-indoline], or 6-nitro-1-S-BIPS for short. Such a photochromic compound is operative to change from an optically opaque or darkened condition in response to an interrogating beam wavelength of approximately 780 nanometers (nm) and thereafter return to an optically transparent condition in response to a irradiation by a beam of light having a wavelength of approximately 337 nanometers (nm).

Where the stimulus is a combination of light and oxygen, the reactive compound would therefore be photoreactive with oxygen and preferably operate to change its physical characteristics in response to an interrogating beam of light having a wavelength of approximately 650 nanometers (nm) which is encountered with digital versatile disk (DVD) readers.

Where the environmental stimulus is simply air (more precisely, oxygen), the reactive compound may be one which is operative after an accumulated duration of time to oxidize and alter an optical characteristic thereof. For example, such a reactive compound would change from an optically transparent condition to an optically opaque condition wherein it absorbs light having a wavelength within a desired range. This wavelength could be either 650 nanometers (nm), as discussed above, but may also be in the range of 780 to 820 nanometers (nm). The oxidizing reactive compound may be selected from a group of dyes consisting of methylene blue, brilliant cresyl blue, basic blue 3 and toluidine blue 0.

A methodology of limiting access to data stored on an optical medium such as an optical disk is provided by the first collection of embodiments. Broadly, this methodology comprises the steps of rotating an optical disk in a disk drive at a selected rotational speed, with the optical disk including a substrate layer encoded with information stored thereon as a plurality of readable data structures. A reactive compound is preferably superimposed over at least some of these data structures and this reactive compound operates in an ambient environment containing oxygen to change optical transmission in response to irradiation for an accumulated duration of time by light having a beam wavelength that is within a selected range. An interrogating beam of light having a beam wavelength that is within the selected range is directed toward the substrate layer and through the reactive compound for the accumulated duration of time.

The step of directing the interrogating beam may be accomplished by directing the beam at the substrate layer for a continuous interval of time that is sufficient to cause the change in optical transmission through the optical medium. Alteratively, the interrogating beam may be directed at the substrate layer for a plurality of discrete intervals of time sufficient to cause such change. Where this is the case, it is contemplated that the interrogating beam may be selectively advanced radially across an outermost surface of the optical disk until the beam interacts with the reactive compound for the plurality of discrete intervals of time. The interrogating beam's wavelength may be approximately 780 nanometers (nm) where a CD-Rom optical disk is utilized, or have a wavelength of approximately 650 nanometers (nm) which is the wavelength employed for digital versatile disks (DVD). Preferably, the interrogating beam also has an intensity of approximately 1 milliwatt (mW) of power, which is typically encountered in conventional optical readers.

In a second collection of embodiments of the present invention, a method and apparatus are provided for prohibiting unrestricted duplication of information on an optical medium such as an optical disk, wherein the user manually affects a physical change to the optical disk during an initial use of the optical disk. For example, the user may activate or perform a predetermined procedure for rendering one or more predetermined areas or locations of the optical disk unreadable or more error prone. This in effect "marks" the optical disk both visually to the user and computationally to a program for accessing information on the optical disk (e.g., graphical data, video data, audio data, text data and/or a software installation program) as having been previously used for accessing the information on the optical disk. Thus, in a subsequent attempt to access the information on the optical disk (e.g., a subsequent attempt to view a multimedia presentation such as a movie, or a subsequent attempt at reinstallation of a software application on the optical disk), it is possible to detect that the information on the optical disk has been previously accessed due to a change in the information on the disk that is able to be read by an optical reader. For example, the optical reader may detect a greater number of read errors than when the optical disk was first accessed for information retrieval.

Alternatively, in other embodiments of the present invention, instead of purposefully creating unreadable portions of the optical disk, a converse method and apparatus may be employed wherein a predetermined portion of the optical disk is initially unreadable and subsequently becomes readable. That is, a mask or covering may be attached to the optical disk during manufacture so that a predetermined portion of information on the optical disk is initially unreadable by an optical reader, but upon initial use of the optical disk, the user physically removes or changes the mask, thereby allowing a sufficient amount of the previously unreadable portion underneath the mask to be read. Accordingly, optical disk accessing software can be performed that detects a state change in the optical disk due to the removing or changing of the mask.

It is a further aspect of at least some embodiments of the present invention that an encoded identifier is provided to a user upon first use of an optical medium of the present invention. Such an encoded identifier is particularly useful for prohibiting unwanted duplication and/or use of commercial software since the identifier is derived from a unique physical change of the optical disk, and, for example, serial numbers of the installation computer. Thus, the encoded identifier, when supplied during a reinstallation attempt and decoded, allows the present invention to determine whether the user is attempting to install the software on a computer different from the original installation. Thus, upon detecting a state change indicating the software has been previously installed, the present invention may restrict various kinds of access to the information on the optical medium. In particular, if the optical disk provides software programs that may be installed on a user's computer, installations beyond the initial installation may be prohibited if the installation is not on the same computer as the initial installation.

Other collections of embodiments of the present invention are also provided hereinbelow. In particular, collections of embodiments are described relating to verification and/or authentication of financial transaction cards or financial transactions.

Additionally, embodiments of personal data storage cards are provided by the present invention. In particular, a data storage card is provided that includes data stored thereon using a combination of data storage mediums including a magnetic strip, and an optical storage portion (e.g., one of an optical disk or a magneto optical disc). The card of the present invention is sufficiently small (e.g., approximately 2⅛ inches by 3⅜ inches so that it can be used as a typical identification/financial transaction card wherein data included on the magnetic strip of the card can be swiped through a conventional magnetic strip reader for reading data from the card. Furthermore, the optical data storage portion of the card is capable of being read by a compact disc reader and/or a DVD reader when the card is rotated on the reader's optical disc spindle via the spindle penetrating hole in the card. That is the card can be used as a conventional optical disc.

Other features and aspects of the present invention will become evident from the detailed description and the accompanying figures herewith.

BRIEF DESCRIPTION OF DRAWINGS

FIG. 1 is a perspective view of an optical readout system utilizing an optical disk (shown in partial phantom) according to the present invention;

FIG. 2 is a side view in elevation, and in partial cross-section, showing the optical readout system's interrogating beam positioned beneath a first type of data structure stored on an optical disk according to a first exemplary embodiment of the present invention;

FIG. 3A is an enlarged cross-sectional view of area "A" in FIG. 2;

FIG. 3B is an enlarged cross-sectional view of area "A" in FIG. 2 after an accumulated duration of time so that the reactive compound associated with the optical disk of the first exemplary embodiment of the present invention has undergone a change in its physical characteristics;

FIG. 4 is a side view in elevation, and in partial cross-section, showing the optical readout system's interrogating beam positioned beneath a second type of data structure stored on the optical disk according to the first exemplary embodiment of the present invention;

FIG. 5A is an enlarged cross-sectional view of area "A'" in FIG. 4;

FIG. 5B is an enlarged cross-sectional view of area "A'" in FIG. 4 after an accumulated duration of time so that the reactive compound associated with the optical disk of the first exemplary embodiment of the present invention has undergone a change in its physical characteristics;

FIG. 8 is a perspective view, partially pealed away, of a package for containing an optical disk utilizing any one of a variety of reactive compounds according to the present invention;

FIG. 9 is a bottom plan view showing a variety of applications for the reactive compound associated with an optical disk according to the present invention;

FIGS. 14A and 14B illustrates cross-sections of the optical disk of FIGS. 13A and 13B, wherein FIG. 14A shows the chemical container prior to rupturing and FIG. 14B shows the chemical container after rupturing;

FIG. 20 illustrates the embodiment of the present invention shown in FIGS. 19A and 19B, wherein FIG. 20 shows the cross-section of the optical disk after the chemical container is ruptured.

FIG. 22 is a flowchart of the steps performed in the present invention in verifying the identity of user requesting to perform an electronic financial transaction via, for example, the Internet;

FIG. 25 is similar to FIGS. 23 and 24, except that the intentionally manufactured defect 2026 spans multiple rows or tracks on the optical disk;

FIGS. 26A through 26D show various orientations of a first embodiment of the carddisc 2112 of the present invention;

DETAILED DESCRIPTION

Figures 6A, 6B:
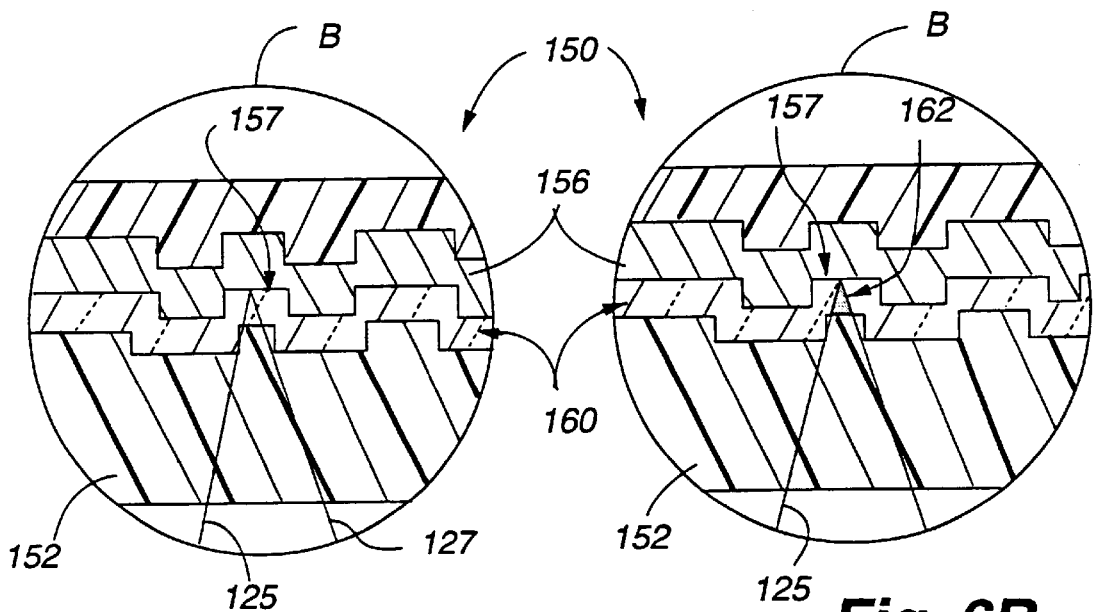
FIG. 6A is an enlarged cross-sectional view of an area "Bl" of an optical disk according to a second exemplary embodiment of the present invention, with the optical readout system's interrogating beam positioned beneath a first type of data structure stored thereon.
FIG. 6B is an enlarged cross-sectional view of the same area "B" after an accumulated duration of time so that the reactive compound associated with the optical disk according to the second exemplary embodiment of the present invention has undergone a change in its physical characteristics.

The present invention is, in one sense directed to an optical disk for use in a computer's optical readout system, which optical disk is constructed to prohibit unrestricted access, by the readout system, to information stored on the disk. As such, the optical disk of the present invention is particularly adapted as an alternative approach for combating the growing piracy problems resulting from the illegal misappropriation of software products. As will be appreciated, the present invention is also directed to a methodology for limiting access to data stored on an optical medium. While both the optical disk of the present invention and the methodology for utilizing the same in a computer's optical readout system is described herein with reference to a conventional CD ROM disk, the ordinarily skilled artisan would readily appreciate that the teachings of the present invention may also be applied to other types of optical disks, such as audio CD's, WORM (Write Once Read Many) optical disks, and DVD (Digital Versatile Disks), to name only a few.

With this in mind, then, a typical optical readout system 10 of a computer incorporating an optical disk according to the first exemplary embodiment of the present invention is introduced in FIGS. 1 and 2. Optical readout system 10 broadly includes a disk drive 12 which is operative to rotate an optical disk 50 at a selected rotational speed, a light source 20 for producing an interrogating beam of light and a detector 40 which is operative to collect a returned component of the interrogating beam and to produce an output signal correlated to this returned component.

More specifically, and as is known in the art, disk drive 12 includes a motor 14 comprising a drive shaft 16 and a spindle 18 to which the CD-Rom optical disk 50 is mounted, and this motor 14 operates to constantly vary the rate at which the optical disk 50 is spun so that, regardless of where detector 40 is located in relation to the radius of optical disk 50, the portion of disk 50 located immediately above detector 40 is always moving at the same rate. Unlike conventional magnetic disks, which are divided radially into sectors and spin at a constant angular velocity, data on a CD-Rom disk is contained in a single track that spirals from the center of the disk to its circumference. This track is still divided into sectors, but each sector is the same physical size. Using a method known as constant linear velocity, the disk drive 12 constantly varies the rate at which (optical disk) 50 spins so that as detector 40 moves toward the center of the optical disk 50 the disk increases its rotational speed. The effect of this is that the optical disk 50 can contain more sectors than a conventional magnetic disk and, consequently, more data.

Light source 20 generates an incident or interrogating beam of light via laser diode 22 and this beam 23 is initially collimated by collimator 26. The collimated beam 24 is then directed toward a polarized beam splitter, or prism 28, after which it is sent through a quarter wave plate 30. Alternatively, for optical readout systems wherein the laser diode 22 and collimator 26 are offset in position relative to beam splitter 28, a wedge mirror prism may be employed to direct the beam in an axial direction relative to optical disk 50. After collimated beam 24 encounters quarter wave plate 30 it is thereafter directed through an objective lens 32 and an appropriate focusing coil to produce a concentrated and focused interrogating beam 25.

Focused interrogating beam 25 penetrates substrate 52 of optical disk 50 and typically strikes a metallic reflective layer 56 that is coated on the substrate 52. Metallic layer 56, itself, is encoded with information stored as a plurality of data structures 58 and is specifically contoured to include a sequence of lands 57 and pits 59 which define these data structures 58. This may be accomplished with a conventional stamping process wherein metallic layer 56 is pressed into substrate 52 to create pits 59. Lands 57 are those areas which are not pressed and remain in their original position. Metallic layer 56 is approximately 1 micron thick and pits 59 are, by design, only one quarter wavelength of the wavelength of interrogating beam 25. Lands 57 and pits 59 correspond to the 1's and 0's used to store data information. The interrogating beam 25 from laser diode 22 is focused at the surface level of lands 57, as shown. Whereas, light that strikes a pit 59 is scattered, light that strikes a land 57 is reflected as a returned beam 27 and directed back through polarized beam splitter 28. Beam splitter 28 deflects the returned beam 27 towards a tracking error detector 42, which controls tracking and focusing of the laser beam to sub-micron levels, and ultimately to light detecting photo diode 44. Light that strikes photo diode 44 generates a small electrical voltage at electrical leads 46, 48 and these voltages are matched against a timing circuit to generate the stream of 1's and 0's that the computer can understand. Accordingly, photo diode 44 converts the presence or absence of lands into an electrical signal.

The construction of a first exemplary embodiment of optical disk 50 may better be appreciated now with reference to FIG. 3A which is an exploded view of area "A" in FIG. 2. Optical disk 50 is constructed somewhat similarly to CD-Rom disks or audio compact disks now available. That is, as discussed above, optical disk 50 includes a substrate 52 and a metallic layer 56 upon which a protective coating 54 is placed. The metallic layer 56 is formed so that it is encoded with the information stored thereon as the plurality of data structures 58 that are readable by interrogating beam 25. Substrate layer 52, which may be formed out of polycarbonate, is disposed in a confronting relationship with metallic layer 56. As shown, metallic layer 56 is interposed between a lower surface 55 of protective coating 54 and substrate 52.

Unique to the present embodiments of the invention, though, is the inclusion of a film of reactive compound 60 that is superimposed over at least some of data structures 58. This reactive compound 60 is selected to be of a type which is operative to change physical characteristics in response to a selected stimulus, and thereby to affect readability of the information by interrogating beam 25.

In this first exemplary embodiment of optical disk 50, reactive compound 60 is formed as a coating on a lower surface 51 of substrate 52. In alterative embodiments, the reactive compound may be:

(a) interposed between the metallic layer 56 and the inner surface of substrate 52 as discussed more thoroughly below with reference to FIGS. 7A–7D, or (b) embedded within the substrate 52. The selected environmental stimulus to which the reactive compound responds, regardless of its location in the optical disk, will also be discussed more thoroughly below with reference to certain classes of chemical materials from which the reactive compound may be chosen. Briefly, however, for each environmental stimulus to which the reactive compound responds, the reactive compound changes its optical transmission characteristics from an optically transparent condition to an optically opaque condition whereby it masks the data structures and affects the integrity of the electrical signal generated by the computer's optical readout system.

For example, FIGS. 3A and 3B illustrate how the integrity of the optical readout system's electrical signal is affected when the interrogating beam 25 encounters a land 57. As shown in FIG. 3A, interrogating beam 25 initially is able to penetrate both the reactive compound 60 and substrate 52 to detect the presence of land 57, which for purposes of discussion only, may correspond to data information in the form of the binary 1. Accordingly, interrogating beam 25 is reflected off of metallic (reflective) layer 56 as a returned beam 27 which is thereafter detected by light detecting photo diode 44, resulting in the generation of an electrical signal correlated to land 57.

However, and as may now be seen with reference to FIG. 3B, after an accumulated duration of time, a region 62 of reactive compound 60 changes its physical characteristics to an optically opaque condition whereby interrogating beam 25 is absorbed by the reactive compound 60 and is no longer able to penetrate the substrate 52 to detect the presence of land 57. Therefore, light detecting photo diode 44 does not receive a returned beam, as expected, and generates an improper electrical signal to the computer. As far as the optical readout system 10 is concerned, the interrogating beam 25 is positioned directly beneath a pit as opposed to a land, resulting in an incorrect data transferred to the computer.

FIGS. 4 and 5A–5B illustrate the situation where interrogating beam 25 is positioned directly beneath a data structure 58 in the form of a pit 59. It may be appreciated that, here, light source 20 has been advanced either radially or circumferentially across the outer surface 51 of substrate 52 to a different location as dictated by the computer's program. Looking at the exploded area A' in FIG. 5A, it is seen that interrogating beam 25 is initially able to penetrate both reactive compound 60 and substrate 52 and impinge upon metallic layer 56 which coats land 57. Because reflective material 56 in this region is not positioned at the level of the interrogating beam's focal point, interrogating beam 25 is scattered. Thus, either no returned beam is reflected or an insufficient amount of light is reflected back to photo diode 44, thereby resulting in the generation of a binary electrical signal by detector 40 which corresponds to the presence of the encountered pit 59. This is the expected result.

After an accumulated duration of time, the region 62 of reactive compound 60 which is exposed to interrogating beam 25 becomes darkened or opaque. Light in this region 62 is absorbed and not allowed to penetrate substrate 52 to detect the presence or absence of pit 59. The result is, therefore, the same in that detector 40 generates a binary electrical signal, such as a zero, corresponding to the presence of a pit.

A second exemplary embodiment for the optical disk according to the first collection of embodiments may now be appreciated with reference to FIGS. 6A–6B and 7A–7B. Here, the reactive compound 160 of optical disk 150 is shown to be interposed between the substrate 152 and metallic layer 156. While it is inherently more difficult to manufacture optical disk 150 than it would be to manufacture optical disk 50 which is referenced in the first exemplary embodiment of the present invention, the construction of optical disk 150 may be preferred from a performance standpoint because reactive compound 160 is located in a region where interrogating beam 125 would have a greater beam intensity than would beam 25 due to its relatively reduced focal width in this region. For all practical purposes, however, the results would nonetheless be the same.

Figures 7A, 7B:
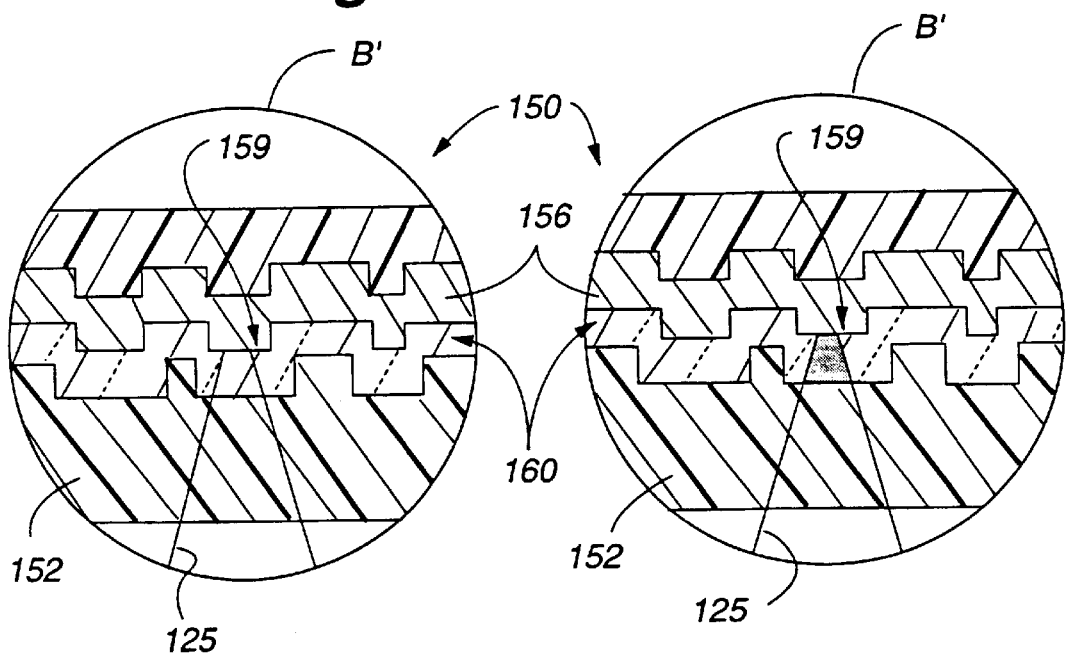
FIG. 7A is an enlarged cross-sectional view of an area "B'" of an optical disk according to a second exemplary embodiment of the present invention, with the optical readout system's interrogating beam positioned beneath a second type of data structure stored thereon.
FIG. 7B is an enlarged cross-sectional view of the same area "B'" after an accumulated duration of time so that the reactive compound associated with the optical disk according to the second exemplary embodiment of the present invention has undergone a change in its physical characteristics.

For example, FIG. 6A again illustrates the situation where interrogating beam 125 is positioned beneath a land 157 such that the beam is reflected off of metallic layer 156 as a returned beam 127 which would be recognized by the detector and correctly converted into a corresponding binary electrical signal. In FIG. 6B, on the other hand, it is shown that after an accumulated duration of time, the region 162 of reactive compound 160 which has been exposed to a given environmental stimulus changes its physical characteristics from an optically transparent condition to an optically opaque or darkened condition. As such, interrogating beam 125 is absorbed in region 162 and no returned beam is detected, resulting in the generation of a binary electrical signal by the computer's optical readout system, despite the presence of land 157. In FIGS. 7A–7B, the situation is similar to that discussed above with reference to FIGS. 5A–5B. Thus, when interrogating beam 125 is positioned directly beneath a pit 159, the computer's optical readout system would generate the proper binary electrical signal irrespective of the physical characteristic of reactive compound 160 in region 162.

A. Classes of Materials for the Reactive Compound

Various classes of materials have been found which exhibit appropriate physical characteristics for utilization in the optical disk according to the exemplary embodiments of the present invention. Each of these materials responds to either a specific environmental condition, or a combination of environmental conditions, to mask the data structures on an optical disk, thereby affecting their readability by the computer's optical readout system.

1. Photo Reactive Compounds

It has been found that photoreactive materials exhibit desired light absorption characteristics and that these materials may be formed as a coating on an optical disk to mask at least some of the disk's data structures from detection by an optical readout system. Photochromes, and specifically the spiropyran class of photochromes, have particular utility. Photochromism is the phenomenon whereby the absorption spectrum of a molecule changes reversibly or irreversibly when the sample is irradiated by light having certain wavelengths. For example, a colorless compound can change to a quasi-stable colored structure when it is irradiated with infrared light. While a specific photochromic or photosensitive material of the spiropyran class is discussed herein for use in the present invention, the ordinarily skilled artisan would appreciate that other photochromic materials such as aziridine derivatives, bipyradine derivatives, diohydropyrene derivatives, fulgide derivatives, thioindigo derivatives, azobenzene derivatives, salicylideneaniline derivatives, xanthane derivatives, oxazine derivatives may also prove useful.

One spiropyran class dye, having the chemical composition 6-nitro-1'3'3'-trimethylspiro-[2H-1benzothiopyran-2,2'-indoline], or 6-nitro-1-5-BIPS for short, is discussed in Tarkka, Richard U. Talbot, Marc E., et. al, "Holographic storage in a near-ir sensitive photochromic dye." Optic Comm. 109, 54–58 (1994), the teachings of which are incorporated herein by reference. When exposed to infrared light having a wavelength of approximately 780 nanometers (nm), a wavelength which is predominantly utilized in current optical readout systems, this dye becomes colored. The dye may thereafter be returned to its optically transparent state upon exposure to an ultraviolet source at approximately 337 nanometers (nm). This ability to erase the color from the dye is not fatal in that it requires a relatively expensive and difficult to find light source. 6-nitro-1-S-BIPS is preferably applied as a coating to the substrate of an optical disk as illustrated in FIGS. 3–5 above. With this spiropyran derivative, or other appropriate chromophores, it is recognized that the environmental stimulus is simply exposure to the light sources interrogating beam.

2. Compounds Which are Photoreactive in the Presence of Oxygen

Two materials which may also be used in conjunction with the optical disk according to the present invention are photoreactive in the presence of an ambient environment containing oxygen.

a. Compound I

One such material is denoted as compound I below:

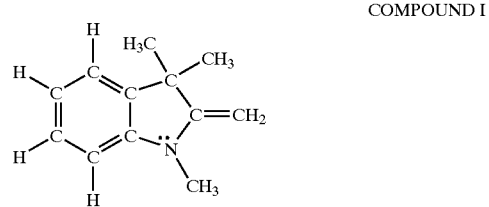

COMPOUND I

Compound 1 is made by treating tetramethylindolium iodide with 10 Molar equivalents of 1N sodium hydroxide in water with good mixing. As compound I is formed, it is extracted into the hexane co-solvent according to the following reaction:

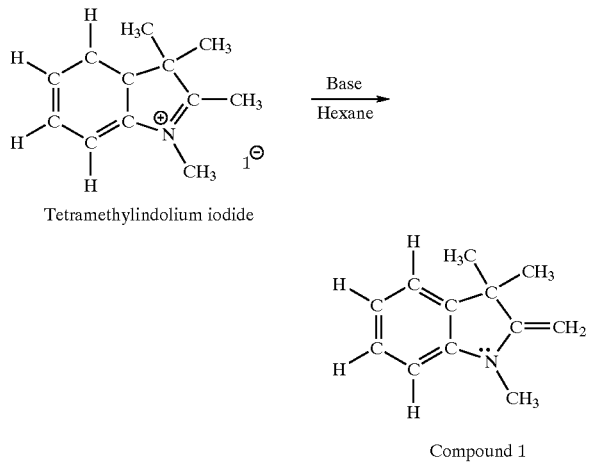

Tetramethylindolium iodide

Compound 1

Alternatively, one molar equivalent of triethylamine in dichloromethane can be used and the product can be isolated by extraction with water, evaporation of a solvent and dissolution in hexane. The aqueous base method is preferred in that it yields in excess of 80% of the desired final product.

Compound I is photoreactive with oxygen and sensitive to ambient florescent light over several (>18 hrs) exposure, is quickly (<~10 mins) photo oxidized upon exposure to an incandescent 150 W lamp at a distance of 12 inches. Compound I also reacts upon exposure to light having a wavelength of approximately 650 nanometers (nm) and an intensity approximating that of a digital versatile disk (DVD) player light source. Accordingly, compound I is useful for application to an optical disk incorporated in developed DVD drives.

b. Compound II

Another material which is photoreactive in the presence of oxygen can be made from quinoline salts and related enamine derivatives. This photoreactive material is denoted as compound II below and may be prepared, similarly to compound I, according to the following reaction:

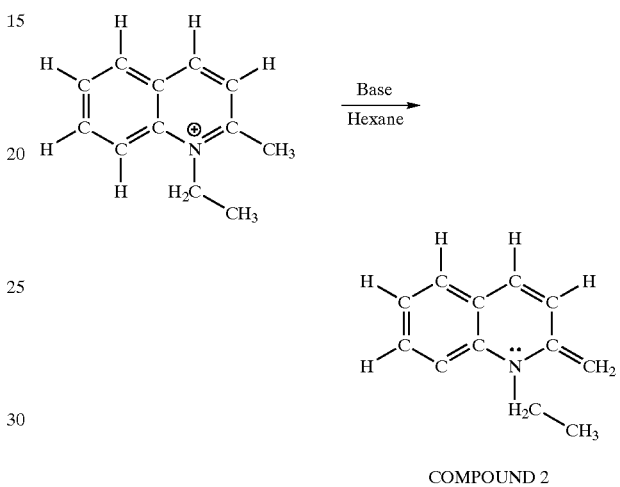

COMPOUND 2

With both compounds I and II above, it should be appreciated that the environmental stimulus which causes them to change in optical transmission is a combination of both light and oxygen. Moreover, these compounds are specifically adapted for use in a computer's optical readout system which utilizes a light source having a wavelength of 650 nanometers (nm). Because these compounds react to change their light absorption characteristics in the presence of an ambient environment containing oxygen, the required amount of time for such change varies depending upon the wavelength of the ambient light. It is, therefore, desirable that the optical disks coated with either compounds I or II, be packaged in an inert environment and/or a standard hermetic packaging. To this end, FIG. 8 shows that such an optical disk 250 is preferably contained in a package 210 in the form of an aluminum bag coated with polyethylene. Contained within package 210 is an inert gaseous environment, such as argon, nitrogen, neon, helium, or other ambient gas.

c. Materials Which are Oxygen Reactive

It has also been found that certain oxygen reactive materials may be used in an optical readout system having a light source at a selected wavelength. One class of such materials is based upon the reduced forms of the well known dye, methylene blue. The method of synthesis and the oxygen dependent reoxidation to form the colored form of the methylene blue dye is shown below:

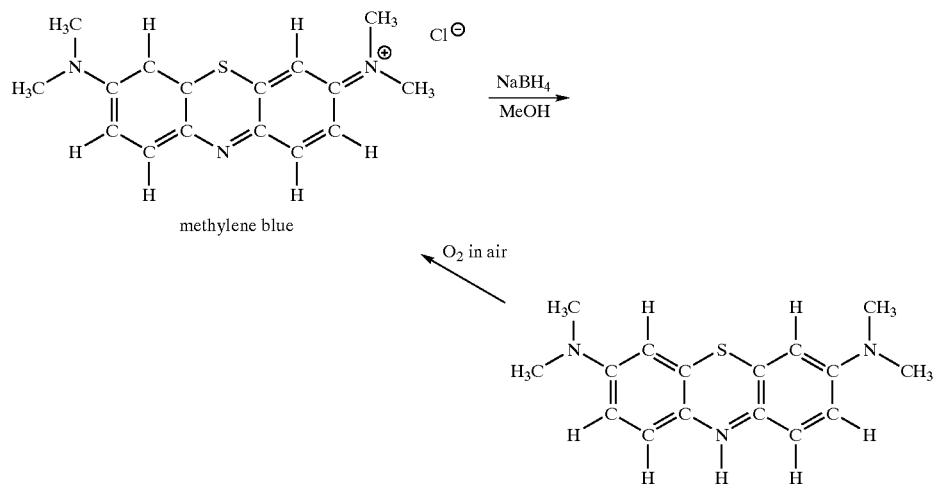

Various reducing agents can be used to reduce methylene blue and its many derivatives, with zinc and acetic acid being one possibility. The color of methylene blue when reduced is pale yellow and it quickly is re-oxidized to be dark blue by oxygen in air. The rate of this reaction is somewhat dependent on the medium, however. In polyurethane films, this rate has varied from about 10 minutes to 30 minutes depending on the concentration. When sodium borohydride residue is not quenched in these films, they gradually turn from clear to blue over several hours. The blue form of the methylene blue dye absorbs strongly at 650 nanometers (nm), the centered wavelength for DVD laser light readers.

Other dyes which are reactive in the air (e.g., to oxygen) perform similarly to the methylene blue and have maximum absorbencies that can vary by several tens of nanometers. The structures of some of these dyes known to perform like methylene blue and their commercial names are shown below:

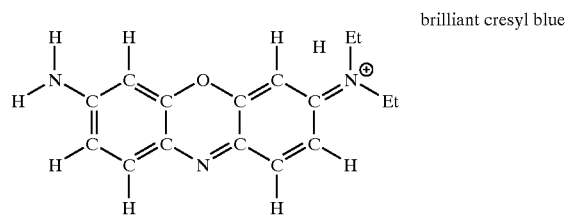

-continued

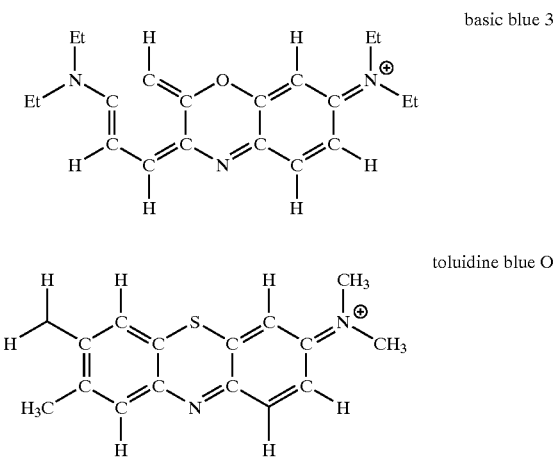

Finally, for optical readouts systems employing an interrogating beam having a wavelength of 780 nanometers (nm), a wavelength which is predominantly used in CD-Rom readers, one dye has been shown to reoxidize over approximately 48 hours and thereafter absorb light at this wavelength. The synthesis and oxidation of this dye, denoted as compound III, is shown below:

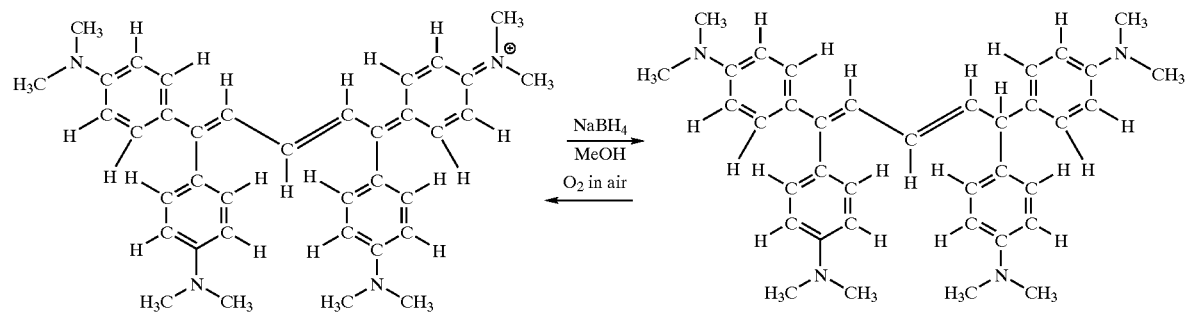

It is certainly contemplated that numerous other similar dyes can be synthesized to operate effectively in a given optical readout system. With each of the air reactive materials discussed herein, as with those materials discussed above which are photoreactive in an ambient environment containing oxygen, it is desirable to package the optical disk containing the dye in an inert environment as shown in FIG. 8.

With an understanding of the various compounds which the reactive compound of the present invention may assume, the ordinarily skilled artisan in this field would readily appreciate that the particular compound selected would depend on a variety of parameters of the operating environment. Where a CD ROM application is preferred, the reactive compound would necessarily be one that is compatible with this environment, sensitive to the infrared lasers used in the CD-Rom's optical readout system (i.e. 650 nm or 780–830 nm) and will react to the lower powered intensity of the interrogating beam (approximately 0.15 to 0.6 mW of power. For those reactive compounds which are reactive in the presence of oxygen, a user would of course be careful to avoid exposure of the optical disk to an ambient environment containing either oxygen, or light and oxygen, in order to prolong the useful life of the optical disk.

A primary thrust of the present invention is, of course, to deny access to a specially coated optical disk, and preferably a CD-Rom disk, beyond one or more authorized uses. To this end, one potential use for coating an optical disk with a reactive compound would be to allow for sample disks to be given away to customers in order for them to determine whether or not the product is worth purchasing. Once the product has been evaluated, the customer then might be required to return the product to the vendor and buy a commercial version of the sample optical disk. In one novel application of the present invention, such specially coated optical disks may have music encoded on them so that such disks are only playable for a particular period of time and/or for a particular number of times. Thus, optical disks that automatically expire are provided by the present invention. Moreover, note that movies and other multimedia presentations can be commercially provided in a similar fashion. Alternatively, a customer could purchase a coated optical disk and load it onto a computer's hard drive prior to the reactive compound changing its physical characteristics and rendering the optical disk unreadable.

Another potential application is the rental of optical disks which contain the reactive compound. Such an optical disk may be rented, much like videos cassette at a low cost and played until such time as the optical readout system of the disk player is no longer able to detect the presence or absence of the encoded information.

As shown in FIG. 9, the reactive compound may be applied to the optical disk in a variety of patterns. FIG. 9, of course, only illustrates a few such applications and others are certainly contemplated without departing from the concepts of the present invention. To illustrate, reactive compound 260 may be embossed as a film over an entire sector of optical disk 250, such as representative sectors 252 and 254. Alteratively, the reactive compound 260 may be applied to only a portion of a sector, such as region 256 in FIG. 9. Although, the entire surface of optical disk 250 could be coated with reactive compound 260, this is not a necessity, because the compound could merely be applied to that portion of the disk which contains critical information for the optical readout system to access in order for the software product to function properly.

With specific reference to the spiropyran class of photochromes discussed above, it is also anticipated that a reactive compound of this type, which is adapted to reversibly change between a darkened colored state and a transparent state, could be initially be applied in its darkened state to the surface of the optical disk. A software application residing on an optical disk for the present invention may execute properly only in the event that the optical readout system continues to process information as if no data were contained in this region. Once the photochrome changes to the transparent condition upon sufficient exposure to light, the optical readout system would be able to detect the plurality of data structures, and the software application then discontinues its proper function.

With the foregoing in mind, the first collection of embodiments of the present invention is directed to an article of manufacturer adapted to be encoded with data and further adapted so that duplication of the data by an optical scanning machine may be restricted. To this end, the article of manufacturer comprises a substrate fabrication from a selected material and having a substrate surface which contains the data. A reactive compound is formed as a coating on at least a portion of the substrate surface and this reactive compound is operative to change from an optically transparent state to an optically opaque state in response to a irradiation for an accumulated duration of time by light having selected characteristics, thereby to prevent the light from the optical scanning machine from penetrating the reactive compound and to render the data undetectable by the machine.

It should also be appreciated from the foregoing that another aspect of the present invention is a methodology of limiting access to data stored in an optical medium according to the first collection of embodiments. Broadly, this methodology comprises the steps of rotating an optical disk in a disk drive at a selected rotational speed, with the optical disk including a substrate and a metallic layer encoded with information stored thereon as a plurality of readable data structures and including a reactive compound superimposed over at least some of these data structures. The reactive compound is operative in an ambient environment containing oxygen to change optical transmission in response to irradiation for an accumulated duration of time by light having a beam wavelength that is within a selected range. The broad methodology would also include a step of directing an interrogating beam of light having a beam wavelength that is within the selected range toward the substrate and through the reactive compound for the accumulated duration of time.

The step of directing the interrogating beam of light could be accomplished by directing the beam toward the substrate for a continuous interval of time that is sufficient to cause the change in optical transmission. The methodology also contemplates that the interrogating beam can be directed at the substrate for a plurality of discrete intervals of time sufficient to cause the change in optical transmission. This might occur, for example, where the light source of the computer's optical readout system selectively advances the interrogating beam radially across an outermost surface of the optical disk until the beam interacts with the reactive compound for the plurality of discrete intervals of time. It is preferred that the methodology be practiced with a beam wavelength approximately either 780 or 650 nanometers (nm) and a beam intensity of approximately 0.14 milliwatts (mW) 0.6 mW of power.

Figure 10A:
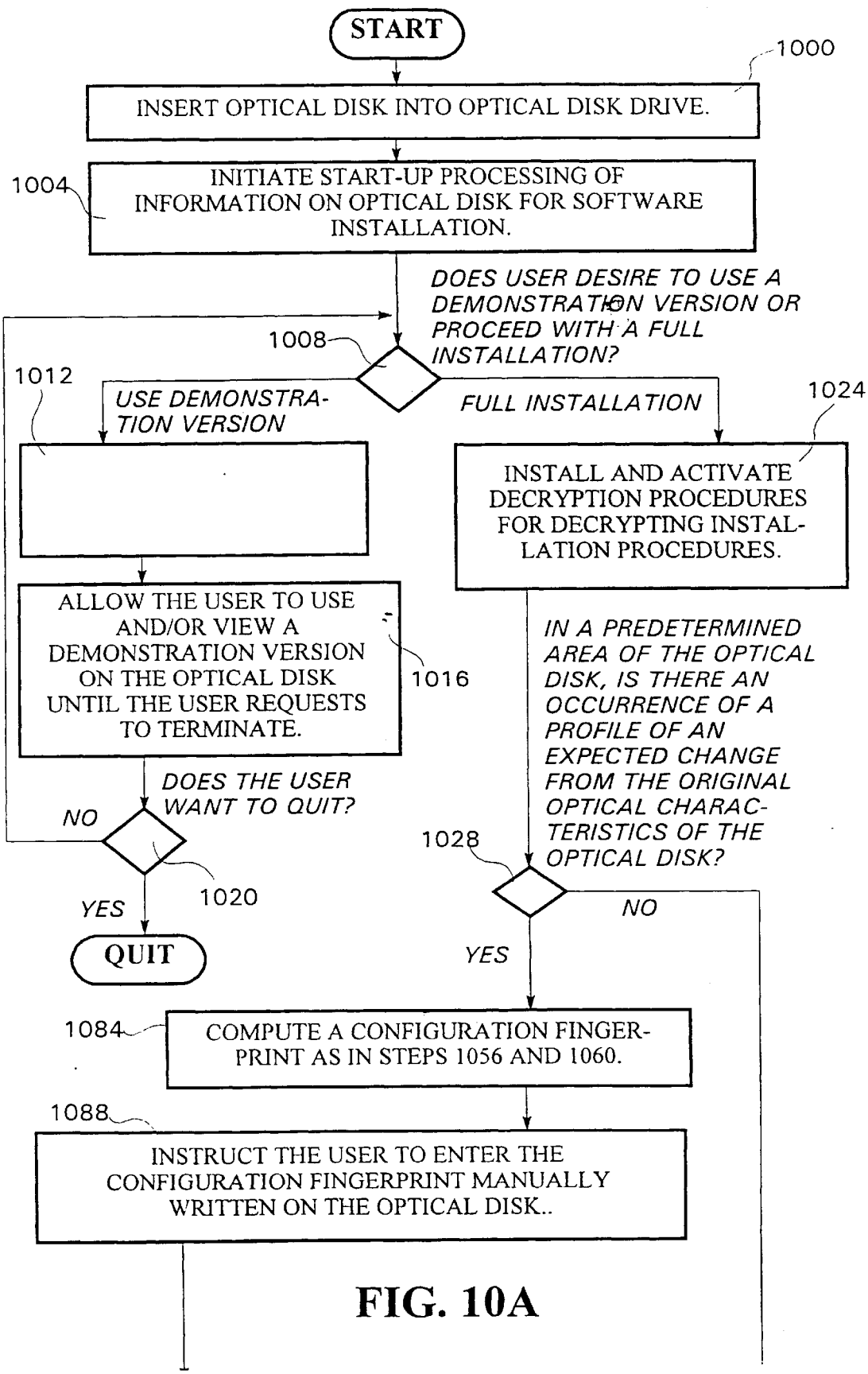
FIGS. 10A, 10B and 10C present a flowchart of the steps performed when the present invention is used to install computer software residing on an optical disk that conforms with the inventive aspects of the present invention, wherein the user is required to make a manual change to the optical disk during the first installation using the optical disk.
Figure 10B:
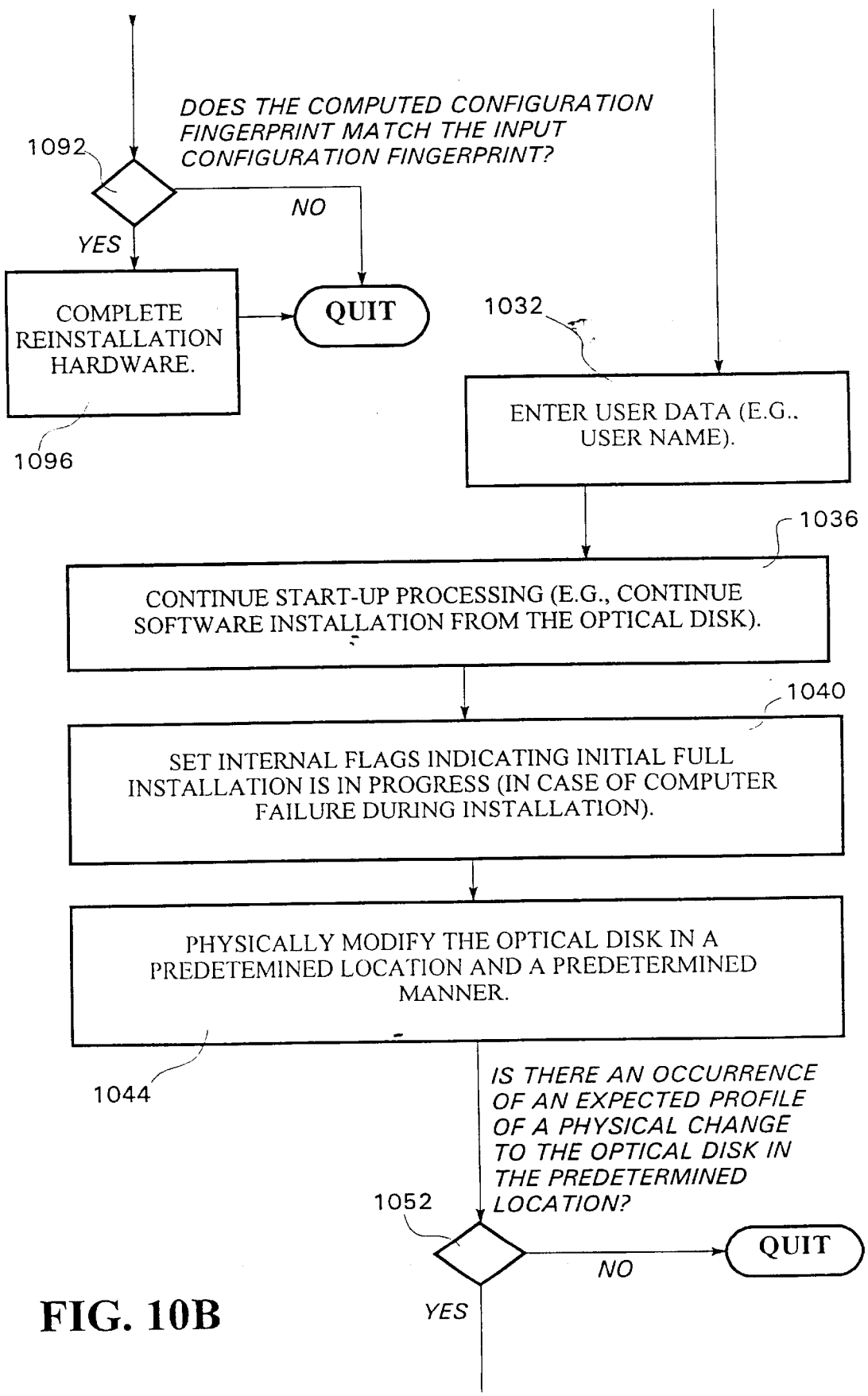
Figure 10C:
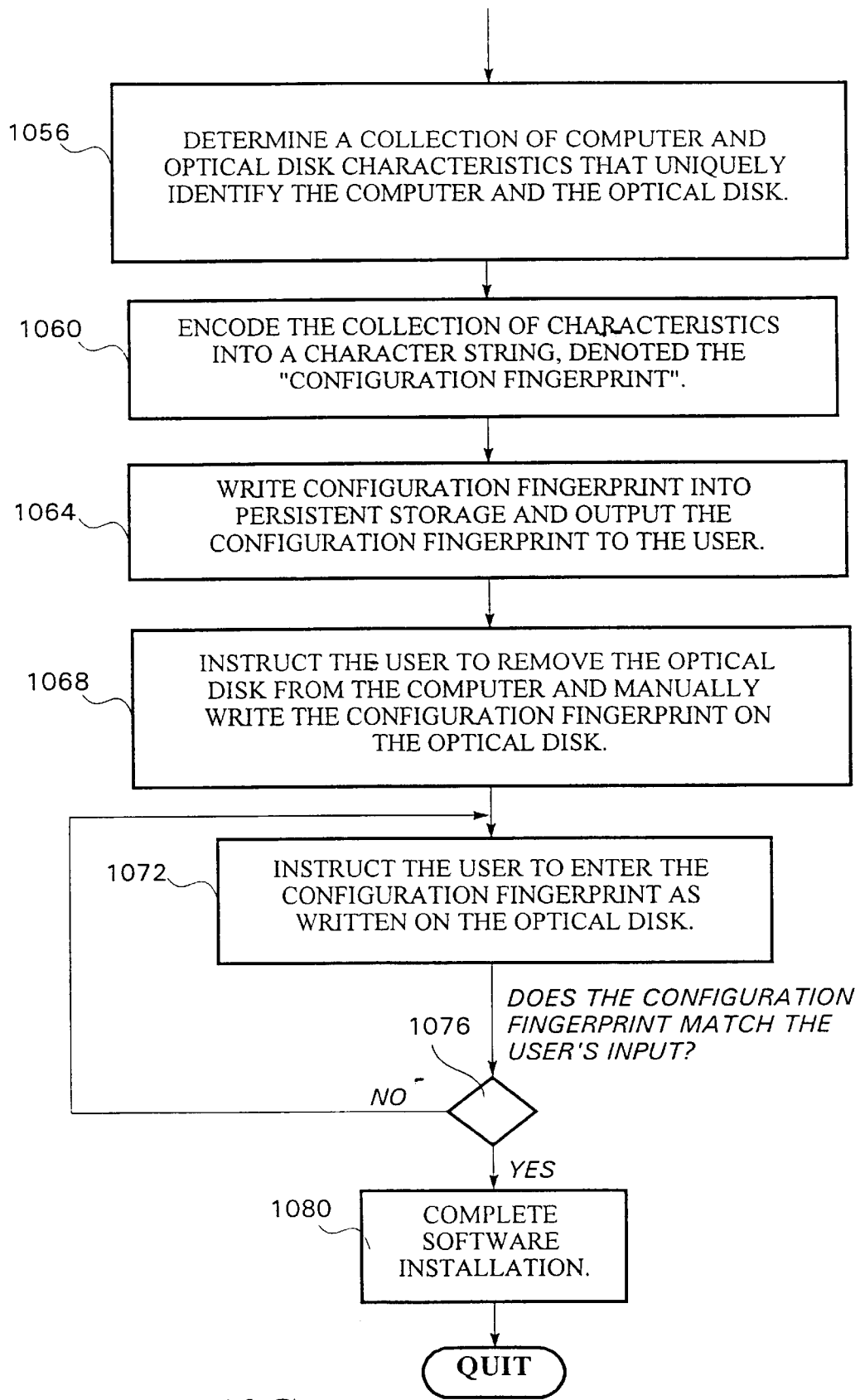

In FIGS. 10A, 10B and 10C, a representative flowchart is provided of the steps performed in the method of the present invention according to the second collection of embodiments as described in the summary section hereinabove.

That is, the flowchart of these figures illustrates the steps performed to prohibit unrestricted duplication and/or access of information on an optical medium or disk manufactured according to an embodiment of the present invention. In particular, the present method provides for purposefully inducing a physical change to the optical disk during its use; i.e., the physical change may be caused substantially automatically by, e.g., the activation of software on the optical disk, or alternatively may be caused as a purposeful effect of manual action by the user. More particularly, the flowchart of FIG. 10 illustrates the steps performed when installing software on a user's computer from an optical disk configured according to the present invention. Thus, in step 1000, the user inserts the optical disk into the optical disk drive (also denoted optical readout system or optical reader hereinabove). Subsequently, in step 1004, the user initiates or activates a start-up or installation program for processing information on the optical disk during an installation of the software on the optical disk. Note that this installation program may be read from the optical disk as a first portion of the information read. Alternatively, this installation program may be downloaded from the Internet. Upon activating the installation program, the user may be allowed the option of either activating a demonstration version of the optical disk software wherein a manual change to the optical disk is not required. Assuming such an option is available, in step 1008, a response from the user is solicited as to whether the user desires to use a demonstration version of the software, for example, prior to performing a full installation on the user's computer. Accordingly, assuming the user requests to use a demonstration version, steps 1012 through 1020 are performed, wherein a demonstration version of the software may be loaded onto the user's computer thereby allowing the user to perform, for example, a restricted set of features of the optical disk software application.

Alternatively, if in step 1008, the user desires to fully install the software application from the optical disk, then step 1024 is performed, wherein one or more decryption procedures are installed into the user's computer from, e.g., the optical disk or the Internet. Note that at least some of the information residing on the optical disk is encrypted so that it is not easily duplicated as a non-executable sequence of bits or characters, and subsequently reverse engineered to obtain a fully functioning executable version of the software on the optical disk. Thus, it is to be understood that in the subsequent steps for installing the application software from the optical disk to the user's computer, that the encryption procedures installed in this step (1024) are activated one or more times for decrypting at least some crucial information transferred between the optical disk and the user's computer.

Subsequently, in step 1028, a determination is made as to whether a predetermined area of the optical disk has an occurrence of a profile of an expected physical change to the optical disk. That is, the start-up program assumes that the optical disk is in a particular predetermined physical configuration or state when obtained from the manufacturing process, and during this step, the start-up program determines if the physical characteristics of the optical disk conform to this assumed initial state or whether an occurrence of a particular profile of an expected physical change has occurred. In particular, note that the expected physical change, if detected, is assumed to be due to a previous installation of the software of the optical disk.

It is worth mentioning that such an expected physical change during such a software installation procedure may be due to any one of a number of user initiated techniques. For example, an additional layer or substance can be incorporated into the optical disk in a predetermined area so that upon purposeful removal by the user of the layer or substance (either mechanically or chemically), the optical information coinciding on the optical disk with this layer is changed in an expected arrangement so that in a subsequent installation attempt, this expected arrangement can be detected. In particular, examples of such techniques are discussed hereinbelow and illustrated in FIGS. 11A through 14B. Alternatively, in another technique, an external device may be utilized by the user to intentionally change a predetermined portion of the optical disk as described hereinbelow with reference to FIGS. 15A through 16B. In yet another technique, a predetermined portion of the optical disk can be initially provided with an additional coating or layer that distorts or hides a predetermined portion of the optical disk information so that upon first use of the optical disk for installing the software therein, this layer is either removed or changed in some fashion so that the information encoded underneath is capable of being read by the optical disk reader. In particular, this technique is described and illustrated hereinbelow with reference to FIGS. 17A through 21B. However, for each such technique it is an aspect of the present invention that in most embodiments the predetermined portion of the optical disk having an intentional change is limited to a minority of the storage capacity of the optical disk.

Moreover, in one important class of embodiments wherein the expected physical change is due to a change in the errors detected (e.g. either an increase or a decrease in errors), additional steps may be performed by software implementing the flowchart of FIG. 10 wherein these additional steps activate and deactivate the optical disk error correction module(s) of the user's computer system. Note that this becomes an important time saving aspect of the present invention in that considerable time can be consumed by the error correction module(s) in attempting to read purposefully induced unreadable errors. Thus, by deactivating the error correction module(s) just before a determination of whether an occurrence of an expected profile of errors is made (i.e., just before steps 1028 and 1052 of FIG. 10), and subsequently reactivating the error correction module(s) immediately thereafter, considerable time may be saved in, for example, (re)installing software from the optical disk, activating a presentation of a movie from the optical disk, etc.

Returning now to the steps of the flowchart of FIG. 10, assuming that in step 1028 the expected change from the original optical characteristics of the optical disk is not detected, then step 1032 is performed wherein the installation procedure may request user specific data such as the user's name and/or other user identifying information. Following this step, in step 1036, the installation procedure may install substantially all the software from the optical disk with the exception of one or more portions that are necessary for activating the software. Subsequently, in step 1040, the installation process sets internal flags indicating that an initial full installation of the software is in progress. This step provides a substantially failsafe feature of the present invention so that if there is a computer failure during installation, these internal flags can be subsequently detected in the persistent storage (e.g., the hard disk) of the user's computer, and subsequently used to reinitiate the installation procedure. Subsequently, in step 1044, the user is instructed to remove the optical disk from the computer and physically modify the optical disk in a predetermined manner and subsequently reinsert the optical disk into the computer.

Assuming that the optical disk has been reinserted, in step 1052 the installation procedure determines whether an expected profile of a physical change to the optical disk has occurred in a predetermined area of the disk. In particular, various embodiments of the present invention determine the physical change in the optical disk by analyzing a change, for example, in the errors generated when attempting to read certain predetermined locations on the optical disk. For instance, the change may be detected as: (a) a total number of errors generated in a sampling of locations in an area of the optical disk (e.g., a detected number of errors greater than a minimum threshold, or less than a maximum threshold), (b) a density of errors generated in a sampling of locations in an area of the optical disk (e.g., a detected density of errors greater than a minimum threshold or less than a maximum threshold), (c) a relative number of errors generated in a sampling of locations in an area of the optical disk, (d) a pattern of errors generated in a sampling of locations in an area of the optical disk, (e) a statistical analysis of the errors in a sampling of locations generated in an area of the optical disk, (e.g., a regression analysis). Moreover, instead of determining various measurements related to errors detected, the physical change in the optical disk may be detected by computing a measurement related to the non-error generating locations of an area of the optical disk. Thus, by replacing the word, "errors", with the word, "non-errors" in (a) through (e) above, additional examples for detecting a change to the optical disk are obtained. Further, note that the change may be detected stochastically wherein, for example, a probability or likelihood measurement is computed for determining whether a change has been detected. Note that the physical change may be removing, replacing or rearranging an entire wedge extending through all layers of the optical disk. For instance, a tab on an edge on an optical disk may be broken from the optical disk as part of an initial installation. Moreover, in some embodiments, such errors are not only detectable, but they are also not capable of being corrected by error correction circuitry since the errors are so prevalent. However, it is also within the scope of the present invention to detect such a change by other techniques than error detection. For example, a detachable optically readable layer may mask alternative optically readable information. Thus, by removing (and/or rearranging) the detachable optically readable layer and exposing the alternative data, a change to the optical disk can be detected.

Referring again to step 1052 of FIG. 10C, if an expected profile of the requested physical change to the optical disk has not occurred, then the installation procedure terminates (i.e., the "no" branch is taken). However, assuming that such a profile of an expected physical change is detected, step 1056 is performed wherein the installation process determines a collection of characteristics that uniquely identify the computer and the optical disk combination. For example, characteristics relating to the user's computer may be various serial numbers associated with the central processing unit, and other peripheral processors or devices. Additionally, regarding the optical disk characteristics, the installation software samples the detected changes to the optical disk in the predetermined area and subsequently encodes the locations of the changes in this predetermined area by generating one or more codes related to the optical readability of the disk in the predetermined area. Thus, by combining the characteristics of the user's computer with the encoded characteristics of the physical change to the optical disk and possibly an encoding of the user data entered, a unique encoded identifier can be generated as, e.g., a character string as described in step 1060. Note that hereinafter the unique identifier will be denoted as a "configuration fingerprint." As an aside, note that it is important that the unique physical characteristics of the optical disk be encoded into the configuration fingerprint since otherwise there is the potential for a user to use a configuration fingerprint based solely on the characteristics of the user's computer to illegally install software from optical disks of the present invention on any number of computers.

In step 1064, the configuration fingerprint is written into persistent storage on the user's computer, and additionally, the configuration fingerprint is output to the user. Subsequently, in step 1068, the installation procedure instructs the user to remove the optical disk from the computer and manually write the configuration fingerprint on the optical disk. Additionally, as described in step 1072, the user is instructed to enter the configuration fingerprint as written on the optical disk as input into the user's computer. Note that the entering of the configuration fingerprint by the user and the subsequent checking to determine whether the computed configuration fingerprint and the one entered by the user are identical provides a level of assurance that the configuration fingerprint written on the optical disk is identical to the computed configuration fingerprint. Such assurance is important since during a subsequent reinstallation attempt from the optical disk, the configuration fingerprint is recomputed and a match with a user input fingerprint is required before the software will be (re)installed on the user's computer.

Assuming that eventually the configuration fingerprints match in step 1076, step 1080 is performed wherein the installation procedure completes installation of the software from the optical disk.

Returning now to step 1028, if the installation procedure determines that in a predetermined area of the optical disk, there is indeed an occurrence of a profile of an expected change from the original optical characteristics of the optical disk as manufactured, then step 1084 is performed wherein the configuration fingerprint for the optical disk is computed as in the steps 1056 and 1060. Following this step, in step 1088, the user is instructed to enter the configuration fingerprint written on the optical disk. Thus, in step 1092, the installation procedure determines whether the computed configuration fingerprint matches the input configuration fingerprint provided by the user. Accordingly, if these two fingerprints do not match, then the installation procedure quits without fully installing the software. Alternatively, if the fingerprints, match, then the remaining portion of the installation is completed.

It is worth noting, however, that even though the software of the optical disk may not be able to be installed at a computer different from the initial installation computer, it is an aspect of the present invention that the software may be executed directly from the optical disk in the case where the software cannot be installed due to, for example, a mismatch of configuration fingerprints as determined in step 1092 above. That is, it is an aspect of the present method that the user may be able to execute the software of the optical disk on any computer capable of reading the disk by executing the software directly from the disk.

In some embodiments of the present invention, the configuration fingerprints may not be required to exactly match in order for a complete reinstallation (step 1096 above) to be performed. In particular, it is an aspect of these embodiments of the present invention that as long as the configuration fingerprints are sufficiently similar, the installation process of step 1096 is performed. Thus, if the optical disk becomes scratched accidentally in the predetermined area where the expected change is to occur, and certain components of the user's computer were replaced, then the user may still be allowed to install the software on the optical disk due to a sufficient similarity between the computed configuration fingerprint and the input configuration fingerprint.

Referring now to FIGS. 11A–21B, a second collection of embodiments (denoted hereinafter as the "manually activated embodiments") of the present invention are illustrated. Accordingly, these embodiments, as with the previous embodiments described, prohibit unrestricted duplication of information on an optical disk manufactured according to the present invention. However, in the manually activated embodiments, the user manually effects a physical change to the optical disk during an initial use so that this change can be detected upon subsequent uses of the optical disk. Thus, as with the previous embodiments that automatically change optical states when irradiated by an optical scanning machine, there is protection against copying, duplication, unauthorized installation or use of the data on the optical disk.

Figure 11A:
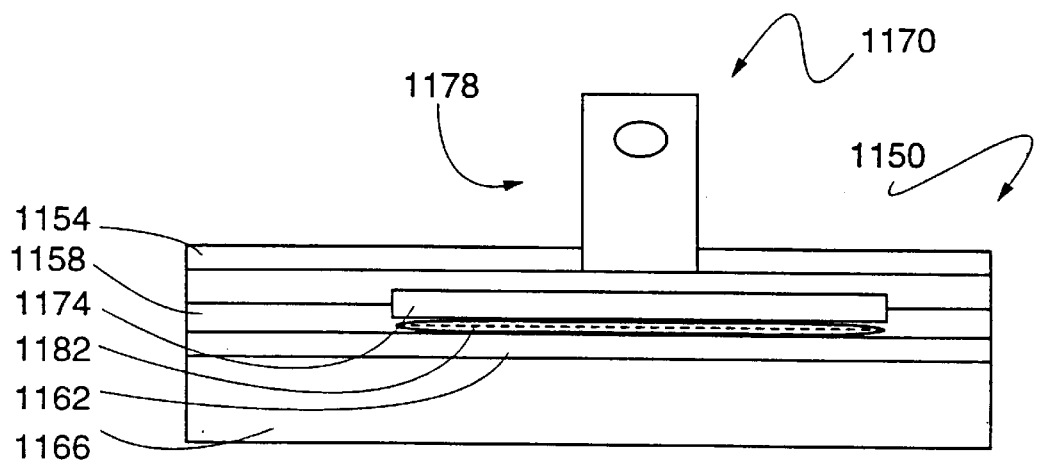
FIGS. 11A and 11B illustrate a manual approach to irreversibly changing the physical characteristics of an optical disk manufactured according to the present invention. That is, the optical disk here includes an additional layer bonded to the optical disk wherein upon removal by the user, the information encoded on the optical adjacent to the additional layer is damaged.
Figure 11B:
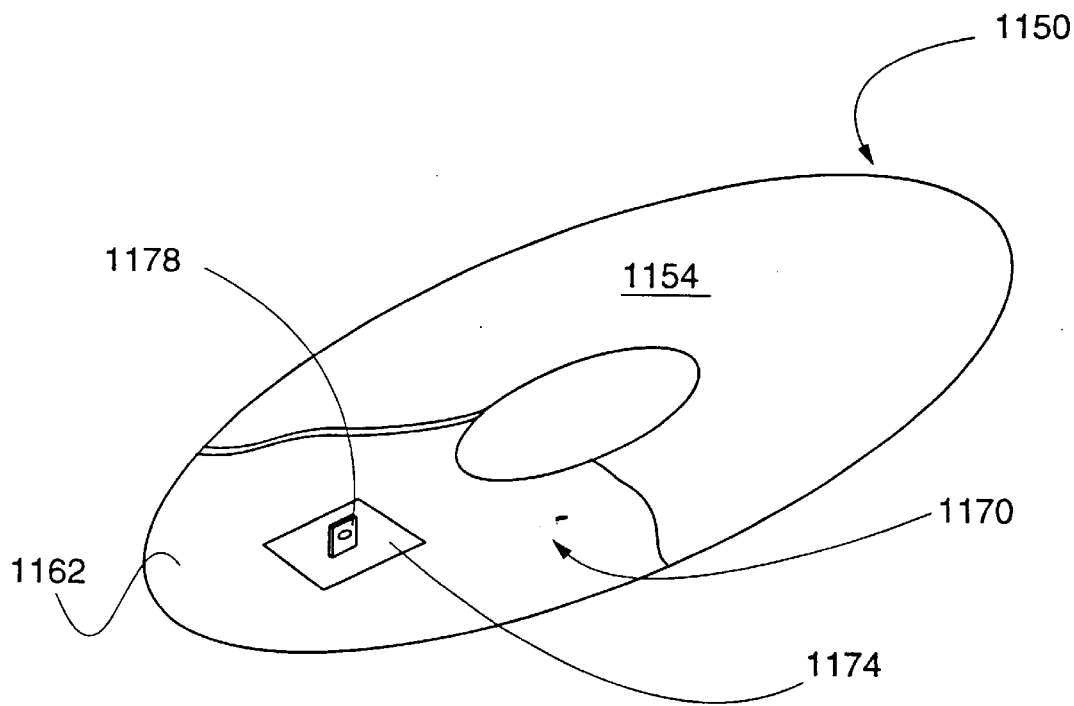
Figure 12:
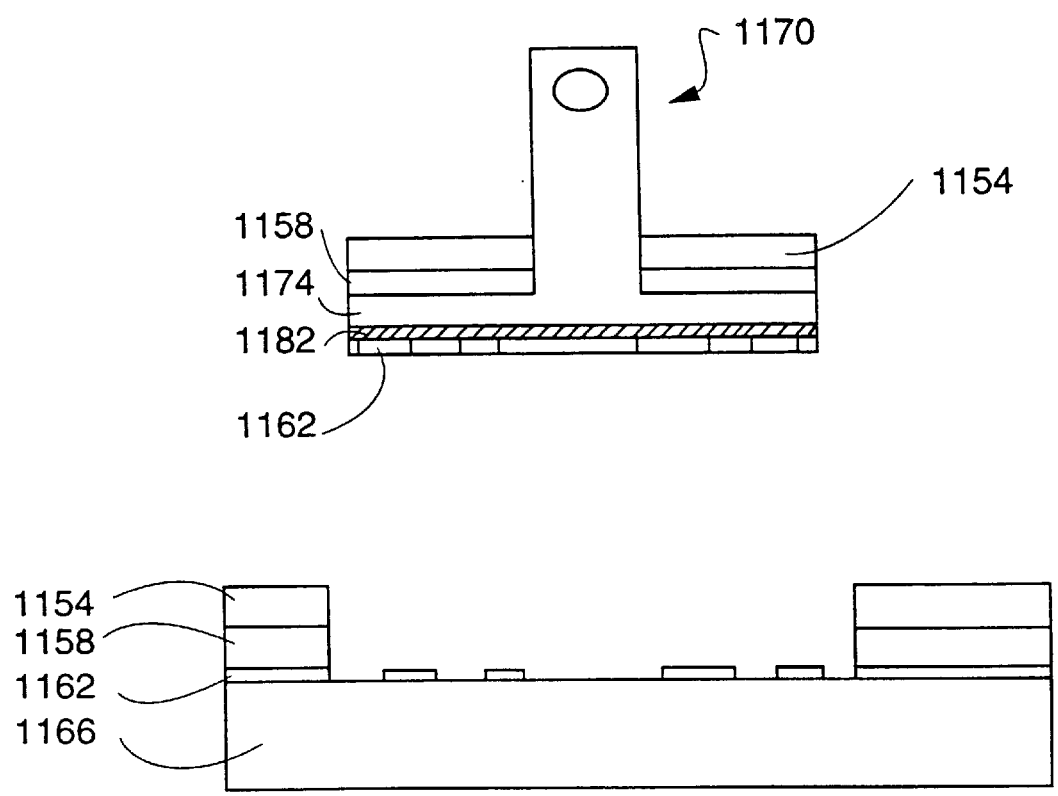
FIG. 12 illustrates the removal of the additional layer (denoted a "ripcord") that is also shown in FIGS. 11A and 11B.
Figure 13A:
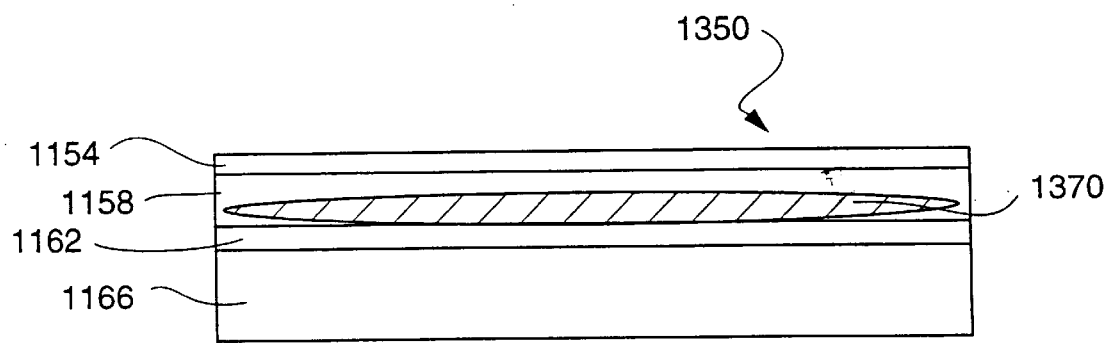
FIGS. 13A and 13B illustrate an alternative embodiment to the optical disk embodiment of FIGS. 11A–12B for purposefully damaging an optical disk manufactured according to the present invention. In particular, in FIGS. 13A and 13B, a chemical container or sack is bonded to an optical disk so that upon rupturing of the container (during, e.g., an initial optical disk use), the information on the optical disk is purposefully damaged, thereby allowing a subsequent installation process to detect the previous access to the information on the optical disk.
Figure 13B:
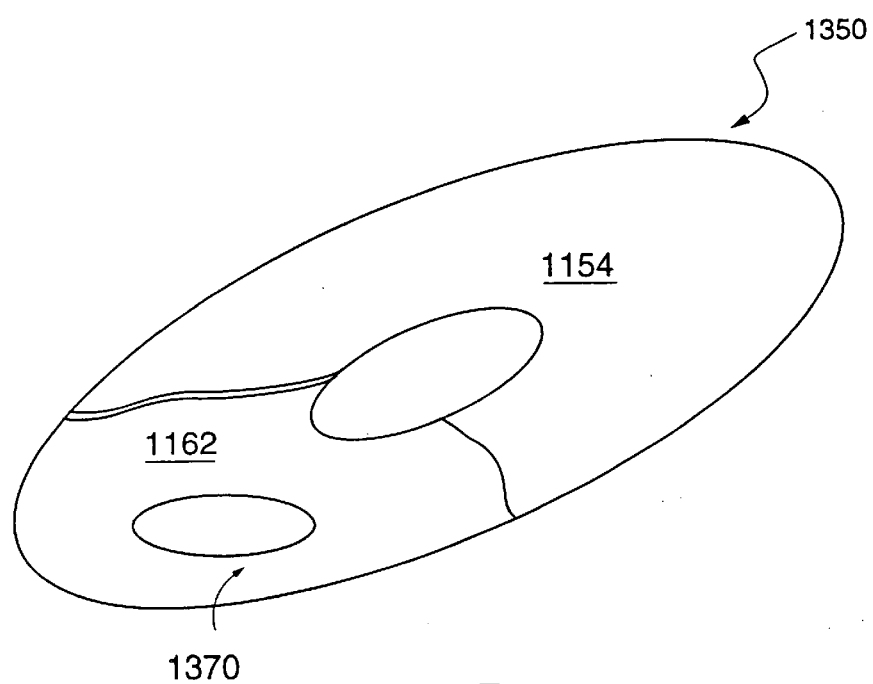

In FIGS. 11A–12, a first of the manually activated embodiments is illustrated. In the embodiment illustrated in these figures optical disk 1150 includes painted surface 1154 and protective lacquer layer 1158 as the uppermost surfaces. Additionally, as is typical for such disks, there is also a metalized or reflective layer 1162 and a transparent polycarbonate layer 1166. To these layers the present invention provides an extra or additional assembly 1170 for purposefully generating an expected profile of read errors on the optical disk 1150 (this additional assembly 1170 is hereinafter also denoted as a "ripcord") when this assembly is, for example, mechanically removed.

In the present embodiment, the ripcord 1170 includes (a) a substantially tear resistant patch 1174 (best shown in FIG. 11B) embedded within the optical disk 1170, and (b) a pull tab 1178 that is firmly attached to the patch 1174. Note that in the present figure there is a bonding layer 1182 bonding the patch to the reflective layer 1162. However, in general, the patch 1174 is attached or otherwise bonded to at least one of the sides of the metalized layer 1162 and/or lacquer layer 1158 of the optical disk 1150. For instance, the patch 1174 may be screwed, glued, welded, soldered, clipped or laminated onto the optical disk 1150. Moreover, the patch 1174 and/or the pull tab 1178 may be made of metal, plastic, wood or other suitable material that does not tear easily under tension. The patch 1174 may also be manufactured as part of another layer of the optical disk 1150; e.g., the reflective layer 1162.

Note that there can be various embodiments of a ripcord 1170 that can be mechanically manipulated to provide a physical change to an optical disk of the present invention. For example, such mechanical ripcords can be in the form of:

(1.1) a laminated layer with a pull tab (substantially as shown in FIGS. 11A, 11B);
(1.2) an error generating push or twist button (not shown) having, for example, a particular arrangement of pins or other pointed objects that etch or scratch a surface of the optical disk 1150 when pressure and/or a twisting force is applied;
(1.3) a sticker, a strip of metal, an adhesive tape, a pin or other similar object that is effective for generating data access errors when detached from the disk.

Accordingly, when such a ripcord 1170 is removed (FIG. 12) from the optical disk or in some way moved or disturbed, the ripcord 1170 also removes, moves, damages and/or carries away with it and/or otherwise modifies the reflective characteristics of the optical disk 1150 so that the data structures thereon generate an increased number of read errors when a read access is attempted. That is, an optical reader (such as an optical readout system 10) is then unable to detect and/or access the information which is present at or near where the ripcord 1170 was located on the optical disk 1150.

Figure 14A:
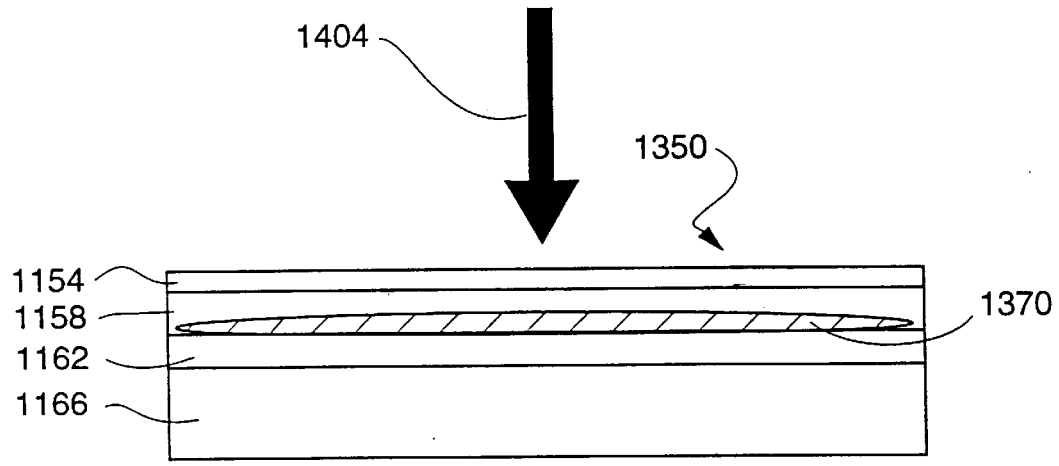
Figure 14B:
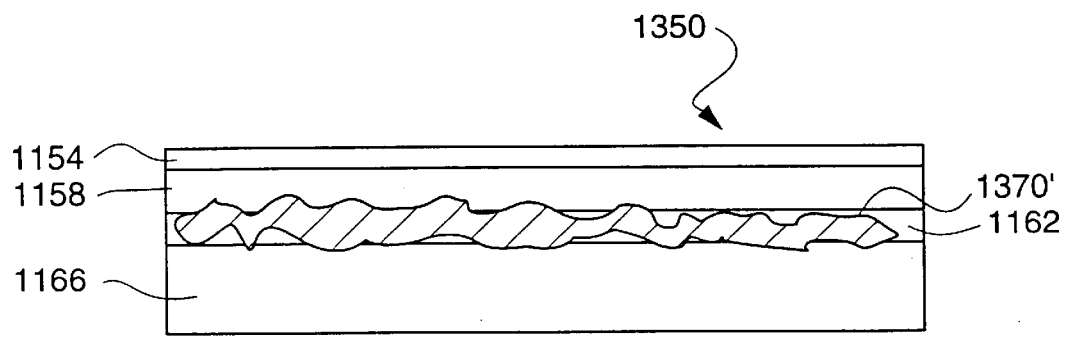
Figure 15A:
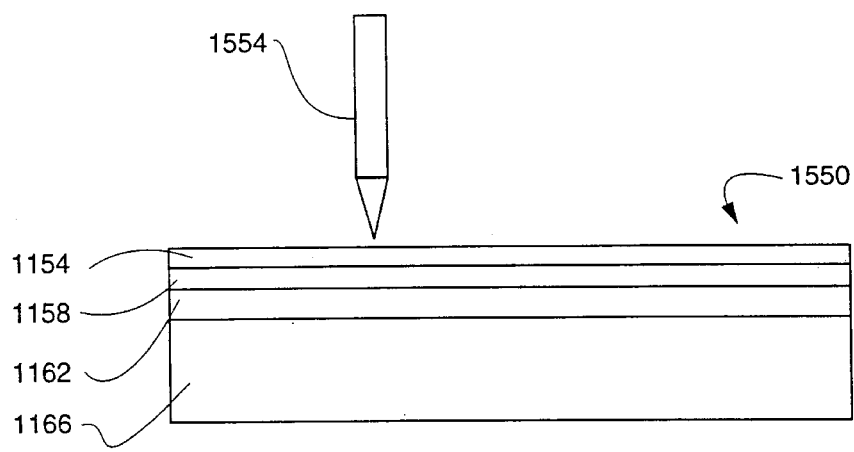
FIGS. 15A and 15B illustrate another alternative embodiment for purposefully damaging an optical disk wherein an external device is used that can etch or scar the optical disk and thereby reduce the readability of disk information in a particular area of the disk.
Figure 15B:
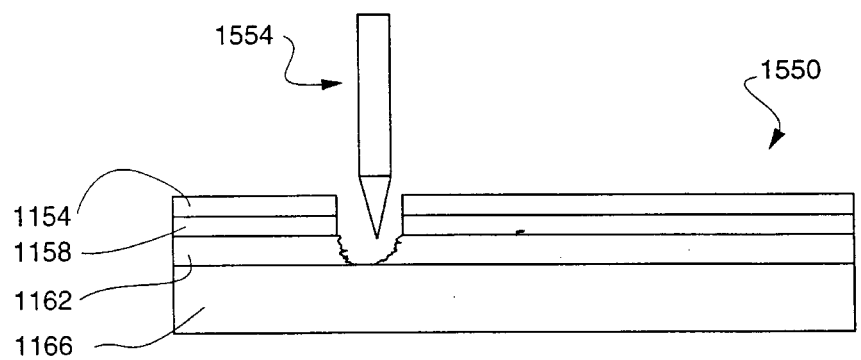

In FIGS. 13A–14B, another embodiment of a ripcord is shown, this being a "chemical ripcord" 1370 provided on optical disk 1350, wherein this disk has layers corresponding to those of optical disk 1150; i.e., painted surface 1154, lacquer layer 1158, reflective layer 1162 and polycarbonate layer 1166. The chemical ripcord 1370 is incorporated into the optical disk 1350 as an ampule, globule, sac, macroscopic or microscopic chemical carrying liposome made of plastic, wood, metal or other suitable material that can be attached, bonded, glued or laid upon the optical disk as part of the manufacturing process. For example, referring to FIGS. 14A and 14B, when pressure is applied (e.g., as represented by force vector 1404), this chemical ripcord is ruptured (or moved, touched, rubbed, or otherwise disturbed) as shown in FIG. 14B. Subsequently, the chemical(s) within is released and/or activated for purposefully damaging the optical disk 1370, and in particular the reflective layer 1162, so that, for example, a greater number (or density or pattern) of optical disk read errors are generated in the area or location adjacent to the now disturbed chemical ripcord 1370. Thus, assuming an optical reader is enabled to detect and/or access the information corresponding to the data structures which are present at or near the location of the chemical ripcord 1370, the optical reader and/or application software associated with the present invention (e.g., as described in FIG. 10) can detect that the information near or adjacent to this location has changed state (e.g., from readable to unreadable) and accordingly, use this state change information for determining subsequent access and/or use of the information residing on the optical disk 1370 as, e.g., is described in FIGS. 10.

Figure 16A:
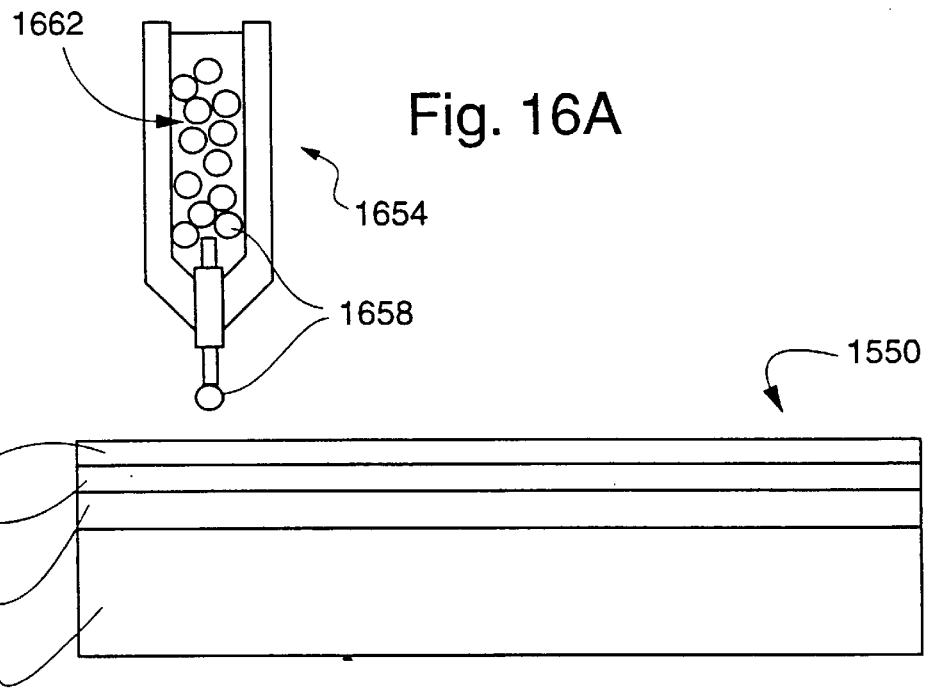
FIGS. 16A and 16B illustrate yet another embodiment of the present invention for purposefully damaging an optical disk manufactured according to the present invention. In the embodiment of these figures, an external device is used for applying one or more chemicals to a particular or predetermined portion of the optical disk and thereby inducing additional read errors from an optical disk reader.
Figure 16B:
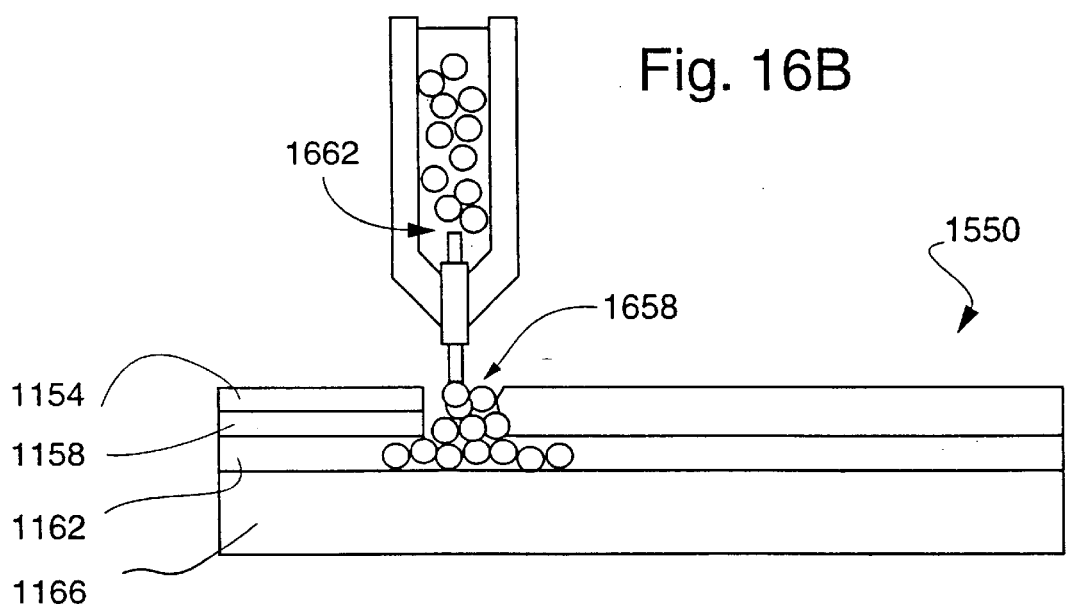

In FIGS. 15A–16B, two additional ripcord techniques for purposefully damaging an optical disk are illustrated, wherein a device external or unattached to the optical disk is used. Accordingly, the optical disk 1550 represented in the presently referenced figures may be a conventional optical disk with the possible exception that the painted surface 1154 may provide an indication as to where the optical disk is to be purposefully damaged. One such disk damaging technique is illustrated that uses an external device 1554 having, for example, a sharp point that can be used for mechanically and purposefully etching, scratching or otherwise damaging the optical disk 1550 as illustrated in FIG. 15B. Referring now to FIGS. 16A and 16B, an alternative disk damaging technique is illustrated for a disk such as 1550. That is, in this technique, a device 1654 that is external or separate from the optical disk 1550 is used for applying a particular chemical(s) 1658 that can purposefully damage at least a portion of the optical disk 1550 so that changes to its reflective characteristics are detected by an optical disk reader. In particular, the external device 1654 disclosed has an enclosed chemical compartment 1662 from which the chemical(s) 1658 are applied to the optical disk 1550, wherein the chemical (s) reacts with the optical disk 1550 for removing or damaging the reflective characteristics of the optical disk so that a greater number of read errors are generated in a predetermined area where the chemical(s) is applied.

Accordingly, in the embodiments of FIGS. 15 and 16, an optical reader may be unable to detect or access a substantial amount of the information corresponding to the data structures at or near the use of the external device. Also, the optical reader (and/or other components or modules used in the accessing or processing of information from the optical disk 1550) may determine that the information on the optical disk has changed states (e.g. an indication of a prior use) according to the access errors detected in the predetermined area where the external device was applied (as in step 1052, FIG. 10B).

Additionally, note that an external device as 1554 or 1654 may also include a pin (or other sharp instrument) for both physically and chemically damaging the disk. Moreover, other embodiments for purposefully damaging an optical disk are also within the scope of the present invention. For example, the following may be used: a pad, a scratch inducing swatch, or, in a chemical application embodiment, a liposome carrying paste, a receptacle for holding two or more chemical compounds in separate chambers for purposefully damaging (more generally, changing) optical characteristics of the disk when the two or more compounds are combined.

Thus, as described in FIG. 10, once the optical disk is physically changed, altered or otherwise damaged (e.g., step 1044, FIG. 10B) by any of the above techniques, separately or in combination, the user's computer system may then determine the extent to which the information on the optical disk can be accessed or used in a user desired action. That is, the change and/or damage to the optical disk provides a recognizable state change to, for example, the access routines (e.g., installation programs) associated with the optical disk and/or any software application thereon so that a determination can be made as to whether the information on the optical disk has been previously accessed. In addition, such a change and/or damage to the optical disk also provides a user with a visible indication that the data on the optical disk has been accessed. More generally, the purposefully altering or changing of the optical disk provides a mechanism for determining a history of the use of the optical disk, both computationally and by visual inspection of the optical disk.

In FIGS. 17A–21B, converse embodiments to the purposefully damaging embodiments above are illustrated. That is, instead of the ripcord removing information from the optical disk (when the ripcord is manipulated and/or activated), the ripcord in the present embodiments allows additional or different optical disk information to become available (i.e., readable) when the ripcord is manipulated or activated. Thus, in these embodiments, instead of the read errors increasing according to an expected profile in a predetermined area of the optical disk, the read errors may decrease according to an expected profile. That is, the ripcord may initially hide or mask the information on the optical disk with a substantially unreadable covering. However, it is also within the scope of the present invention that such a ripcord covering may be readable and provide different information than that on the optical disk. For example, an optical disk may contain one or more movies for viewing and the ripcord itself may provide information necessary for allowing the movies to be viewed. Thus, once the ripcord is removed, thereby providing access to alternative information, the movie(s) may be viewed only once. Thus, in this embodiment, a detection of a state change is performed without necessarily detecting an expected profile related to generated access errors. It is also worth mentioning here that, as one skilled in the art will understand, similar capabilities may be provided with other duplication protection embodiments of the present invention. For example, by using an optical disk coating that changes from opaque to transparent due to, e.g., laser light from an optical disk reader, purposefully masked information on the optical disk can become readable and concomitantly causing a reduction in the number of errors detected and therefore providing a detectable state change in the optical disk.

Figure 17A:
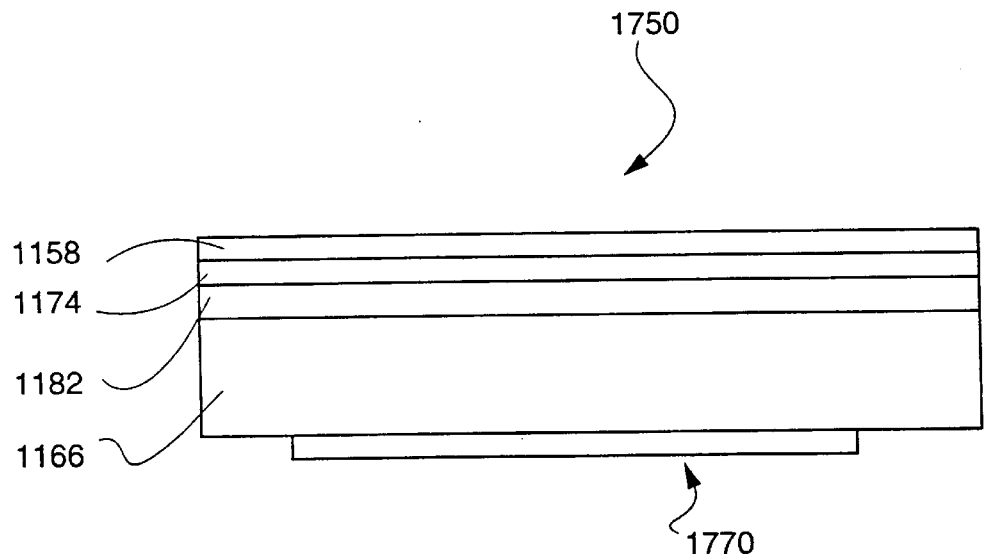
FIGS. 17A and 17B illustrate an alternative embodiment of an optical disk manufactured according to the present invention, wherein an additional layer is provided on the optical disk during manufacture for hiding or masking a particular portion of the information on the optical disk.
Figure 17B:
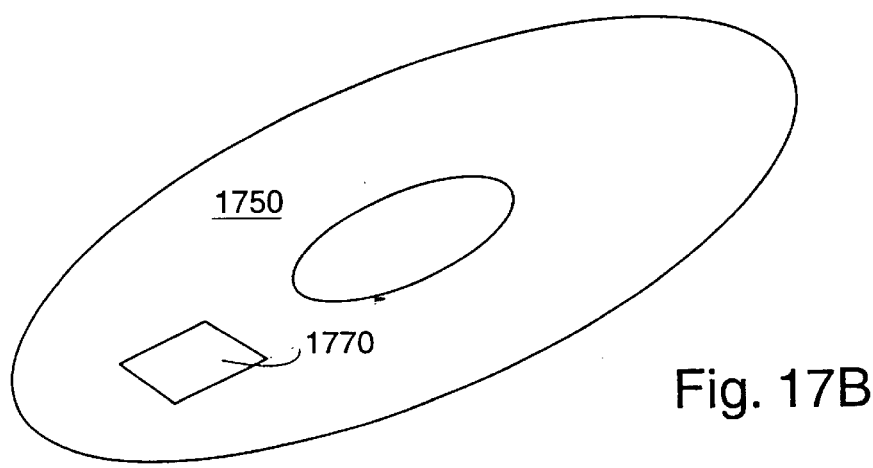
Figure 18:
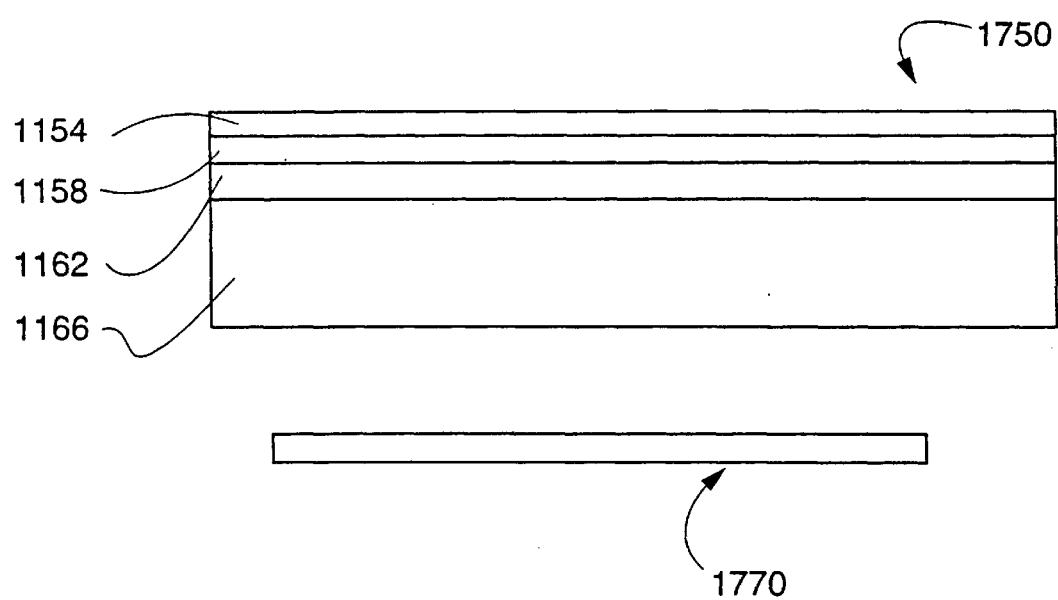
FIG. 18 illustrates the removal of the additional layer (also denoted a "ripcord") from the optical disk of FIGS. 17, wherein the optical disk information masked by the ripcord is now capable of being read by an optical reader.

Referring now specifically to FIGS. 17A and 17B (where an optical disk 1750 is shown having similar layers labeled similarly to previous figures), a ripcord is attached or bonded to the exterior surface of the polycarbonate 1166 of an optical disk 1750; e.g., the ripcord 1770 may be laminated, screwed, glued, welded, soldered or clipped to the optical disk 1750. Moreover, the ripcord 1770 may include metal, plastic, wood, paper or other suitable material for hiding information encoded on the reflective layer 1182 of the optical disk 1750. Additionally, note that the ripcord 1770 may be manufactured as part of the optical disk, and can be in the form of a button, sticker, metal strip, adhesive tape, paper patch or other optical disk information mask (or optical distorter) capable of being removed or rendered transparent to the laser light of the optical reader. Accordingly, when the ripcord 1770 of the present embodiment is removed (FIG. 18) from the optical disk 1750 or in some way moved or disturbed, additional (or alternative) information on the optical disk 1750 becomes readable. Thus, an optical disk reader is then able to detect and/or access this information at or near the previous ripcord location on the optical disk.

Figure 19A:
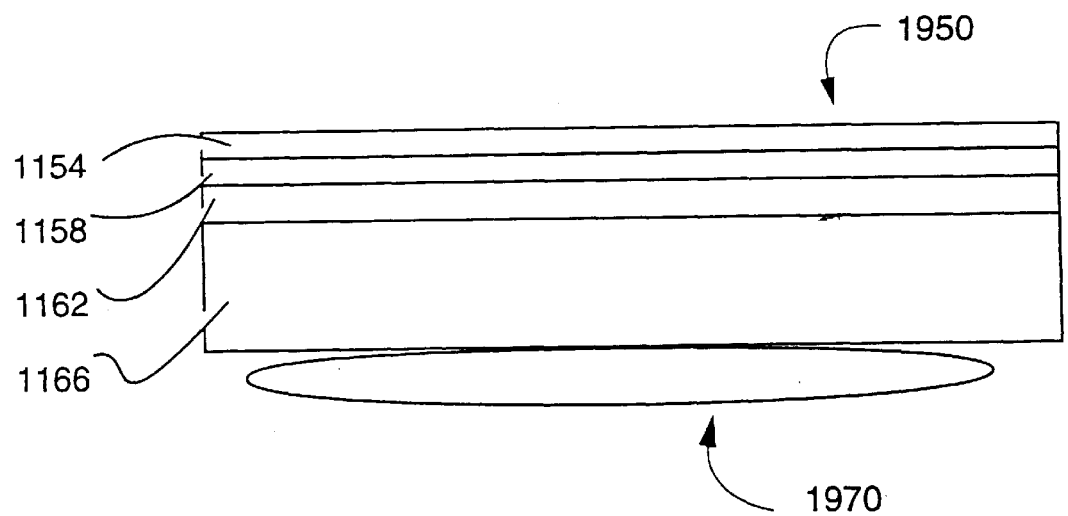
FIGS. 19A and 19B illustrate another embodiment of the present invention, wherein a container or sack having one or more chemicals is attached to an optical disk during manufacture so that this container initially masks or distorts information encoded into the optical disk; however, upon rupturing of the container, the masked information on the optical disk is now capable of being read by an optical reader.
Figure 19B:
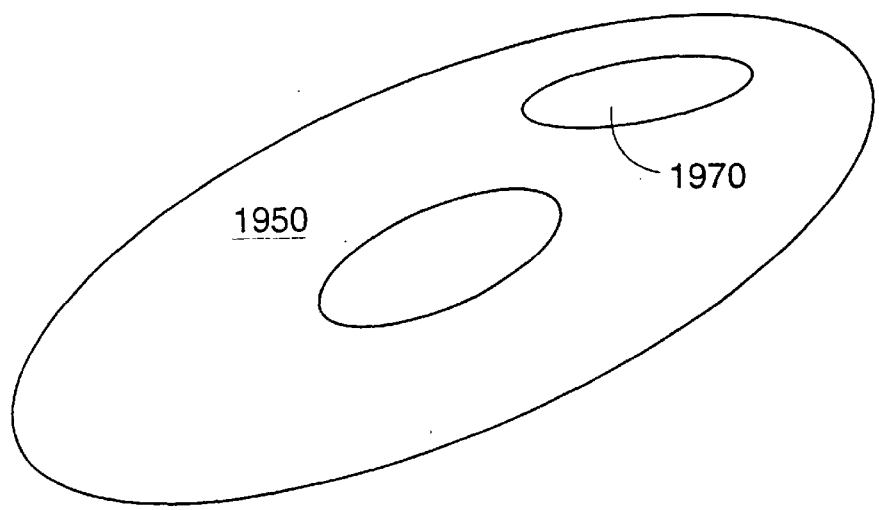
Figure 20:
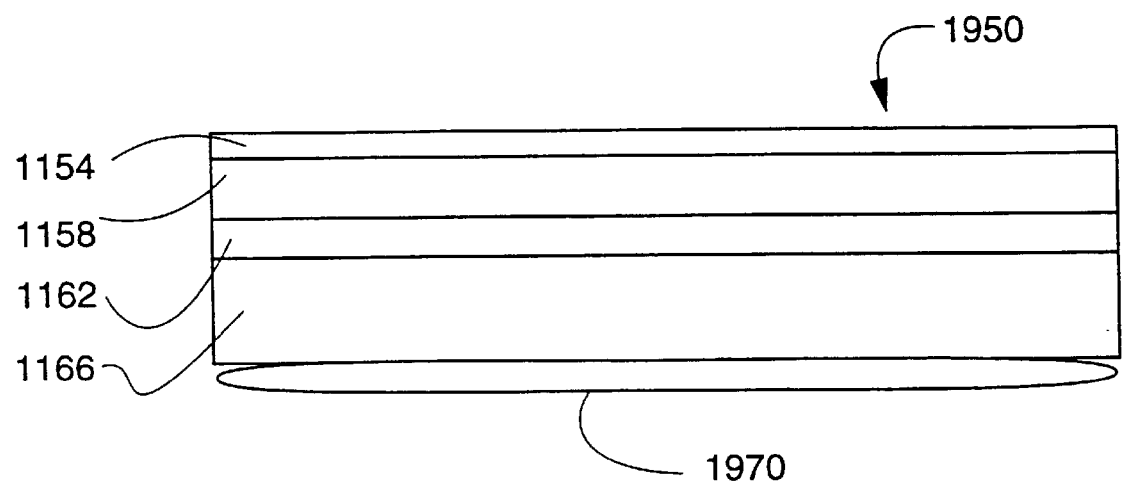

Note that additional converse embodiments may also be provided using a chemical approach. Referring to FIGS. 19A and 19B (where an optical disk 1950 is shown having similar layers labeled similarly to previous figures), a ripcord 1950 herein includes a chemical carrying container (e.g., an ampule, globule, sac or liposome) attached, bonded, glued or combined with the optical disk 1950 during manufacture. Accordingly, as illustrated in FIG. 20, when this chemical container is removed, disturbed or ruptured, the enclosed chemical(s) is released and/or activated for modifying the reflective characteristics of the optical disk 1950 so that this information becomes readable. For example, the chemical sac of the ripcord 1970 may be glued to the exterior surface of the polycarbonate layer with an opaque or colored glue, wherein the chemical(s) within the chemical sac is a solvent for the glue thereby allowing the chemical sac and the glue to be removed when the sac is ruptured and the solvent released. Thus, an optical reader is subsequently able to detect and/or access the information corresponding to the data structures on the optical disk 1450 which are present at or near the previous location of the ripcord 1970 on the optical disk. Moreover, such a change to an optical disk allows the optical reader (and/or other optical disk accessing components or modules) as well as a person, via visual inspection, to determine that a state change has occurred to the optical disk 1950.

Figure 21A:
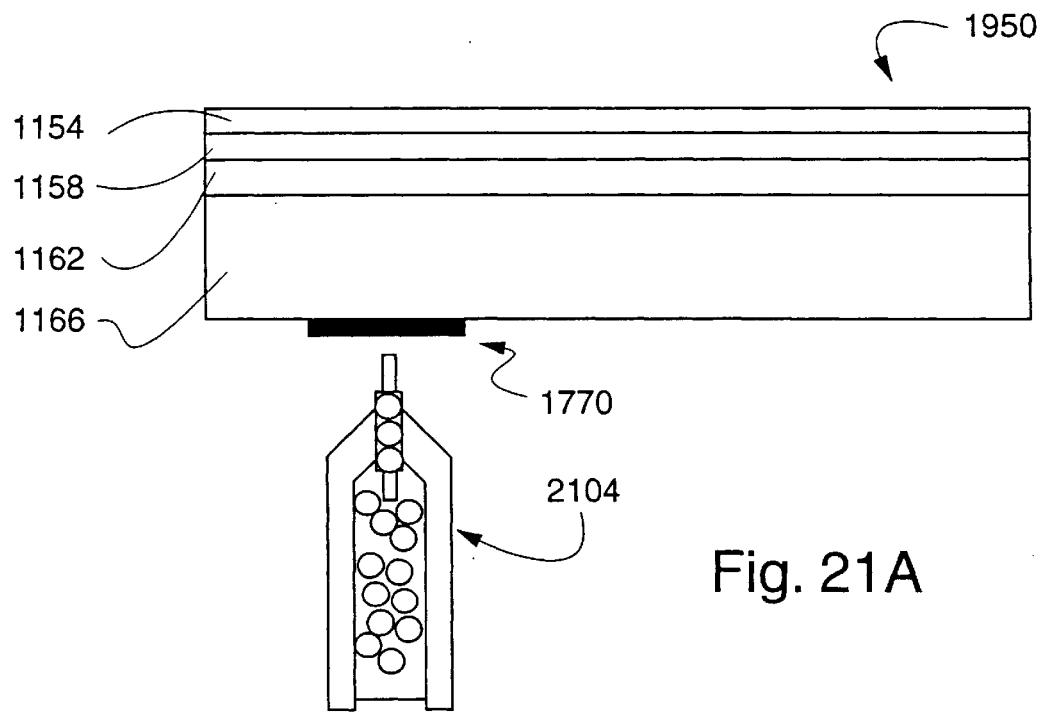
FIGS. 21A and 21B illustrate the use of an external device having an enclosed chemical that can be used for removing or changing the optical characteristics of a patch or additional layer that masks information on the optical disk.
Figure 21B:
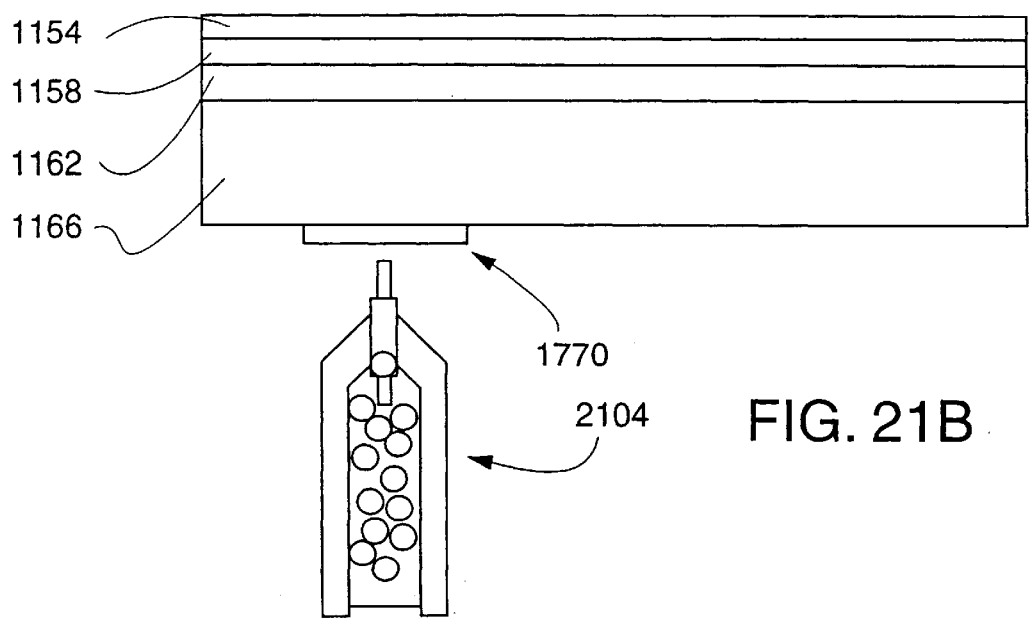

In FIGS. 21A and 21B, an embodiment of the optical disk 1750 (FIG. 17) of the present invention is illustrated wherein an external device 2104 is used for applying a chemical(s) to the optical disk, thereby removing the mask or ripcord 1770 attached to the surface of the optical disk 1750 so that optical disk information hidden by the ripcord 1770 is able to be read. Note that the external device 2104 here can be in the form of, for example, a pin, pad, swatch or liposome carrying paste or liquid, wherein the ripcord is either rendered transparent or removed.

In a third collection of embodiments of the present invention, an authentication method and apparatus are provided for authenticating an optical disk. Embodiments of this third collection provide optical disks with purposefully-induced data access errors incorporated therein during manufacturing or at least prior to mass distribution. Moreover, also included in each individual optical disk is authentication information indicating the location of these purposefully induced errors. Thus, when the authentication information accurately identifies the locations of the purposefully induced errors, then the optical disk is assumed to be authentic rather than an illegitimate copy. Note that one particularly noteworthy embodiment in this third collection is provided by attaching "microdots", i.e., microscopic unreadable dots or patches, at various locations throughout the information encoded on an optical disk. Accordingly, if the microdots are sufficiently small so that they obscure or distort only a small area of the optical disk (e.g., less than approximately 300 microns) then error correction circuitry included within an optical disk access device may be able to correct such errors transparently to a user of the optical disk. Alternatively, for many applications, such as audio (e.g., musical) presentations, the optical disk information is encoded on the disk redundantly. Thus, even larger microdots may be incorporated without affecting the quality of a presentation of the information accessed from the optical disk.

In particular, the third collection of embodiments contemplates purposefully inducing a physical alteration of one or more portions of an optical disc surface during the manufacturing process, within the data area, for the purpose of creating either a correctable or uncorrectable defect within the data stream of an attempted read of one of the physically altered portions of the optical disc. In particular, such read attempts may be performed in response to a query by a software module, either provided on an optical disc manufactured according to the present invention, or external thereto, for verifying the authenticity of the optical disc. In performing this task, the present invention does not require the changing of any specific bit, rather, it utilizes the data area of the optical disc as a "canvas" on which to "paint" or distribute defects, subject to the requirement that such defects reside within some specific area of the optical disc. The physical alteration of the optical disc surface for providing the defects can be accomplished by first providing corresponding defects within an optical disk master from which the optical disk may be manufactured. Alternatively, the defects in the optical disc may be manufactured into the optical disc after the optical disc has had data from the master disc transferred to it. The following four techniques for manufacturing defects into an optical disc are within the scope of the present invention.

Technique 1. A defect in a master disc (a "mastered defect") may be created by: (a) generating a continuous data land or data pit of sufficient length in the tracking direction; or (b) generating a series of defective data lands and/or data pits of sufficient frequency and/or length and/or data encoding peculiarity in the tracking direction to induce either a correctable or uncorrectable data error when the defect is transferred to an optical disc and an attempt to read the optical disc is performed by an optical disc reader. To generate such mastered defects, note that the process of mastering involves the conversion of a digital or analog source signal to code for subsequent translation into a digital pattern of pits and lands, wherein the transitions between lands and pits of the master disc are intended to then translate into readable data on an optical disc generated from the master disc. The software for the present invention is intended to be incorporated into the software for controlling a master disc generating device. In particular, this software modifies the code derived from the source signals by replacing portions thereof with code interleaved with one or more encodings of purposefully induced defects. In some embodiments, the appropriate coding to decode a specified encoded pattern of purposefully induced defects is incorporated into the original program content.

Figure 23:
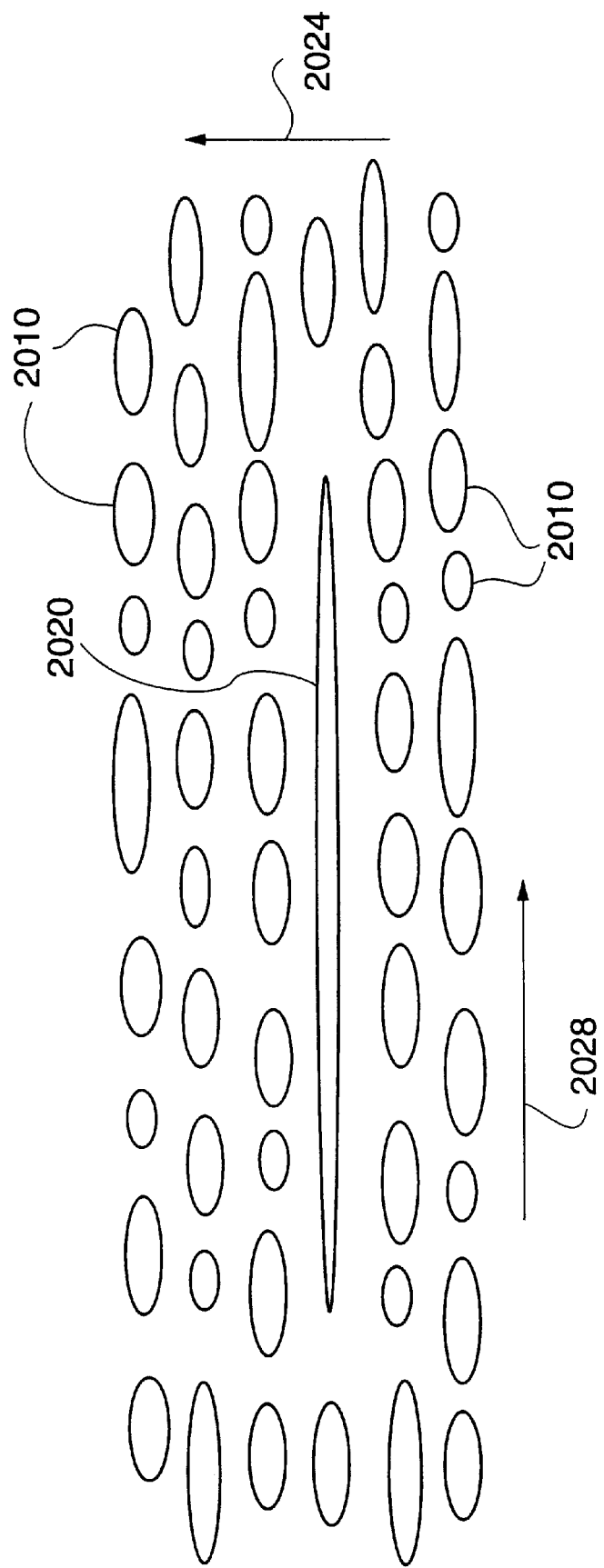
FIG. 23 illustrates an enlarged view of a data portion on an optical disk with pits 2010 aligned in rows or tracks extending radially outwardly in the direction 24 from a point about which the optical disk is intended to rotate when data is written or read. Further, this figure shows pit 2020 of extended length in the tracking direction 2028, wherein this extended pit is intentionally generated during the manufacturing of the optical disk and where this pit is detected as a defect in the optical disk.
Figure 24:
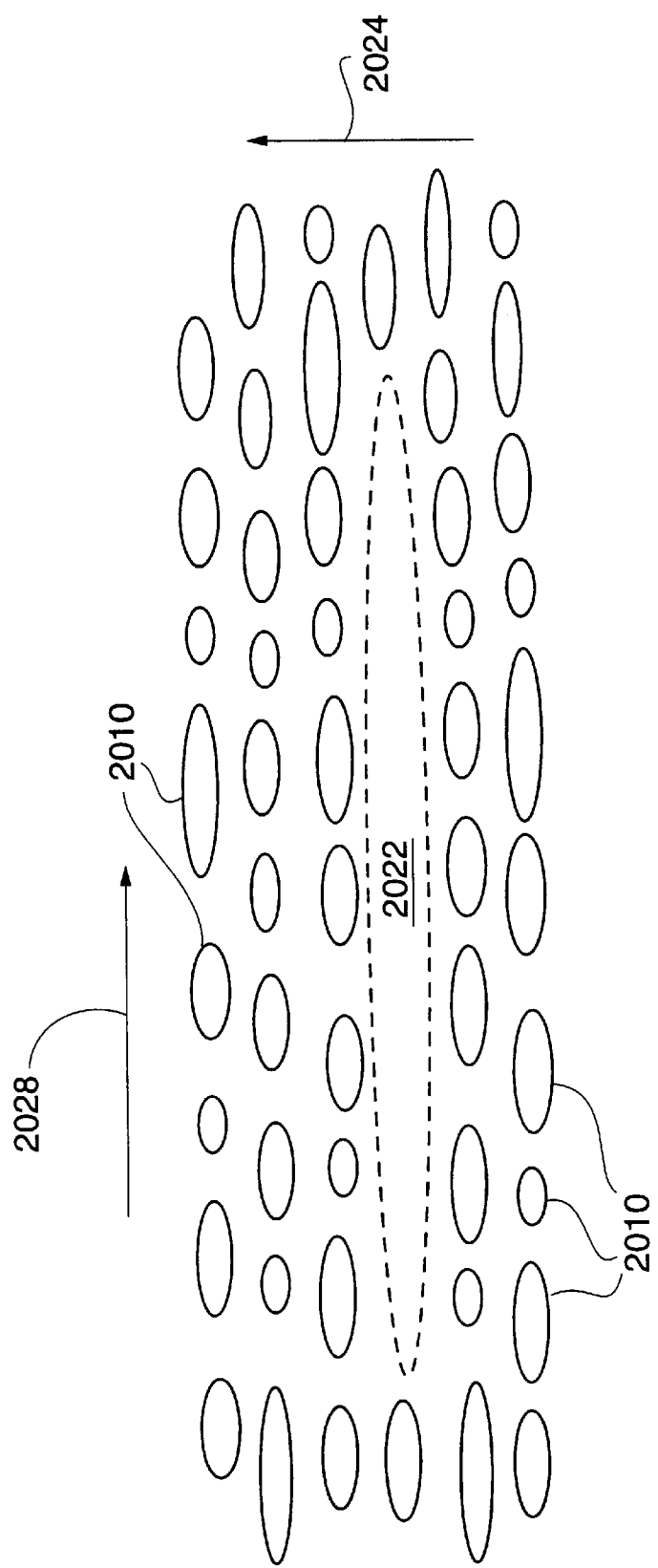
FIG. 24 is identical to FIG. 23 except that the extended pit 2020 is replaced by an extended land 2022.
Figure 27B:
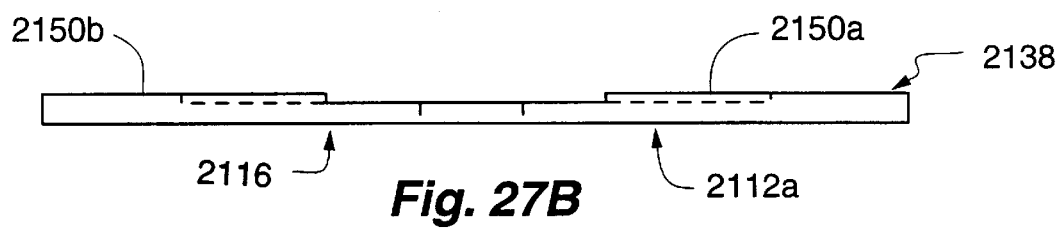
FIGS. 27A through 27C show an alternative embodiment of the carddisc 2112 of the present invention wherein the optical data storage area 2140 is recessed in comparison to surrounding areas 2150a and 2150b, thereby providing protection to the optical data storage area.
Figure 27A:
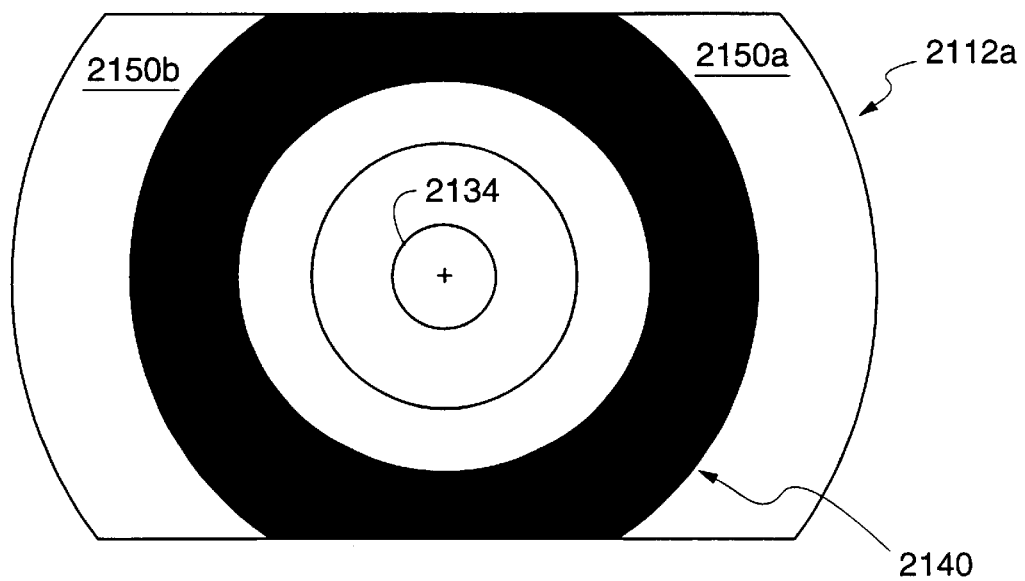
Figure 27C:
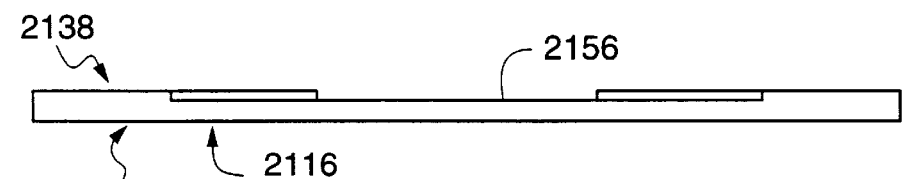

The placement of the defects is controlled such that the created errors are individually detectable. One method of this may be the placement of defects in no more than every third sector, so that the effect of the normal interleaving of the original data is negated such that a detected error in a specific block of 3 sectors can be identified as being the effect of a purposefully induced defect in a specific sector. Further, this software determines the areas of a master disc in which to place each purposefully induced defect by its sector address or time code. Subsequently, the software of the present invention causes the master disc generating device to use the modified code in place of the code derived directly from the source signals to thereby generate defects on a master disc. For example, the defective code may be a continuous data pattern of "1"'s or a continuous pattern of "0's", which, in turn causes an LBR (Laser Beam Recorder) of a master disc generating device to either remain in an "on" condition, creating a continuous pit, or to remain "off", creating a continuous land, as one skilled in the art will understand. Accordingly, by replacing a valid data pattern within an area of the master disc with a continuous data pit 2020 (FIG. 23) or data land 2022 (FIG. 24), a corresponding digital error can be generated on an optical disc generated from the disc master, wherein the error is either correctable or uncorrectable, depending on the size of the defect 2020 (or 2022) and its position with regard to surrounding data bits. For example, an uncorrectable such continuous data pit or data land may be at least approximately 300 $\mu$m in length, and a correctable such data pit or data land may be less than approximately 300 $\mu$m in length. Such a defect 2020 or 2022 may be of normal track width in the radial direction 2024 for the optical disc medium. Note that in a typical optical disc manufacturing process, commercially distributable optical discs have their data encodings created through a variety of manufacturing processes including: injection/compression molding, utilizing a metal stamper which is a generated metal part that is the "inverse image" of the original master disc, or in some cases, the original master disc, where the original master disc is inscribed with the inverse image of the final disc data pattern; and a printing method that creates the data pattern on a subsurface of the final disc.

Technique 2. Alternatively, a mastered defect may be created that spans multiple tracks. In FIG. 25, a mastered defect 2026 is shown that is of multi-track width in the radial direction 2024. The defect 2026 may be of sufficient length in the tracking direction 2028, or include a long enough series of smaller mastered defects that are of multi-track width in the radial direction 2024 so that either a correctable or uncorrectable data error is generated when a read is attempted.

Accordingly, such a defect 2026 can replace the legitimate data that would normally reside in that particular area.

Technique 3. In another technique, a mastered defect may be etched into either a glass master or one of the series of metal parts generated from it. Accordingly, the etched defect will be duplicated in the commercially distributable optical discs that are either directly or indirectly generated from the master so that the commercially distributable optical disks have corresponding defects of sufficient length in the tracking direction or there are a series of etched defects of sufficient quantity and length in the tracking direction to cause either a correctable or uncorrectable data error to be generated when such a generated commercially distributable disk is supplied to an optical reader. The process of etching in defects may be accomplished by any means that is adequate to create the desired defect (for example: laser etching, burning, drilling, cutting, slicing, punching, etc.). Such a defect replaces the data that normally resides in the area etched. The defect can be either of normal track width or of multi-track width in the radial direction 2024 for that particular optical disc medium. Such etching may also be controlled by a locating technique which provides a similar data location accuracy as provided by the software program described hereinabove for placing defective data pits or data lands on a master disc. This locating technique may involve: (a) inscribing a radial line outwardly from a center of the surface of the disc; (b) utilizing testing device to locate both this radial line and the location of a specific data area with respect to the radial line; and (c) having the testing device provide the position of the specific data area with respect to the radial line, wherein the defect will be created on this specific area.

Technique 4. In another embodiment, one or more defects can be created in each commercially distributable optical disc by physically damaging each such optical disk directly during the manufacturing process by techniques such as cutting, slicing, punching, burning, etching, painting, sticking the disk with a sharp pointed implement, etc., so that a purposefully induced defect of sufficient length in the tracking direction is produced, or a series of physical defects of sufficient quantity and length in the tracking direction is produced to generate one or more correctable or uncorrectable data errors when a read of the defective area is attempted. As in previous embodiments, the defects for the present embodiment replace the data that would normally reside in the particular areas having the defects. Moreover, such one or more defects are either of normal track width or of multi-track width in the radial direction for the particular optical disc medium being utilized.

In a fourth collection of embodiments of the present invention, effectively non-reproducible transaction cards for financial transactions can be provided by the present invention. That is, an optical medium (such as a portion of an optical disk material) is provided on a transaction card along with a mechanism, such as a ripcord, for purposefully damaging the optical medium. Thus, prior to issuing such a transaction card to a user, the optical medium is purposefully damaged, and the financial institution stores an encoding of a mapping of the damaged and/or undamaged areas of the optical medium. Subsequently, the user is provided with the damaged transaction card. Thus, whenever a transaction is performed with the transaction card, the damaged optical medium thereon is optically sampled for determining if the samples are consistent with the encoded mapping stored by the financial institution. If so, then the transaction may be allowed. If not, then the transaction is canceled.

In a fifth collection of embodiments of the present invention, authentication of a user requesting a financial transaction is provided. In one such embodiment, a compound that is, for instance, sensitive to touch (e.g., oil reactive, heat sensitive and/or amino acid sensitive) may be layered or coated on an optical medium included on a transaction card (e.g., credit card). Thus, assuming the touch sensitive compound (e.g., a polymer) is sufficiently sensitive so that a user's fingerprint is reliably and accurately duplicated on the compound thereby causing a change in the optical characteristics of the optical medium, then once a fingerprint is provided on the touch sensitive compound, it can be optically sampled for sensing changes in the read-ability of the optical medium underneath the compound. Thus, assuming the financial institution or some other independent third party has access to a previously stored representation of the user's fingerprint, a computational determination can be made as to whether the samples are consistent with the stored representation. Moreover, if the touch sensitive compound is reversible in that the compound only retains an image of the fingerprint for a relatively short time period (e.g., one to five minutes), then there may be high confidence that a match of the optical medium samples with the stored fingerprint representation corresponds with a verification of the user's identity. That is, such a match likely implies that a legitimate user of the card recently had the transaction card in his/her possession.

In a related embodiment, the identity of a user desiring to perform an electronic transaction on the Internet may be verified by the present invention. For example, by providing a predetermined area of an optical disk with a touch sensitive compound as above for temporarily retaining an image of a fingerprint, the identity of an Internet user can be verified. That is, upon commencing an Internet financial transaction, the steps of the flow chart of FIG. 22 may be performed. Accordingly, in step 2204, an Internet user desiring to perform such a financial transaction is instructed to locate an optical disk of the present invention for Internet user verification wherein this disk includes a predetermined area having the touch sensitive compound. Subsequently, in step 2208, the user provides an imprint of his/her fingerprint (or other body part) on the predetermined touch sensitive area of the optical disk. Following this, in step 2212, the user then inserts the optical disk into an optical disk access device (such as a conventional optical disk peripheral attached to the user's Internet computer). Next, in step 2216, a process is activated on the user's Internet access device for optically sampling the predetermined touch sensitive area of the optical disk. Then, in step 2220, an encoding of the samples is transmitted to the particular Internet node responsible for determining the authenticity of the transaction. Thus, in step 2224, this particular Internet node compares the samples with a previously stored representation of the user's fingerprint for determining whether the samples are consistent with the fingerprint representation. Accordingly, if the samples are sufficiently consistent, then the transaction is completed as in step 2228. Alternatively, if this is not the case, then the transaction is voided as in step 2232.

In a sixth collection of embodiments of the present invention, a data card may be provided that includes data stored thereon in a combination of data storage mediums including a magnetic strip and an optical storage portion (e.g., one of an optical disk and a magneto optical disc). In FIGS. 26A–26D, a card according to this sixth collection of embodiments is disclosed (denoted hereinafter as a "carddisc" 2112), wherein, in one embodiment, a first side of the card includes typical identification/financial card information and the second side has optical information stored substantially as is done on optical discs. Thus, since the carddisc 2112 is approximately the size of a typical credit card, the present invention may provide dual purpose functionality in that it can be used in typical magnetic card swipe readers as well as optical disc readers. Accordingly, on side 2116 (FIG. 26A) of the carddisc 2112, the following features may be provided: (a) a magnetic reading strip 2120 for storing date that can be read by card swipe readers, (b) signature location 2124 and imprinted identification information including: (i) the name 2128 of the individual to which the carddisc is assigned (and/or the individual capable of providing access to the data encoded on the carddisc), (ii)

an expiration date 2132 of the carddisc, and (iii) a card holder identification number 2136, wherein the name, date and identification number are embossed, printed and/or laminated or otherwise attached to the carddisc. Thus, side 2116 provides the information typically provided on, e.g., a credit card.

On the opposite side of the carddisc 2112, side 2138 (FIG. 26B), optical disc data is encoded in the optical data storage area 2140 (shown as darkened). The optical data storage area 2140 of the carddisc 2112 includes an optical medium that may be read, e.g., by a conventional optical reader such as a CD-ROM and/or DVD reader when the center hole 2134 is aligned with a spindle of the optical reader for spinning the carddisc 2112 thereabout. Thus, detailed records relating to the cardholder and/or the use of the carddisc 2112 can be stored on this portion of the carddisc. In particular, 50 to 100 megabytes of data may be stored in the approximately ¼ inch inner radial extent of the optical data storage area 2140 from the center of the center hole 2134. Thus, detailed financial, medical, educational and/or vocational records can be provided thereon.

The carddisc 2112 may be circular in shape or, in some embodiments, contain straight edges and/or a combination of straight and curved edges. Note that a combination of straight and curved edges may facilitate the carddisc 2112 being used both for financial transaction data transfers via, e.g., in magnetic card swipe readers, as well as being used in conventional optical compact disc and DVD readers for reading and/or writing, more copious amounts of data. Moreover, the carddisc 2112 can be square or rectangular in shape and may also contain some or all of the features in FIGS. 26A–26D. Further, note that protection of the optical data storage area 2140 of the carddisc may be enhanced by the addition of a sleeve, wherein the optical data storage area is rotatable within the protective sleeve in a manner similar to magnetic diskettes typically used with personal computers for storing data.

The optical data storage area 2140 may be of any type such as: (a) a read-only (e.g., CD-ROM or CD DVD), (b) read/write-once (e.g., CD-R or DVD-R), or (c) read/write many times (e.g., CD-RW or DVD-RW). The optical data storage area 2140 may also utilize technologies for copy protection such as optically sensitive polymers, oxidative polymers, embedded or painted defects and protection bands and software to limit or control usage as, for example, disclosed hereinabove. The optical data storage area 2140 may also utilize other protection technologies such as encryption and/or passwords to limit access or control usage.

Additionally, note that at least on the side 2138 of the carddisc 2112, the areas 2150*a* and 2150*b* may include decorative artwork including pit art (where instead of using optically reflective pits and lands for encoding data bits, the pits and lands are used for creating a picture), and printed materials such as logos.

Further note that an embodiment of the carddisc 2112 having the ability to (re)write to the optical data storage area 2140, may also be used as a "Smart Card" with vastly superior storage capabilities to prior art Smart Card technologies and at a much cheaper cost to manufacture.

FIGS. 27 through 30 show alternative embodiments of the present invention wherein comparable features to those in FIGS. 26A–26D have identical numerical labels. Referring to FIGS. 27A and 27B, the side 2138 of the carddisc 2112*a* having the optical data storage 2140 has raised decorative areas 2150*a*, 2150*b*. Such raised areas may be utilized to protect the optical data storage area 2140 from abrasive damage when the carddisc 2112*a* is swiped through credit card readers for reading, e.g., the magnetic strip 2120 on the opposite side (side 2116) of carddisc 2112*a*, (this opposite side including some or all of the features included in side 2116 of the carddisc 2112 embodiment of FIG. 26A). Additionally, as shown in FIG. 27C, the optical data storage area 2140 may have a protective plastic covering 2156 to further protect the optical storage area 2140.

Figure 28A:
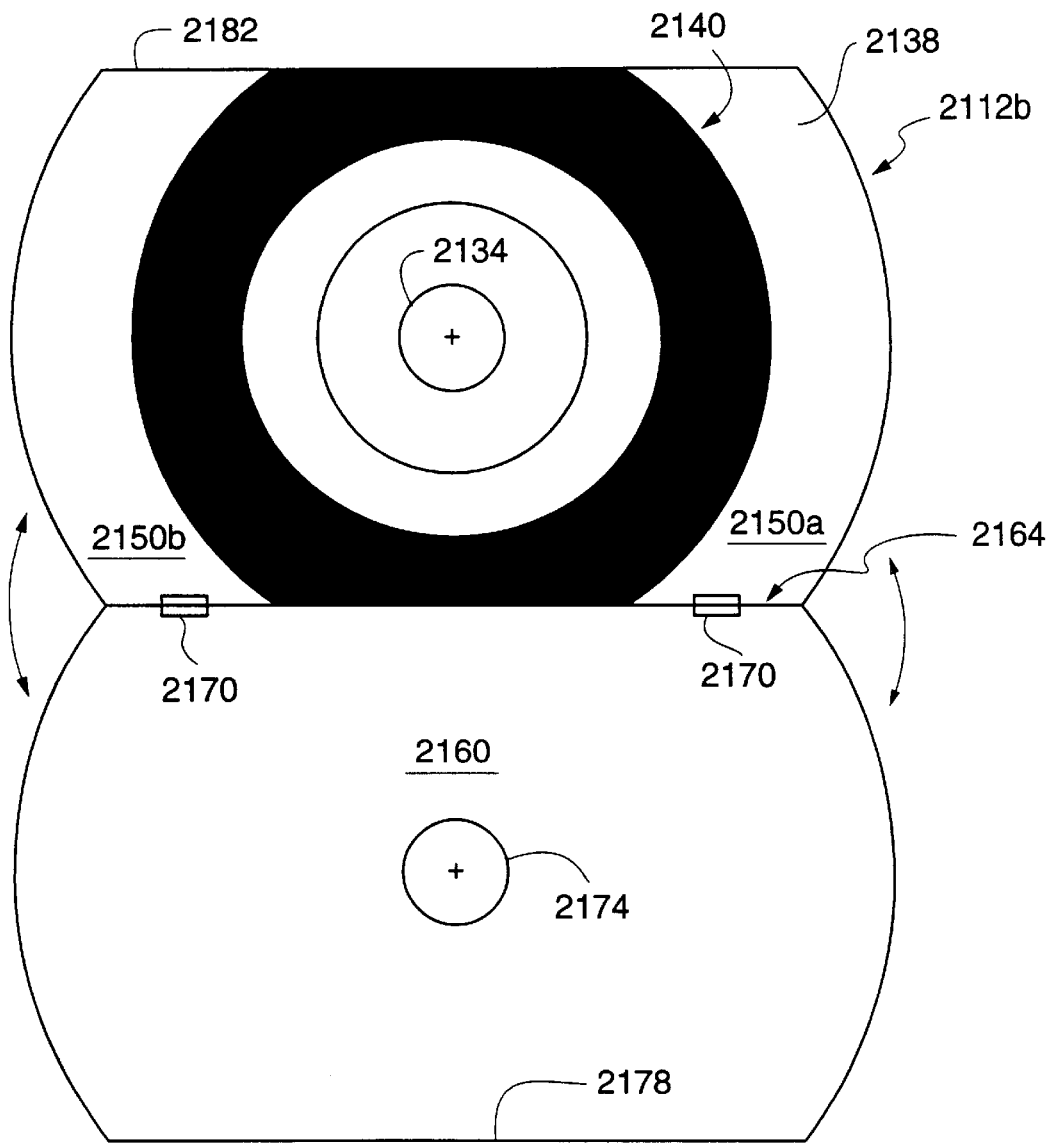
FIGS. 28A and 28B show another embodiment of the present invention wherein there is a protective cover 2160 for protecting the optical data storage area 2140 from damage.
Figure 28B:
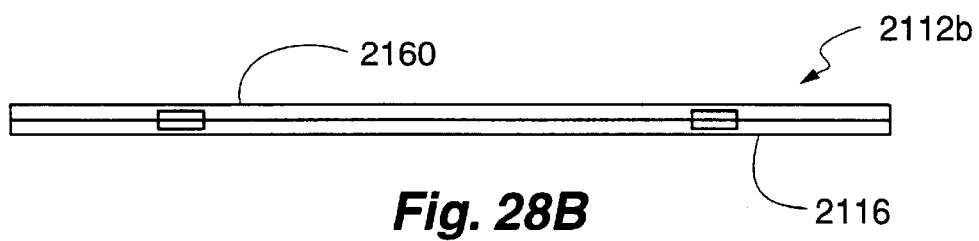

Referring to FIGS. 28A and 28B, another embodiment of the present invention is shown wherein a carddisc 2112*b* includes a protective cover 2160 that is attached to an edge 2164 by one or more hinges 2170 so that the cover 2160 is capable of folding adjacent to side 2138 for protecting optical data storage area 2140 when the carddisc 2112*b* is used in card swipe readers, and is capable of folding adjacent to the opposite side (side 2116) when the data encoded in optical data storage 2140 is to be accessed. Accordingly, protective cover 2160 includes a center hole 2174 that aligns with the center hole 2134 when the protective cover is folded adjacent to side 2116 so that an optical reader spindle can align with the center holes and spin the carddisc 2112*b* substantially as a conventional optical disc. Additionally, note that the edge 2178 of the protective cover 2160 may include one or more latches (not shown) that can be used for securing the protective cover 2160 to the edge 2182 when the protective cover is folded adjacent to side 2116 and/or side 2138. Additionally, note that the surface of protective cover 2160 that becomes adjacent to side 2138 when the side 2138 is protected may also include a second optical data storage area (not shown).

Figure 29A:
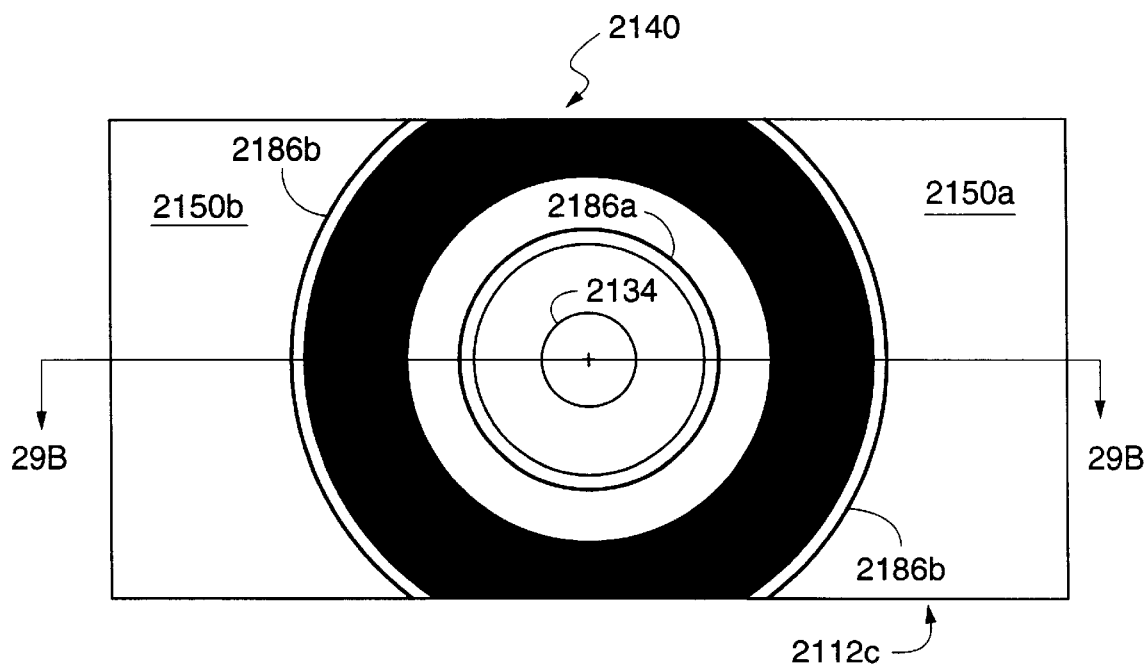
FIGS. 29A and 29B provide yet another embodiment of the present invention, wherein protective offset rings 2186a and 2186b are provided about the optical data storage area 2140 for protecting this storage area.
Figure 29B:
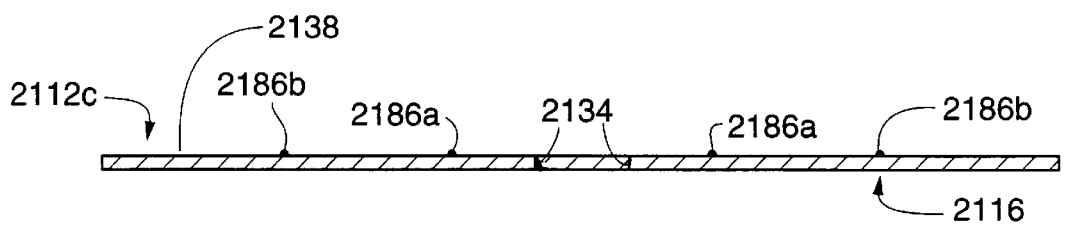

In FIGS. 29A and 29B an embodiment 2112*c* of the carddisc is shown wherein side 2138 includes one or more raised offset rings 2186 both for protecting the optical data storage 2140 from damage during use of the carddisc in a magnetic card swipe card reader, and for assisting in alignment of the carddisc when provided in an optical disc reader. In particular, the offset ring 2186*b* may be used for mounting carddisc 2112*c* so that this ring aligns with a minidisc recess provided on a typical compact disc cradle. That is, this offset ring 2186*b* has a radius from the center of the center hole 2134 that allows this offset ring to fit within the recess that is used for aligning minidiscs within the compact disc cradle and thereby assists in aligning the carddisc with the optical reader so that the carddisc rotates properly.

Figure 30A:
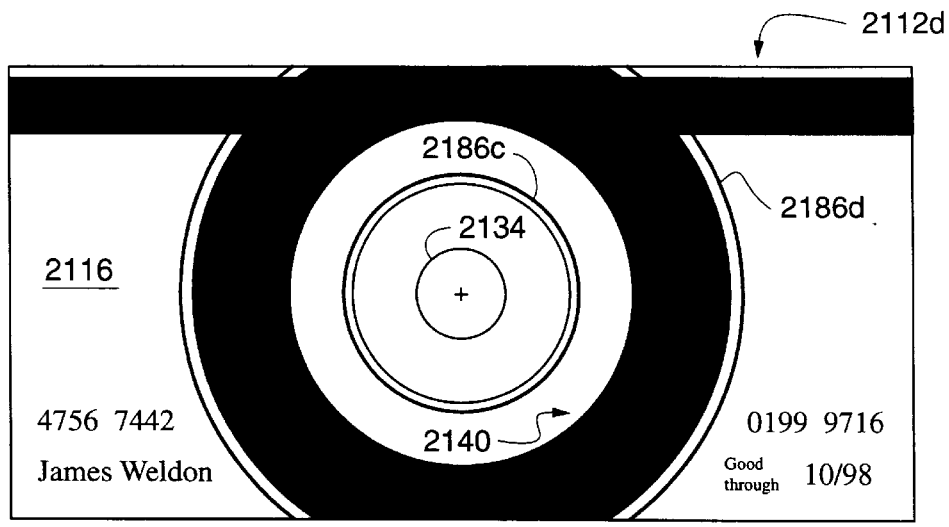
FIGS. 30A through 30C illustrate another embodiment of the present invention, wherein an additional optical data storage area 2140a is provided on an opposite side of the carddisc 2112d from that of the optical data storage area 2140. Additionally, note that this embodiment provides offset protective rings 2186 on both sides of the carddisc 2112d.
Figure 30B:
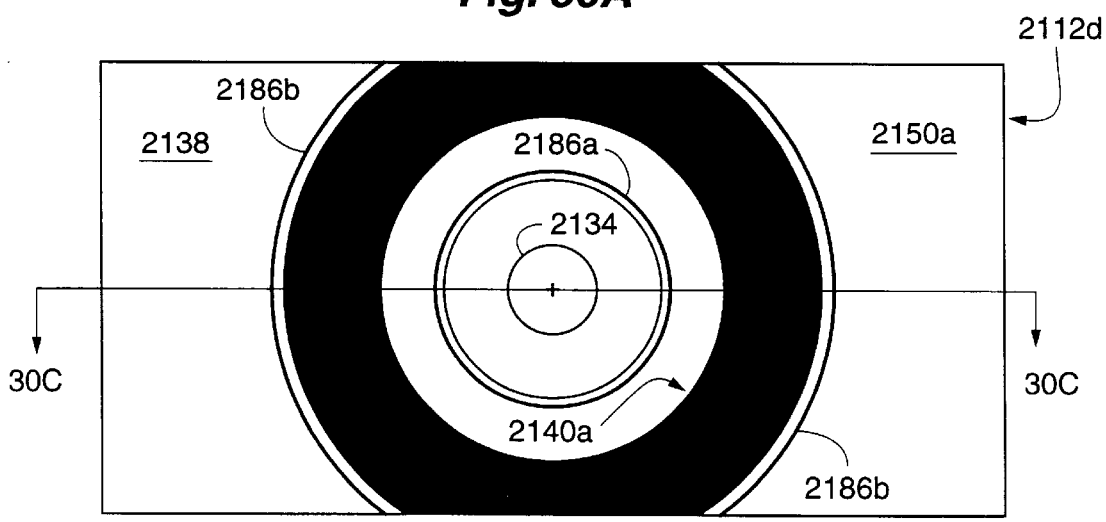
Figure 30C:
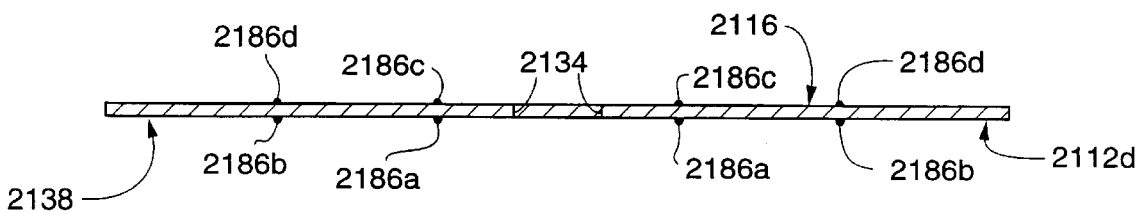

In FIGS. 30A through 30C, an embodiment 2112*d* of the carddisc is shown, wherein in addition to the optical data storage area 2140 being provided on side 2116, there is another optical data storage area 2140*a* provided on side 2116. Accordingly, to protect the optical data storage areas 2140 and 2140*a*, the present embodiment provides offset rings 2186*a* and 2186*b* on side 2138, and offset rings 2186*c* and 2186*d* on side 2116. However, it will be appreciated that any of the other features for optical data protection described in previous embodiments of a carddisc can be utilized here as well.

Figure 31A:
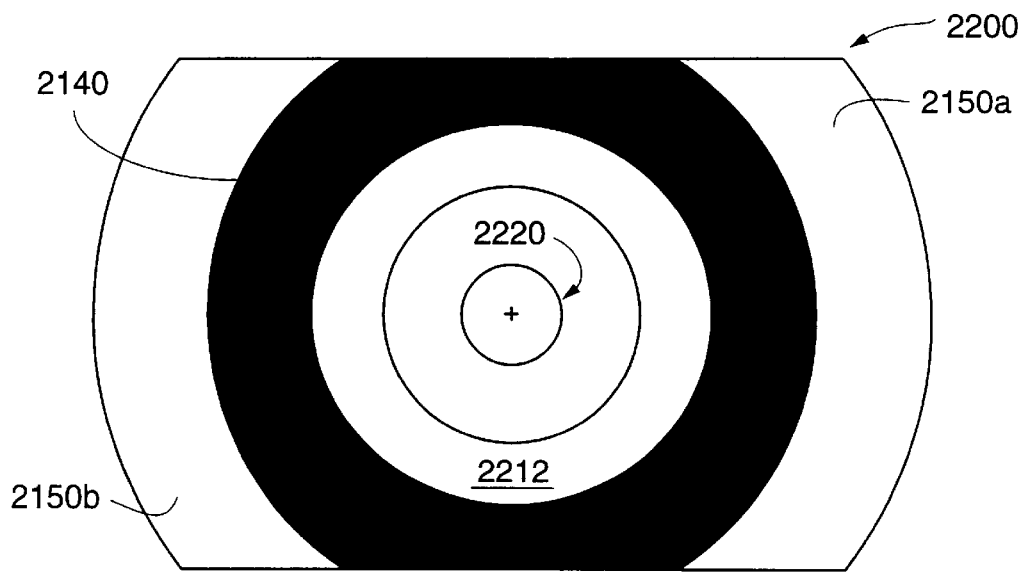
FIGS. 31A through 31C illustrate another embodiment of the present invention, wherein there are separable portions of the carddisc. In particular, the carddisc of the present embodiment includes a thin film data layer 2200, having potentially large amounts of data storage for storing data encoded thereon for being optically read by substantially conventional optical disc readers, and a base portion 2204 upon which the layer 2200 may be provided when such data storage is to be accessed.
Figure 31B:
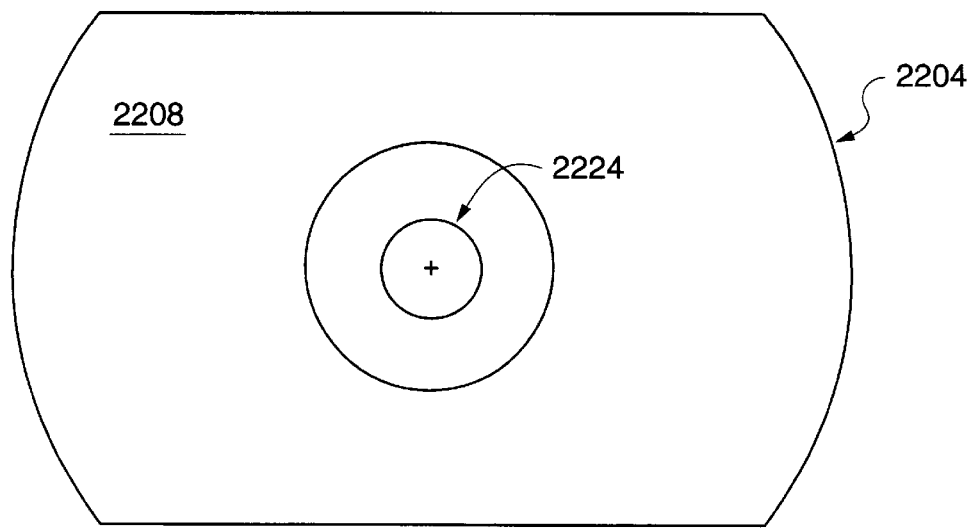
Figure 31C:
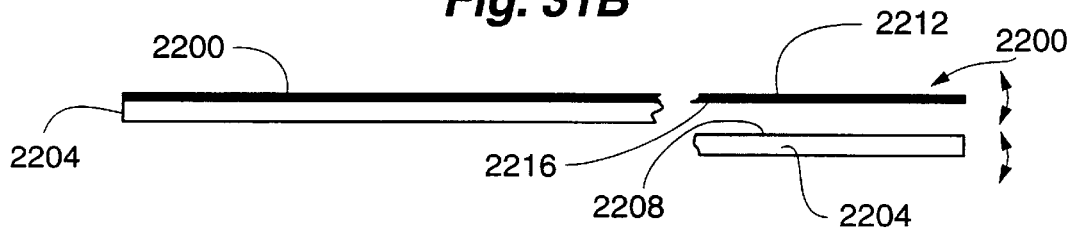

Another embodiment of the present invention is illustrated in FIGS. 31A through 31C. In the embodiment of these figures, a thin film data layer 2200 is provided with a data storage area 2140, and decorative areas 2150*a* and 2150*b*. The layer 2200 can be repeatedly attached and detached from a carddisc base 2204, which in some embodiments, is clear and is sufficiently rigid to maintain a substantially planar surface 2208 upon which the thin film layer 2200 can be attached and reattached. In addition to having the data storage area 2140 and the decorative areas 2150*a* and 2150*b*, the layer 2200 may also include a magnetic strip area (e.g., on the same side 2212 of the layer as the data storage area 2140, or on an opposite side 2216 of the layer 2200). Moreover, the layer 2200 may contain other forms of identification such as a user name area 2128, signature location 2124, one or more account numbers and an expiration date.

The data layer 2200 can be produced by printing and/or bonding the above-mentioned data areas to, e.g., a Mylar sheet or substrate. In particular, such printing and/or bonding techniques can be used to provide the optical data storage area 2140. That is, such techniques are capable of providing metalized optically detectable data structures corresponding to the pits and lands of compact disc data encodings. Accordingly, various types of optical data storage technologies may be used for the data storage area 2140. In particular, the data storage area 2140 may be read-only, write once (e.g., CDR, DVDR) and/or read-write many times (e.g., CDRW, DDDRW). The layer 2200 also includes a center hole 2220 that is intended to substantially align with a center hole 2224 in the carddisc base 2204 when the layer 2200 is properly aligned on the base 2204 so that similarly shaped edges coincide.

Regarding the carddisc base 2204, in one embodiment, the base is a clear plastic that is effective for providing both proper support and for providing a surface 2208 with adherence qualities that are compatible with repeatedly attaching and detaching a thin film layer 2200. In another embodiment, the carddisc base 2204 may be hinged along an edge such as in FIGS. 28. Accordingly, in such an embodiment, the layer 2200 may be placed between the hinged portions of the base 2208 when data on the layer 2200 is to be accessed. In another embodiment, a slot (not shown) may be provided within the thickness of the base 2204, wherein a layer 2200, enclosed within a laminate for providing greater rigidity, is able to be inserted within the slot when the data on the layer is desired to be read. Subsequently, the layer can be removed from the slot when it is not desired to (optically or magnetically) access the data on the layer.

A plurality of layers 2200 may be easily carried by a user in, e.g., a compact carrying case, and when desired, the user can select one of the plurality of layers 2200 to be combined with a carddisc base 2204 for communicating data with a compatible optical or magnetic device such as a CD or DVD optical data reader, or a magnetic card swipe reader.

Note additionally, that a base 2204 need not be carried by a user. For example, a base 2204 may be provided for use with each optical or magnetic device for exchanging data with a layer 2200 selected by a user.

Also, note that various encryption, authentication, and/or copy protection techniques may be used with the present invention. In particular, chemically reactive polymers, purposefully embedded defects, and/or protection bands may be provided on either side of the layer 2200 and/or the base 2204 as described hereinabove.

In the seventh collection of embodiments of the present invention, information related to an item can be encoded on a time sensitive optical medium that changes optical characteristics over time so that the information transforms from readable to unreadable, or from unreadable to readable. In particular, certain compounds such as are disclosed above relating to the first collection of embodiments of the present invention may be utilized in the present collection of embodiments. For example, certain time sensitive items may require corresponding data for labeling, identifying and/or documenting of the items. For instance, such items may be cashier's checks or money orders that must be used in a financial transaction in a predetermined time period. That is, by using the present invention, bank routing numbers or other fields may be provided on a time sensitive polymer that becomes unreadable after a predetermined time has expired. Thus, prior to becoming unreadable, such identification data may be read by an automatic or computerized check clearing system, whereas after a predetermined time of, e.g., light exposure and/or oxygen exposure, the data becomes unreadable. Additionally, event tickets and/or time sensitive medical supplies may also be similarly labeled with polymers of the present invention.

Accordingly, the present invention has been described at some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. An identification card, comprising:
   a magnetic strip for encoding data thereon, wherein said strip is capable of being read when said card is swiped through a magnetic strip reader, said strip detectable from a first surface of said card;
   an optical data storage portion for encoding data thereon, wherein said optical data storage portion is capable of being read from one of: said first surface, and a second surface of said card, when an optical disc reader rotates said card about a hole in said card.

2. An apparatus as claimed in claim 1, wherein said card is approximately 2¼ inches by 3⅜ inches.

3. An apparatus as claimed in claim 1, wherein said optical data storage portion includes data readable by one of a compact disc reader, and a DVD reader.

4. An apparatus as claimed in claim 1, further including visually detectable information on one of said first and second surfaces.

5. An apparatus as claimed in claim 4, wherein a name identifying a person that can provide access to the data encoded on the card is provided on one of said first and second surfaces.

6. An apparatus as claimed in claim 1, wherein said optical data storage portion is recessed from at least a raised boundary area surrounding said optical data storage area.

7. An apparatus as claimed in claim 1, wherein said card includes a protective covering for said optical data storage portion.

8. An apparatus as claimed in claim 7, wherein said protective covering is foldable so that said protective covering is capable of folding adjacent to said first side in a first configuration, and adjacent to said second side in a second configuration.

9. An apparatus as claimed in claim 8, wherein said optical data storage portion is provided on said protective covering.

10. An apparatus as claimed in claim 1, wherein a second optical data storage portion is included on one of said first and said second sides not having said optical data storage portion.

11. A method for limiting the use of information stored on an optical medium, comprising:
   providing the optical medium to an optical reader, wherein said optical medium has information thereon, and a portion of the information is for performing, via a computational device in communication with the optical reader, an action desired by a user;
   determining, using the optical reader, whether there is a result that is indicative of an instance of an expected profile on the optical medium;

performing, when an instance of said expected profile is not detected, substeps (a) and (b) as follows:
(a) requesting the user to create an instance of said expected profile on the optical medium, wherein during creation of said instance, data at one or more locations on said optical medium is changed without determining an address for at least some of the locations; and
(b) encoding data related to said instance with data identifying one of: (i) the computational device and (ii) the user for obtaining a substantially unique identifier;

obtaining a second identifier from the user;

activating the desired action using the information from the optical medium when a comparison of said unique identifier and said second identifier result in a first predetermined value; and prohibiting said step of activating when said comparison of said unique identifier and said second identifier result in a second predetermined value.

12. A method as claimed in claim 11, wherein one or more of (a)–(d) following:
(a) said step of performing includes creating, by the user, said instance of said expected profile as a substantially irreversible change on said optical medium;
(b) said step of determining includes detecting said instance as one or more of: (i) an error, (ii) an absence of an error, (iii) a distinctive pattern of errors, and (iv) a distinctive pattern of an absence of errors; and
(c) said step of determining includes attempting to access a portion of the information residing within a predetermined part of the optical medium where said instance is expected to reside, wherein said predetermined part includes a minority of a total storage capacity of the optical medium; and
(d) said step of encoding includes using, as at least part of said data, data indicative of an identity of one or more components of said computational device.

13. A method as claimed in claim 11, further including one or more of:
(a) a step of damaging said optical medium by a mechanical activity for changing a reflective characteristic of the optical medium by one of: tearing and etching a layer of the optical medium;
(b) a step of encoding one of a damaged and undamaged portion of the optical medium for identifying a financial transaction card having said optical medium, after said step of damaging is performed;
(c) a step of removing an item attached to the optical medium; and
(d) a step of changing a reflective characteristic of the optical medium by one of: exposing the optical medium to a reactive chemical, rupturing a chemical container attached to the optical medium, and exposing a predetermined part of the optical medium having a light sensitivity to an effective amount of light for changing the reflective characteristics of the optical medium.

14. A method as claimed in claim 11, further including a step of creating access errors as an instance of said expected profile prior to performing said step of providing.

15. A method of limiting the use of information stored with an optical medium, comprising:
providing, to an optical reader, the optical medium having information thereon, and wherein said information includes first information useful for performing a desired action;

determining whether an expected profile of a purposefully induced change in the access of the information is detected;

performing the desired action using the first information when said expected profile is detected; and prohibiting said step of performing when said expected profile is not detected;

wherein said step of determining includes substeps (a) and (b) following:
(a) sampling locations on the optical medium for detecting data access errors, thereby obtaining location data related to the detection of the data access errors; and
(b) comparing the expected profile with the location data for thereby detecting said change in the access of the information.

16. A method as claimed in claim 15, wherein one or more of:
(a) said step of comparing includes evaluating a function dependent on one of: a number of errors detected on said optical medium, a relative number of errors detected on said optical medium, a pattern of errors on said optical medium, a density of errors detected on said optical medium and a location of errors detected on said optical medium;
(b) said step of comparing includes comparing a result of said function with a value obtained using at least one of: a minimum threshold in the number of errors expected, a minimum threshold density in the number of errors expected, a maximum threshold in the number of errors expected, and a maximum threshold density in the number of errors is expected; and
(c) said step of sampling includes detecting a set of data access errors severe enough to that error correction modules identify said errors differently from less severe errors.

17. A method of limiting the use of information stored with an optical medium, comprising:
providing, to an optical reader, the optical medium having information for performing a desired action;

determining whether an expected profile of a purposefully induced change in the access of the information is detected;

performing the desired action using the information when said expected profile is detected; and prohibiting said step of performing when said expected profile is not detected;

wherein said step of performing includes a step of correcting data access errors detected as part of said expected profile;

wherein said step of correcting is performed during said performing of the desired action.

18. A method as claimed in claim 17, wherein one or more of:
(a) at least some of said access errors are induced by microdots, and
(b) said microdots each have a size of approximately less than 1000 microns.

19. A method of limiting the use of information stored with an optical medium, comprising:
providing, to an optical reader, the optical medium having information for performing a desired action;

determining whether an expected profile of a purposefully induced change in the access of the information is detected;

performing the desired action using the information when said expected profile is detected;

prohibiting said step of performing when said expected profile is not detected; and reducing access errors for obtaining said expected profile.

20. A method as claimed in claim 19, including one or more of:
   (a) a further step of changing a reflective characteristic of the optical medium for obtaining said expected profile; and
   (b) a further step of removing an attached layer from the optical medium for obtaining said expected profile.

21. A method as claimed in claim 19, wherein:
   (a) said step of performing includes conducting a financial transaction, wherein said optical medium is included on a card for conducting the financial transaction; and
   (b) said step of determining includes reading identifying data on said card for identifying a previously stored representation of said expected profile.

22. A method of limiting the use of information stored with an optical medium, comprising:
   providing, to an optical reader, the optical medium having information for performing a desired action;
   deactivating at least a portion of an error correction module of the optical reader;
   determining whether an expected profile of a purposefully induced change in the access of the information is detected;
   reactivating said portion of the error correction module of the optical reader;
   performing the desired action using the information when said expected profile is detected; and
   prohibiting said step of performing when said expected profile is not detected.

23. A method of limiting the use of information stored on an optical medium, comprising:
   providing, to an optical reader, the optical medium having information thereon, including first information for performing a desired action;
   determining whether an instance of an expected profile of a purposefully induced change in the access of the information on said optical medium is detected, wherein said purposefully induced change is capable of being instanced on said optical medium by changing a result of an access to the information at one or more data locations on said optical medium without determining an address for each of said data locations;
   when said instance of said expected profile is detected, the steps (a) through (c) following are performed:
      (a) encoding said instance;
      (b) outputting said encoded instance to a user of the optical medium during an installation of said first information onto a computational device upon which the desired action is at least partially performed;
      (c) performing the desired action using the first information; and
   prohibiting said step of performing when an instance of said expected profile is not detected.

24. A method as claimed in claim 23, wherein one or more of:
   (a) said step of encoding includes encrypting said detected instance together with identification data related to at least one of: an identity of the user, and an identity of at least one component of a device used for processing the first information on the optical medium.

25. A method of limiting the use of information stored with an optical medium, comprising:
   providing, to an optical reader, the optical medium having information thereon, including first information for performing a desired action;
   determining whether an instance of an expected profile of a purposefully induced change in the access of the information on said optical medium is detected;
   activating the desired action using the first information when said instance is detected; and
   prohibiting said step of activating when an instance of said expected profile is not detected until the steps (i)–(iii) following are performed:
      (i) removing, by the user, the optical medium from the optical reader prior to an operative access of said first information by a computational device in operative communication with the optical reader;
      (ii) altering an optical characteristic of the optical medium while the optical medium is removed form the optical reader to provide an instance of said purposefully induced change; and
      (iii) providing, again, said optical medium to the optical reader for completing the operative access.

26. A method of limiting the use of information stored with an optical medium, comprising:
   providing, to an optical reader, the optical medium having information, including first information for performing a desired action;
   purposefully inducing a change in access errors at each of one or more locations of the optical medium for instantiating an expected profile of an image of a body part on a touch sensitive portion of said optical medium;
   determining whether said expected profile of the purposefully induced change in the access of the information is detected;
   performing the desired action using the first information when said expected profile is detected; and
   prohibiting said step of performing when said expected profile is not detected.

27. A method as claimed in claim 26, including one or more of:
   (a) a further step of comparing a representation of said provided image with a previously stored representation of a body part image for determining a consistency between said provided image representation and said previously stored image representation;
   (b) a further step of transmitting said representation of the provided image on a communications network for performing electronic commerce; and
   (c) said step of providing including a step of providing said touch sensitive portion with a compound reactive to one of heat, pressure, and a bodily produced substance.

28. A method for limiting the use of information stored on an optical medium, comprising:
   creating an instance of an expected profile of access errors provided at a plurality of addressable locations on said optical medium, wherein for at least one said addressable location, there is an access error change without identifying said addressable location during said access error change;
   detecting said instance of an expected profile of said access errors on said optical medium;
   encrypting together a representation of said instance and identification data related to at least one of: an identity of the user, and an identity of a device for accessing the information on the optical medium, wherein a result of said step of encrypting yields an identifying code;

comparing said identifying code with a user input;

performing the user desired action using the information when said identifying code provides a favorable comparison with the user input; and prohibiting a performing of the desired action when said encoding provides an unfavorable comparison with the user input.

29. An apparatus for limiting the use of information stored with an optical medium, comprising:

an optical medium having stored information, wherein said information is used in performing an action desired by a user;

means for producing a change in the errors encountered when an optical reader accesses said information on said optical medium, wherein said means for producing is used for creating an instance of an expected profile of access errors provided at a plurality of addressable locations on said optical medium, wherein for at least one of said addressable locations, said means for producing is used for producing a corresponding access error change without identifying said addressable location;

means for detecting first data representative of said instance;

a first module for deactivating, when said means for detecting is active for detecting said instance, an error correction module of the optical reader so that the error correction module is not capable of attempting a correction of at least one of the errors that the correction module would otherwise attempt to correct;

an encoder for encoding said first data together with second data indicative of one or more of: (i) an identity of one or more components of a computational system in operative communication with the optical reader for performing the desired action; and (ii) user data identifying the user;

a second module for comparing an input by the user with an encoded identifier resulting from activating said encoder, wherein a result from said comparing determines whether the information can be used to perform the desired action.

30. An apparatus as claimed in claim 29, wherein said means for producing includes one of:

(i) a layer on said optical medium that is reactive to one of: light and oxygen;

(ii) pointed device for etching said optical medium for producing said instance;

(iii) a compound chemically reactive with said optical medium for purposefully applying thereto for creating said instance;

(iv) an attachment to said optical medium that when purposefully detached from said optical medium produces said instance;

(v) an instrument detachable from said optical medium, wherein said instrument changes an external surface of said optical medium when applied to the optical medium, said instrument includes one of: means for scoring, and means for removing a layer of said optical medium;

(vi) a data mask attached to the optical medium;

(b) said means for producing creates one of:

(i) a reduced number of said access errors; and (ii) an increased number of said access errors;

(c) said means for producing creates a substantially irreversible change to said optical medium.

31. A method of limiting access to stored data on an optical medium comprising:

inserting the optical medium into an optical medium access device for accessing information in at least one of a predetermined first storage portion and a predetermined second storage portion of the optical medium;

activating an instance of a desired computer application, wherein said application has program instructions stored in said predetermined second storage portion;

purposefully inducing a change in the first storage portion after said step of activating, wherein said change is irreversible;

obtaining a response indicative of whether the purposefully induced change exists; and determining whether said instance is allowed to continue access the program instructions in said predetermined second storage portion by accessing said response indicating the existence of said change.

32. A method of limiting access to stored data on a storage medium, comprising:

inserting the storage medium into a storage access device for accessing information in at least one of a predetermined first storage portion and a predetermined second storage portion of the storage medium;

activating a desired computer application, wherein to perform said application, information in said predetermined second storage portion must be used;

purposefully inducing a change in the first storage portion;

determining a target density of location samples in the first storage portion that is effective for detecting said change;

selecting a sampling of a plurality of the storage medium locations, wherein the locations of the sampling are selected so that at least some of said locations selected are dependent upon said density of samples within the first storage portion;

detecting said change by accessing the locations of the sampling;

obtaining a response indicative of whether the purposefully induced change exists; and determining whether to use the information in said predetermined second storage by accessing said response indicating the existence of said change.

33. A method of limiting the use of information stored with an optical medium, comprising:

providing, to an optical reader of a particular computing system, a particular optical medium having information for performing a desired action;

first accessing the information on said particular optical medium to determine an instance of an expected configuration of results from accessing the information;

second accessing one or more identifiers for identifying at least part of said particular computing system;

generating authentication data for identifying said particular computing system and said particular optical medium, wherein said authentication data is dependent on both said instance and said one or more identifiers;

receiving identification data from a user for identifying a computing system and an optical medium;

first determining a first value when said authentication data and said identification data identify a substantially similar computing system, and said particular optical medium;

second determining a second value when said authentication data and said identification data do not identify at least one of: a substantially similar computing system, and said particular optical medium;

performing the desired action using the information when said first value is determined; and prohibiting said step of performing when said second value is determined.

34. A method for creating physical defects on an optical disc for identifying said optical disk, comprising;

receiving source signals of data to be encoded onto said optical disc;

purposefully combining a representation of said source signals with one or more defective codes to obtain a different representation;

encoding said different representation having said defective codes onto said optical disc so that the sites of said optical disc having encodings of said defective codes are capable of generating one or more errors when said optical disc is read by an optical reader;

determining an authenticity of said optical disc by detecting said one or more errors.

35. A method as claimed in claim 34, wherein said step of encoding includes encoding said combination of said representation and said one or more defective codes onto a master disc.

36. A method as claimed in claim 34, wherein said step of combining includes distributing said defective codes within said representation so that a plurality of non-contiguous sites on said optical disc each have an encoding of one of said defective codes.

37. A method as claimed in claim 34, wherein said step of combining includes replacing one or more portions of said representation with said defective codes.

38. A method, as claimed in claim 34, wherein said defective codes include at least one code for one of: a continuous data pit along an optical disc track, and a continuous data land along an optical disc track.

39. A method, as claimed in claim 34, wherein said defective codes include a code for a defect that is of multi-track width in a radial direction of said optical disc.

40. A method for creating physical defects on an optical disc for authenticating said optical disc, comprising:

receiving a source signal of data to be encoded onto said optical disc;

encoding a representation of said source signals onto a master optical disc;

purposefully damaging said master optical disc at a plurality of addressable locations for providing one or more defective data areas;

wherein for at least a first of said addressable locations, there is an error in said encoding of the representation at said first location, and said error is obtained without identifying an address of said first addressable location during said purposefully damaging step;

transferring data from said master disc to said optical disc so that said optical disc includes one or more corresponding data areas corresponding to said one or more defective data areas of said master optical disc, wherein when said corresponding data areas are read by an optical reader, one or more errors are generated, said errors capable of being used for identifying said optical disc.

41. A method, as claimed in claim 40, wherein said step of purposefully damaging said master optical disc includes etching said defective data areas into said master disc.

42. A method for creating physical defects on an optical disc for use in identifying said optical disc, comprising:

transferring data from a master optical disc to said optical disc;

determining one or more areas of said optical disc having data thereon;

purposefully damaging said one or more areas so that when said areas are read by an optical reader, read errors are generated, said errors capable of being detected for identifying said optical disc;

encrypting together a representation of said one or more areas and identification data related to at least one of: an identity of a user and an identity of a device for accessing information on said optical disc, wherein a result of said step of encrypting yields an identifying code.

43. A method as claimed in claim 42, wherein said step of purposefully damaging said optical disc includes predetermining said one or more areas.

44. A method as claimed in claim 42, wherein said step of determining includes determining a relative position of each of said areas with respect to an identifiable location on said optical disc.

45. A method for creating physical defects on an optical disc for identifying said optical disc, comprising:

receiving a source signal of data to be encoded onto a master optical disc;

encoding a representation of said source signals onto the master optical disc;

creating a metal part or a series of metal parts from the master optical disc;

purposefully damaging said metal part at a plurality of addressable locations for providing one or more defective data areas;

wherein for at least a first of said addressable locations, there is an error in said encoding of the representation at said first location, and said error is obtained without identifying an address of said first addressable location during said purposefully damaging step;

transferring data from said metal part to said optical disc, said optical disc including one or more corresponding data areas corresponding to said one or more defective areas of said master optical disc, wherein when said corresponding data areas are read by an optical reader, one or more errors are detected for identifying said optical disc.

46. A method, as claimed in claim 45, wherein said step of purposefully damaging said metal part includes etching said defective data areas into said metal part.

47. A method, as claimed in claim 45, wherein said step of purposefully damaging said metal part includes determining an area for purposefully damaging according to a spacing of said area from another area for damaging.

48. A method, as claimed in claim 45, wherein said step of purposefully damaging includes locating a particular one of said areas to be damaged by determining a relative position of the particular one area with respect to an identifiable location on said optical disc.

49. An apparatus for creating physical defects on an optical disc, comprising:

means for receiving source signals of data to be encoded onto said optical disc;

means for purposefully combining a representation of said source signal with one or more defective codes;

wherein said defective codes are intended to change at least a portion of said representation;

means for encoding said representation having said defective codes onto said optical disc so that sites of said optical disc having encodings of said defective codes are capable of generating one or more errors when said optical disc is read by an optical reader, wherein said one or more errors are capable of identifying said optical disc.

50. An apparatus for creating physical defects on an optical disc, comprising:

means for receiving a source signal of data to be encoded onto said optical disc;

means for encoding a representation of said source signals onto a master optical disc;

means for purposefully damaging said master optical disc at a plurality of addressable locations for providing one or more defective data areas;

wherein for at least a first of said addressable locations, there is a corresponding error in said encoding of the representation obtained via said means for purposefully damaging, wherein said corresponding error is obtained without identifying an address of said first location;

means for transferring data from said master disc to said optical disc, said optical disc including one or more corresponding data areas corresponding to said one or more defective data areas of said master optical disc, wherein when said corresponding data areas are read by an optical reader, one or more errors are detected for identifying said optical disc.

51. An apparatus for creating physical defects on an optical disc, comprising:

means for transferring data from a master optical disc to said optical disc;

means for determining one or more areas of said optical disc having data thereon;

means for purposefully damaging said one or more areas so that when said areas are read by an optical reader, read errors are detected that are capable of identifying said optical disc.

52. An apparatus for creating physical defects on an optical disc, comprising:

means for receiving a source signal of data to be encoded onto said optical disc;

means for encoding a representation of said source signals onto a master optical disc;

means for creating a metal part or a series of metal parts from the master optical disc;

means for purposefully damaging said metal part at a plurality of addressable locations for providing one or more defective data areas;

wherein for at least a first of said addressable locations, there is a corresponding error in said encoding of the representation obtained via said means for purposefully damaging, wherein said corresponding error is obtained without identifying an address of said first location;

means for transferring data from said metal part to said optical disc, said optical disc including one or more corresponding data areas corresponding to said one or more defective areas of said master optical disc, wherein said corresponding data areas are read by an optical reader, one or more errors are detected for identifying said optical disc.

\* \* \* \* \*